(12) United States Patent
Anand et al.

(10) Patent No.: US 10,395,372 B2
(45) Date of Patent: Aug. 27, 2019

(54) SYSTEMS, MEDIA, AND METHODS FOR PRE-PROCESSING AND POST-PROCESSING IN ADDITIVE MANUFACTURING

(71) Applicant: University of Cincinnati, Cincinnati, OH (US)

(72) Inventors: Sundararaman Anand, West Chester, OH (US); Rohit Vaidya, Cincinnati, OH (US); Sushmit Chowdhury, Cincinnati, OH (US); Kunal Mhapsekar, Cincinnati, OH (US); Matthew McConaha, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 120 days.

(21) Appl. No.: 15/635,485

(22) Filed: Jun. 28, 2017

(65) Prior Publication Data
US 2017/0372480 A1    Dec. 28, 2017

Related U.S. Application Data

(60) Provisional application No. 62/355,862, filed on Jun. 28, 2016, provisional application No. 62/355,849, filed on Jun. 28, 2016.

(51) Int. Cl.
| | |
|---|---|
| G06K 9/34 | (2006.01) |
| G06T 7/11 | (2017.01) |
| G06F 17/50 | (2006.01) |
| G06T 19/20 | (2011.01) |

(52) U.S. Cl.
CPC ............ *G06T 7/11* (2017.01); *G06F 17/5009* (2013.01); *G06T 19/20* (2013.01); *G06F 2217/08* (2013.01); *G06F 2217/16* (2013.01); *G06T 2207/10024* (2013.01);
(Continued)

(58) Field of Classification Search
CPC .... B22C 9/02; B22C 9/10; B22C 9/24; B29C 2035/0827; B29C 35/0805
USPC ................. 382/164; 438/12, 17; 324/750.22, 324/754.03, 757.01, 759.02, 762.05, 324/762.09
See application file for complete search history.

(56) References Cited

U.S. PATENT DOCUMENTS

| | | | |
|---|---|---|---|
| 6,521,467 B2 * | 2/2003 | Laureanti ........... | G01R 31/2831 324/750.22 |
| 9,561,622 B2 * | 2/2017 | Das ..................... | G03F 7/70416 |

OTHER PUBLICATIONS

"Chapter 6: Element Birth and Death", Advanced Analysis Techniques Guide, ANSYS, 2009, 8 pages total. http://www.ansys.stuba.sk/html/guide_55/g-adv/GADV6.htm.
(Continued)

*Primary Examiner* — Charlotte M Baker
(74) *Attorney, Agent, or Firm* — Dinsmore & Shohl LLP

(57) ABSTRACT

Systems, methods, and media for pre-processing and post-processing in additive manufacturing are provided. A method includes receiving object geometry data. The method may further include generating a sectional snapshot and a bounding box. The method may also include performing a boundary tracing operation on the sectional snapshots. Further still, the method may include executing a contour mapping algorithm. The method may additionally include outputting slice contour points with respect to the object to be fabricated.

48 Claims, 36 Drawing Sheets
(31 of 36 Drawing Sheet(s) Filed in Color)

(52) U.S. Cl.
CPC .... *G06T 2210/12* (2013.01); *G06T 2219/008* (2013.01); *G06T 2219/2021* (2013.01)

(56) References Cited

OTHER PUBLICATIONS

G. Arfken, "7.3 Method of Steepest Descents", Mathematical Methods for Physicists, Orlando, FL, Academic Press, 1985, pp. 489-497.
Rajnish Bassi et al., "Image Processing-Based Accessibility Analysis Method for Determining Undercut-Free Parting Direction", International Journal of Advanced Manufacturing Technology, Issue 69, Jun. 28, 2013, pp. 1581-1591. DOI 10.1007/s00170-013-5129-0.
Paul J. Besl, et al., "A method for registration of 3D shapes", IEEE Transactions on Pattern Analysis and Machine Intelligence, vol. 14, No. 2, Feb. 1992, pp. 239-256.
W. Cao et al., "Direct Slicing from AutoCAD Solid Models for Rapid Prototyping", International Journal of Advanced Manufacturing Technology, Issue 21, 2003, pp. 739-742.
Kirsten Carr et al., "Verification of Form Tolerances Part II: Cylindricity and Straightness of a Median Line", Precision Engineering, Issue 17, 1995, pp. 144-156.
Tiebing Chen et al., "Three-Dimensional Modeling of Laser Sintering of a Two-Component Metal Powder Layer on Top of Sintered Layers", Journal of Manufacturing Science and Engineering, vol. 129, Jun. 2007, pp. 575-582. DOI: 10.1115/1.2716714.
P. Cignoni et al., "MeshLab: an Open-Source Mesh Processing Tool", Eurographics Italian Chapter Conference, Visual Computing Lab—ISTI-CNR, Pisa, Italy, 2008, 8 pages.
Suman Das et al., "Direct laser freeform fabrication of high performance metal components," Rapid Prototyping Journal, vol. 4, Issue 3, 1998, pp. 112-117. https://doi.org/10.1108/13552549810222939.
"Additive Manufacturing: Moving Beyond Rapid Prototyping", EWI, 2015, 7 pages total.
George M. Fadel et al., "Accuracy Issues in CAD to RP Translations", Rapid Prototyping Journal, vol. 2, Issue 2, 1996, pp. 4-17. https://doi.org/10.1108/13552549610128189.
Ghuneim AG, "Moore-Neighbor Tracing", 2015. Accessed on: Jul. 2015, 5 pages total. http://www.imageprocessingplace.com/downloads_V3/root_downloads/tutorials/contour_tracing_Ab.
Ratnadeep Paul et al., "Effect of Thermal Deformation on Part Errors in Metal Powder Based Additive Manufacturing Processes", Journal of Manufacturing Science and Engineering, Jun. 2014, 136(3), 12 pages total, http://manufacturingscience.asmedigitalcollection.asme.org/.
Ratnadeep Paul et al., "A new Steiner patch based file format for Additive Manufacturing processes", Elsevier, Computer-Aided Design, 63 (2015), pp. 86-100, http://dx.doi.org/10.1016/j.cad.2015.01.002.
Ratnadeep Paul et al., "Process energy analysis and optimization in selective laser sintering", Elsevier, Journal of Manufacturing Systems, 31(4), 2012, pp. 429-437, http://dx.doi.org/10.1016/j.jmsy.2012.07.004.
Haiko Pohl et al., "Thermal Stresses in Direct Metal Laser Sintering", in Proceedings of the 12th Solid Freeform Fabrication Symposium, Austin, TX, 2001, pp. 366-372.
N. Raghunath et al., "Improving accuracy through shrinkage modelling by using Taguchi method in selective laser sintering", Elsevier, International Journal of Machine Tools & Manufacture, 47(6), 2007, pp. 985-995, doi:10.1016/j.jmachtools.2006.07.001.
Mukund Rajagopalan et al., "A model for interfacing geometric modeling data with rapid prototyping systems", Elsevier, Advances in Engineering Software, 23(2), 1995, pp. 89-96.
Rutuja Samant, "Support structure accessibility and removal in Additive Manufacturing using Octree data structure", Master's Thesis, University of Cincinnati, Jul. 17, 2015, 51 pages total.
B. Starly et al., "Direct slicing of STEP based NURBS models for layered manufacturing", Elsevier, CAD Computer-Aided Design, 37(4), 2005, pp. 387-397, doi:10.1016/j.cad.2004.06.014.

Stanislav Sula, "Turbine Rotor", Feb. 25, 2015, https://grabcad.com/library/turbine-rotor-18, 3 pages total.
Paphakorn Sunanon et al., "Image Processing for Rapid Prototyping Technology", in Proceedings of the 2005 International Conference on Simulation and Modeling, 2005, 5 pages total.
Kun Tong et al., "Error compensation for fused deposition modeling (FDM) machine by correcting slice files", Rapid Prototyping Journal, vol. 14 Issue: 1, pp. 4-14, https://doi.org/10.1108/13552540810841517.
Kun Tong et al., "Software compensation of rapid prototyping machines", Elsevier, Precision Engineering, 28(3), 2004, pp. 280-292, doi:10.1016/j.precisioneng.2003.11.003.
O. Topçu et al., "A Method for Slicing CAD Models in Binary STL Format", in Proceedings of 6th International Advanced Technologies Symposium (IATS'11), May 16-18, 2011, Elaziğ, Turkey, pp. 141-145.
Rong-Ji Wang et al., "Influence of process parameters on part shrinkage in SLS", The International Journal of Advanced Manufacturing Technology, 33(5), 2007, pp. 498-504.
X. C. Wang et al., "Direct Selective Laser Sintering of Hard Metal Powders: Experimental Study and Simulation", The International Journal of Advanced Manufacturing Technology, 19(5), 2002, pp. 351-357.
Sashidhar Guduri et al., "Direct Generation of Contour Files from Constructive Solid Geometry Representations", in Proceedings of Solid Freeform Fabrication Symposium, 1993, 20 pages total.
Prashant Kulkarni et al., "A review of process planning techniques in layered manufacturing", Rapid Prototyping Journal, vol. 6 Issue 1, pp. 18-35, https://doi.org/10.1108/13552540010309859.
K. F. Leong et al., "A Study of Stereolithography File Errors and Repair. Part 1. Generic Solution", The International Journal of Advanced Manufacturing Technology, 1996, 12(6), pp. 407-414.
M. Matsumoto et al., "Finite element analysis of single layer forming on metallic powder bed in rapid prototyping by selective laser processing", International Journal of Machine Tools & Manufacture, 42(1), 2002, pp. 61-67.
Warren S. McCulloch et al., "A Logical Calculus of the Ideas Immanent in Nervous Activity", The bulletin of mathematical biophysics, 5(4), 1943, pp. 115-133.
Gaurav Navangul et al., "Error Minimization in Layered Manufacturing Parts by Stereolithography File Modification Using a Vertex Translation Algorithm", Journal of Manufacturing Science and Engineering, Transactions of the ASME, Jun. 2013, 135(3), 13 pages.
Y. Ning et al., "An Approach to Minimize Build Errors in Direct Metal Laser Sintering", IEEE Transactions on Automation Science and Engineering, Jan. 2006, vol. 3, No. 1, pp. 73-80.
Y. Ning et al., "Effect and control of hatch length on material properties in the direct metal laser sintering process", Proceedings of the Institution of Mechanical Engineers, Part B: Journal of Engineering Manufacture, 2005, 219(1), pp. 15-25, DOI: 10.1243/095440505X7957.
Chris Harris, "A Combined Corner and Edge Detector", In: Alvey vision conference, 1988, pp. 147-152.
Qiang Huang et al., "Optimal Offline Compensation of Shape Shrinkage for 3D Printing Processes", IIE Transactions on Quality and Reliability, 2015, 47(5), pp. 431-441.
Qiang Huang et al., "Statistical Predictive Modeling and Compensation of Geometric Deviations of Three-Dimensional Printed Products", ASME Transactions, Journal of Manufacturing Science and Engineering, Dec. 2014, 136(6), 10 pages total, http://manufacturingscience.asmedigitalcollection.asme.org/.
Mahdi Jamshidinia et al., "Numerical Modeling of Heat Distribution in the Electron Beam Melting of Ti-6Al-4V", Journal of Manufacturing Science and Engineering, Dec. 2013, 135(6), 15 pages total, http://manufacturingscience.asmedigitalcollection.asme.org/.
Ron Jamieson et al., "Direct slicing of CAD models for rapid prototyping", Rapid Prototyping Journal, 1995, vol. 1, Issue 2, 14 pages total, https://doi.org/10.1108/13552549510086826.
Hao Yu et al., "Levenberg-Marquardt Training," in Industrial Electronics Handbook, 2011, vol. 5—Intelligent Systems, CRC Press, pp. 12-1-12-16.

(56) References Cited

OTHER PUBLICATIONS

Yuwen Zhang et al., "Three-Dimensional Sintering of Two-Component Metal Powders with Stationary and Moving Laser Beams," Transactions of the ASME, Journal of Heat Transfer, Feb. 2000, vol. 122, pp. 150-158.

H. H. Zhu et al., "Study on shrinkage behaviour of direct laser sintering metallic powder," Proceedings of the Institution of Mechanical Engineers, Part B: Journal of Engineering Manufacture, 2006, 220(2), pp. 183-190, DOI: 10.1243/095440505X32995.

Paul John Werbos, "Beyond regression: New tools for prediction and analysis in the behavioral sciences", Jan. 1974, PhD Thesis, Harvard University.

Tony C. Woo, "Visibility maps and spherical algorithms", Computer-Aided Design, Jan. 1994, vol. 26, No. 1, pp. 6-16.

Wentao Zha et al., "Geometric approaches to input file modification for part quality improvement in additive manufacturing", Elsevier, Journal of Manufacturing Processes, 2015, vol. 20, pp. 465-477, http://dx.doi.org/10.1016/j.jmapro.2015.06.021.

Sushmit Chowdhury et al., "Artificial Neural Network Based Geometric Compensation for Thermal Deformation in Additive Manufacturing Processes", Proceedings of the ASME 2016 International Manufacturing Science and Engineering Conference, MSEC2016, Jun. 27-Jul. 1, 2016, Blacksburg, Virginia, USA, 10 pages total.

Rohit Vaidya et al., "Image Processing Assisted Tools for Pre- and Post- Processing Operations in Additive Manufacturing", Proceedings of the ASME 2016 International Manufacturing Science and Engineering Conference, MSEC2016, Jun. 27-Jul. 1, 2016, Blacksburg, Virginia, USA, 18 pages total.

K. Senthilkumaran et al., "New model for shrinkage compensation in selective laser sintering", Virtual and Physical Prototyping, 4(2), 15 pages total, DOI: 10.1080/17452750802393659, https://doi.org/10.1080/17452750802393659.

\* cited by examiner

DFAM analysis to detect thin features

Total Pixels: 404168
Total Accessible Pixels: 404168
Accessible Support Structure: 100.0 Percent
Inaccessible Support Structure: 0.0 Percent
Elapsed Time Is 108.310094 seconds Total Pixels: 5589
Total Accessible Pixels: 5160
Accessible Support Structure: 92.3 Percent
Inaccessible Support Structure: 7.7 Percent
Elapsed Time Is 97.781906 seconds

5300

```
Information                                    _ □ ☒
File  Edit
SLICE NUMBER - 1 (Z = 0)
Approximate Part Sintering Area = 0.12
Approximate Part Sintering Time = 11.03
Approximate Support Sintering Area = 1.008
Approximate Support Sintering Time = 92.72
- - - - - - - - - - - - - - - - - - - - - - - -
SLICE NUMBER - 2 (Z = 0.2)
Approximate Part Sintering Area = 0.085
Approximate Part Sintering Time = 7.86
Approximate Support Sintering Area = 1.008
Approximate Support Sintering Time = 92.76
- - - - - - - - - - - - - - - - - - - - - - - -
SLICE NUMBER - 3 (Z = 0.4)
Approximate Part Sintering Area = 0.142
Approximate Part Sintering Time = 13.08
Approximate Support Sintering Area = 1.006
Approximate Support Sintering Time = 92.8
- - - - - - - - - - - - - - - - - - - - - - - -
SLICE NUMBER - 4 (Z = 0.6000000000000001)
Approximate Part Sintering Area = 1.175
Approximate Part Sintering Time = 108.23
Approximate Support Sintering Area = 0.0
Approximate Support Sintering Time = 0.0
- - - - - - - - - - - - - - - - - - - - - - - -
SLICE NUMBER - 5 (Z = 0.8)
Approximate Part Sintering Area = 0.403
Approximate Part Sintering Time = 37.48
Approximate Support Sintering Area = 0.0
Approximate Support Sintering Time = 0.0
- - - - - - - - - - - - - - - - - - - - - - - -
###########################################
TOTAL APPROXIMATE SINTERING AREAS
Total Approximate Part Sintering Area = 1.925
Total Approximate Support Sintering Area = 3.024
TOTAL APPROXIMATE SINTERING TIME
Total Approximate Part Sintering Time = 177.68
Total Approximate Support Sintering Time = 278.28
###########################################
```

FIG. 53

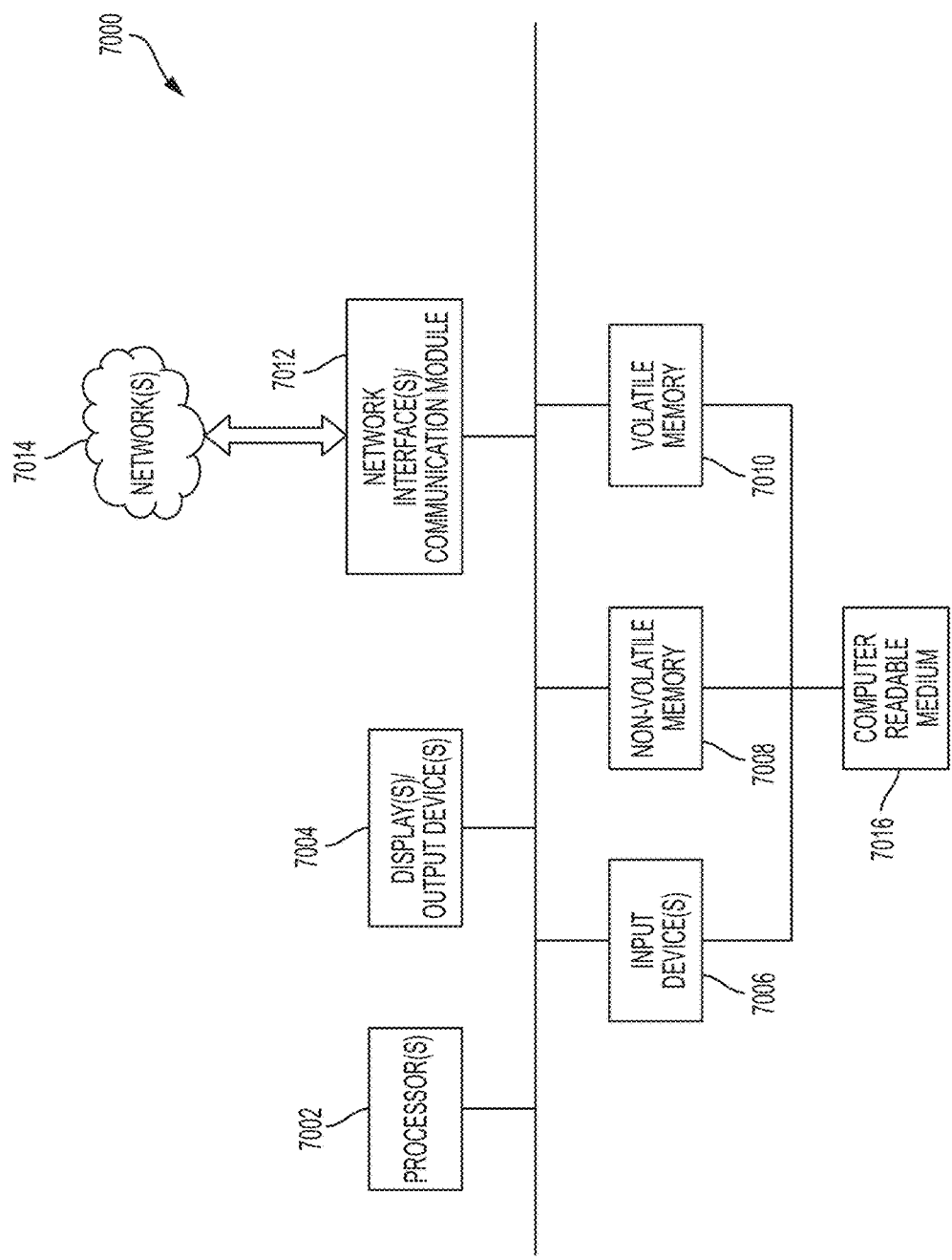

SYSTEMS, MEDIA, AND METHODS FOR PRE-PROCESSING AND POST-PROCESSING IN ADDITIVE MANUFACTURING

CROSS-REFERENCE TO RELATED APPLICATIONS

The present application claims priority to U.S. Provisional Patent Application Ser. No. 62/355,862, filed Jun. 28, 2016 and entitled, "Image Processing Assisted Tools for Pre- and Post-Processing Operations in Additive Manufacturing", and U.S. Provisional Patent Application Ser. No. 62/355,849, filed Jun. 28, 2016 and entitled, "Artificial Neural Network Based Geometric Compensation For Thermal Deformation in Additive Manufacturing Processes", the entire contents of both are incorporated herein by reference.

TECHNICAL FIELD

The present disclosure generally relates to additive manufacturing and, more particularly, to methods, systems, and media for pre- and post-processing in additive manufacturing.

Articles cited herein generally are cited to provide background context and support of underpinning technical theses, and reference in this application should not be construed as an admission of relevance to patentability. The entire disclosures of all articles cited herein are incorporated by reference.

BACKGROUND

Topology optimization is a process of distributing material within a defined design space such that a performance objective for the part design may be achieved while satisfying the design constraints. In structural topology optimization, the objective is to minimize the compliance of the part design while reducing the part weight by a pre-defined factor. Topology optimization often returns geometry which can be described as organic in shape. Manufacturing these optimized part designs using conventional manufacturing techniques such as casting, forging, and extrusion often proves challenging, because of the inherent constraints of these traditional manufacturing methods. Manufacturing filters have been developed previously which incorporate these constraints of conventional processes within topology optimization. Some of the previously developed filters include uniform cross section enforcement for extrusion, and single and double draw direction enforcement for casting and forging. However, these filters significantly constrain the design freedom that comes with topology optimization and push the output to a sub-optimal design that is primarily restrained by the limited nature of the conventional manufacturing processes.

The timeline for the foundation and growth of topology optimization can be closely associated with that of additive manufacturing. Their combined potential to revolutionize the design and manufacturing industry by providing ultimate creative freedom, has made these technologies popular among engineering industries in recent years.

With the advent and subsequent improvements in additive manufacturing technology, the scope of part geometries which can be viably produced has increased dramatically. This state of the art manufacturing technology can be deemed as a close match for topology optimization (TO) because of its ability to manufacture complex shapes, obtained from TO, with significant ease. However, even additive manufacturing inherits certain issues which decrease the process efficiency in terms of time, cost and material usage, and which may result in failure during the part build process.

Additionally, additive manufacturing (AM) processes have seen a rapid growth of usage in the industry over the last decade. The freedom to manufacture complicated designs with ease, together with the absence of special tooling requirements have made it one of the most preferred manufacturing processes in a wide array of industries, such as toys, electronics, medical equipment, aerospace etc. AM encompasses many similar manufacturing processes which manufacture parts by layer-wise deposition of material. The first step of the process is slicing of the CAD model of the part at user defined intervals called slice thickness, along the build axis (usually z-axis) to generate 2D contours of the part at each level. This may be followed by the layer-wise deposition of material to create the 2D contours of the part at each level (Kulkarni and Dutta, 2000).

The methodology of material deposition may be dependent on the AM process being used. AM processes such as Selective Laser Melting (SLM), Direct Metal Laser Sintering (DMLS) and Selective Laser Sintering (SLS) use a high power laser beam to sinter/melt powdered material in each layer of a powder bed; while the Rapid Prototyping (RP)/Fused Deposition Modeling (FDM) process uses filaments of material passed through a heated die to deposit the molten material in sequential layers on the build platform (Kulkarni and Dutta, 2000). The sintered/deposited material adheres to the layer fabricated just before it. And thus, this cycle of melting and solidification may be repeated several times during the manufacturing process depending on the number of 2D slices generated from the CAD model. The heating and cooling of the material in the same layer may be uneven, and may be governed in principal by the laser scan/material deposition pattern (Das et al., 1998; Zhang et al., 2000; Chen and Zhang, 2007; Ning et al., 2005). The cumulative effect of these temperature differences over all the slices of material in the manufactured parts results in an isotropic shrinkage and deformation of the part, which has a significant impact on the part dimensional accuracy, and could also impede the functionality of the part.

SUMMARY

A computer-implemented method for image processing of a computer-modeled object to be fabricated may comprise receiving object geometry data. The method may further comprise generating a sectional snapshot and a bounding box. Further, the method may comprise performing a boundary tracing operation on the sectional snapshots. Additionally, the method may comprise executing a contour mapping algorithm. Further still, the method may comprise outputting slice contour points with respect to the object to be fabricated.

In another embodiment, a system for image processing of a computer-modeled object to be fabricated may comprise memory and a processor coupled to the memory, where the processor may be configured to receive object geometry data. The processor may be further configured to generate a sectional snapshot and a bounding box. Further, the processor may be configured to perform a boundary tracing operation on the sectional snapshots. Additionally, the processor may be configured to execute a contour mapping algorithm. Moreover, the processor may be configured to output slice contour points with respect to the object to be fabricated.

In yet another embodiment, a non-transitory computer readable medium embodying computer-executable instructions, that when executed by a processor, may cause the processor to execute operations for image processing of a computer-modeled object to be fabricated comprising receiving a density value for a finite element. The processor may further generate a sectional snapshot and a bounding box. Additionally, the processor may perform a boundary tracing operation on the sectional snapshots. Further still, the processor may execute a contour mapping algorithm. Moreover, the processor may output slice contour points with respect to the object to be fabricated.

In a further embodiment, a computer-implemented method for compensating for thermal deformation during fabrication of an object may comprise receiving a model of the object. The method may further comprise extracting nodes representing a surface of the object, each node having a position. Further, the method may comprise simulating fabrication of the object, said fabrication occurring across a time frame. Additionally, the method may comprise determining changes in the positions of the extracted nodes across the time frame. Further still, the method may comprise compensating for thermal deformation by applying a trained neural network to modify the object in accordance with the changes in positions, said trained neural network trained with previous object fabrication simulations. Moreover, the method may comprise outputting a modified model of the object.

In still another embodiment, a system for compensating for thermal deformation during fabrication of an object may comprise memory and a processor coupled to the memory, where the processor may be configured to receive a model of the object. The processor may be further configured to extract nodes representing a surface of the object, each node having a position. Further, the processor may be configured to simulate fabrication of the object, said fabrication occurring across a time frame. Additionally, the processor may be configured to determine changes in the positions of the extracted nodes across the time frame. Moreover, the processor may be configured to compensate for thermal deformation by applying a trained neural network to modify the object in accordance with the changes in positions, said trained neural network trained with previous object fabrication simulations. Further still, the processor may be configured to output a modified model of the object.

In yet another embodiment, a non-transitory computer readable medium embodying computer-executable instructions, that when executed by a processor, may cause the processor to execute operations for thermal deformation during fabrication of an object comprising receiving a model of the object. The processor may further extract nodes representing a surface of the object, each node having a position. Additionally, the processor may simulate fabrication of the object, said fabrication occurring across a time frame. Further still, the processor may compensate for thermal deformation by applying a trained neural network to modify the object in accordance with the changes in positions, said trained neural network trained with previous object fabrication simulations. Moreover, the processor may output a modified model of the object.

BRIEF DESCRIPTION OF THE DRAWINGS

The patent or application file contains at least one drawing executed in color. Copies of this patent or patent application publication with color drawings will be provided by the Office upon request and payment of the necessary fee.

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 53 depicts a diagram schematically illustrating sintering area and a time calculation report, according to one or more embodiments shown and described herein;

FIG. 70 schematically illustrates exemplary computing hardware for implementing various processes and systems, according to one or more embodiments shown and described herein.

DETAILED DESCRIPTION

Figure 1:
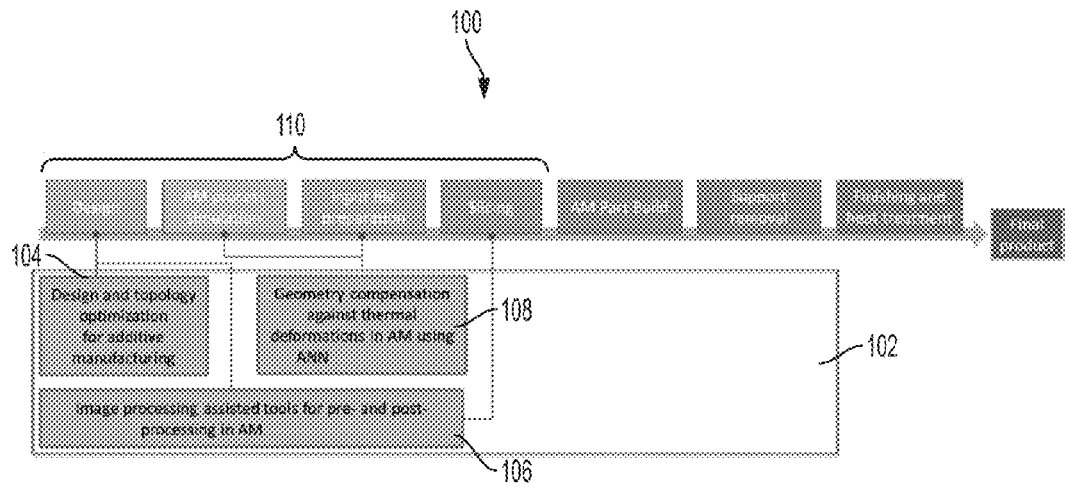
FIG. 1 depicts a diagram schematically illustrating additive manufacturing process flow and focus of pre-processing tools, according to one or more embodiments described and illustrated herein.

Computational Algorithms and Tools for Pre- and Post-Processing in Additive Manufacturing In this application, a package of computational tools has been developed to provide a complete pre-processing solution for AM processes. A simple AM process flow 100 is shown in FIG. 1. FIG. 1 depicts an additive manufacturing flow and focus of pre-processing tools. The first four stages in this flow: design, process simulation and thermal deformation prediction, input file preparation, and slicing are the pre-processing stages 110. These steps are important in many embodiments, as the design and process parameters defined during these stages are critical in achieving optimum quality and manufacturability of a part.

In order to assist users in creating optimal designs and correct part geometry, while considering the inherent concerns associated with the AM processes, three computational tools 102 have been proposed. The design and topology optimization tool 104 for additive manufacturing helps create lightweight and structurally sound designs that may be easily buildable using AM processes. The detailed description of this tool is provided herein. Once a design concept is ready, the image processing assisted tools 106 can be used to further analyze the part design for critical design concerns and for assessment of post-processing efforts. The image processing approach can also be used for calculation of the total sintering area and total sintering time which may prove useful in process planning. The approach behind the image processing tools 106 has been explained herein. These image processing based assessments of a part design provide a reliable insight into the criticality of geometric features of the design as well as the manufacturability of the part in early stage of the process flow 100. This helps a user in incorporating necessary design changes ahead of time and helps achieve a first-time-right-part.

A completed part design can then be imported to the geometry compensation tool 108. The methodology behind this geometry compensation tool 108 is also explained herein. This methodology helps create a modified part geometry which helps counteract the thermal deformations and shrinkages that occur during some of the AM processes. In the final pre-processing stage, just before the part build process, the image processing assisted tools 106 can be used to directly slice a computer-aided design (CAD) part and create layer contours. Together these three tools 102 can assist users in creating optimal AM friendly designs and making necessary corrections in the part geometry in order to create a first-time-right part of optimum quality.

Design and Topology Optimization for Additive Manufacturing

Introduction

This application addresses the manufacturing constraints associated with AM processes and helps combine AM with topology optimization to create optimized AM friendly part designs. Density based topology optimization (TO) with Solid Isotropic Material with Penalization (SIMP) has been used as a conventional benchmark algorithm for TO. Critically thin features and the volume of support structures are two of the major issues related to AM processes. The proposed manufacturing constraints have been developed for these two critical parameters. The next section explains the logic behind these manufacturing constraints and how these may be integrated within TO.

Methodology

Figure 2:
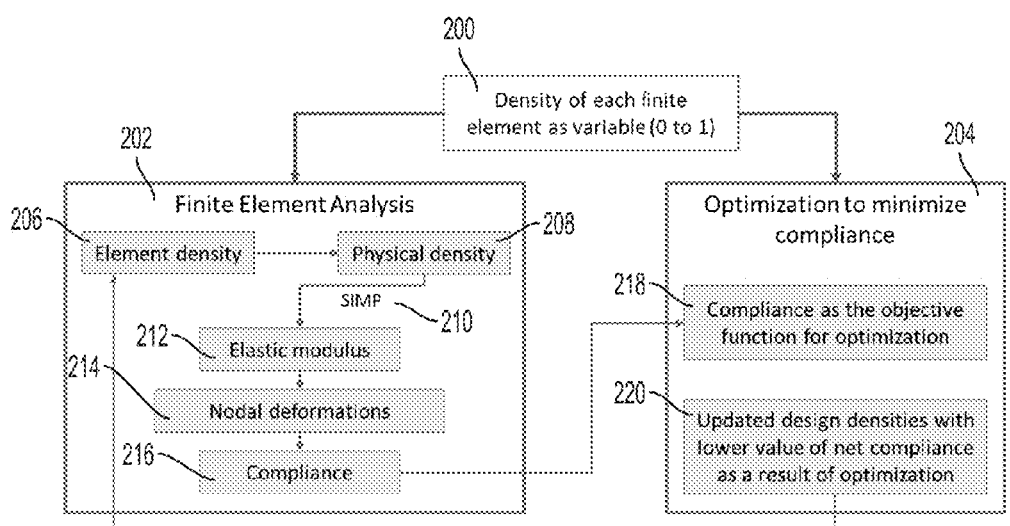
FIG. 2 depicts a diagram schematically illustrating constrained density-based topology optimization, according to one or more embodiments described and illustrated herein.

FIG. 2 shows a flowchart of the algorithm behind the conventional density based topology optimization, specifically relating to unconstrained density-based topology optimization. For efficient integration of the manufacturing constraints in the iterative topology optimization technique, two approaches have been proposed. The first approach uses a density mapping algorithm to introduce an additional stage of density filter in the topology optimization. This novel density filter helps optimize designs while restricting the growth of critically thin regions in each element layer. Such a density mapping approach may be useful in variable density based topology optimization approaches such as SIMP. Density filters such as this can find applications where an element by element analysis of a certain neighborhood may be necessary to introduce manufacturability constraint, such as thin regions in layer contours.

Another efficient approach is to quantify the design parameter in the form of a function of element densities 200 and to use this function within the optimization model of topology optimization. The formulation of SIMP based topology optimization problem primarily focuses on minimization of compliance, which is a function of received element densities 206, while achieving a predefined reduction in part weight. An approach has been proposed in this application in which this conventional objective function may be modified to a weighted multi-objective function where a function for manufacturing constraint can be added to the original compliance function. A manufacturing constraint to minimize support structure volume 204 has been developed and integrated with TO using this approach. This weighted multi-objective approach reduces both compliance and support structure volume of the design while achieving a desired weight reduction. Finite element analysis 202 utilizes element density 206 to derive physical density 208, which serves as input to SIMP 210. Based on this, an elastic modulus 212, a nodal deformation 214, and a compliance value 216 are derived. The compliance value 216 is utilized for optimization to minimize compliance 204, where compliance 204 serves as the objective function for optimization 218. Design densities are updated with a lower value of net compliance as a result of optimization 220. This approach not only allows seamless integration of manufacturing constraints into topology optimization but also creates a possibility of integration of multiple manufacturing constraints into one optimization formulation. Both of these approaches and the manufacturing constraints for thin features and support structure volume are explained herein.

Figure 3:
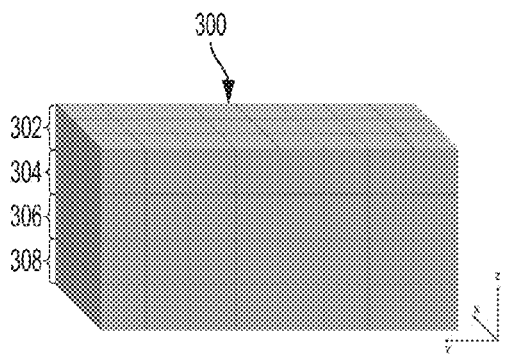
FIG. 3 depicts a diagram schematically illustrating elements and layers in sample design space, according to one or more embodiments described and illustrated herein.
Figure 4:
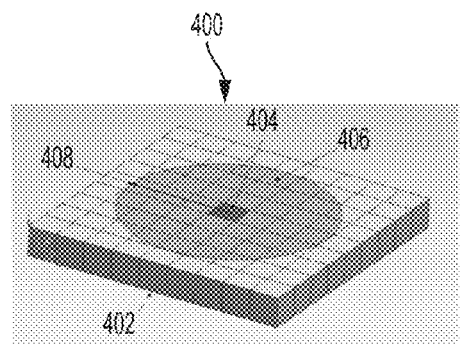
FIG. 4 depicts a diagram schematically illustrating a single-layer primary neighborhood of an element, according to one or more embodiments described and illustrated herein.

Manufacturability Constraint for Thin Features—Density Mapping Based Approach The density mapping approach to integrate constraints in topology optimization has been demonstrated with a manufacturing constraint to minimize the thin features in a design. Uniform hexahedral elements have been used in the SIMP based topology optimization routine used in this research. In the density filter, a layer wise approach may be taken through the layers of the hexahedral elements to mimic the layer by layer build process of additive manufacturing. For the purpose of this research, positive Z direction may be considered as the build direction. Therefore, the elements of the design space that are at the same Z level may be considered to be within the same layer in FIG. 3, which depicts elements and layers (design layer 1 308, design layer 2 306, design layer 3 304, and design layer 4 302) in a sample design space 300. A novel neighborhood search approach 400 has been developed which serves as the base for the design filter. The primary neighborhood may be considered as a cylindrical disc of the height of one element size and a user defined radius R 408 as shown in FIG. 4, which depicts a single-layer primary neighborhood of element 'e'. This neighborhood 406 signifies the minimum allowable size of sections of features in each layer 402 of the part design. The control on the limit of minimum allowable feature size may be represented in a user's hands and can be decided with the help of the neighborhood radius 408. For any element 'e' 404, this neighborhood 406 considers the effect of the elements only from the same layer 402 as the element 'e' 404, thus replicating the layer wise manufacturing approach.

Figure 5:
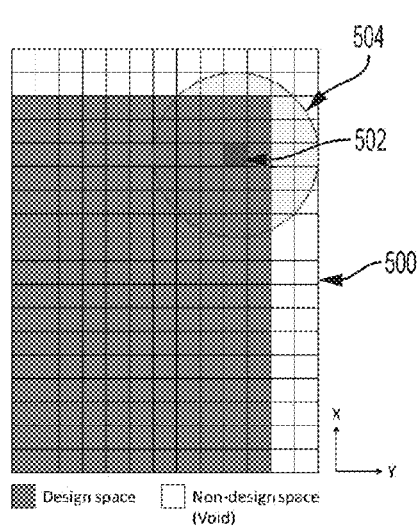
FIG. 5 depicts a diagram schematically illustrating an element near a boundary of a design space and its primary neighborhood, according to one or more embodiments shown and described herein.
Figure 6:
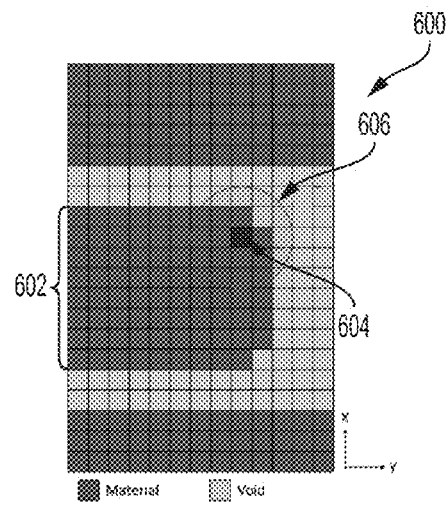
FIG. 6 depicts a diagram schematically illustrating an element at the boundary of a feature and its primary neighborhood, according to one or more embodiments shown and described herein.
Figure 7:
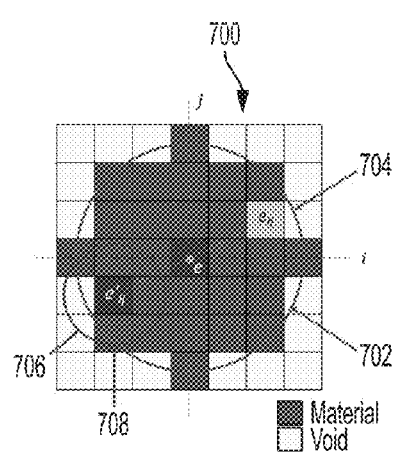
FIG. 7 depicts a diagram schematically illustrating a primary neighborhood and a sample secondary neighborhood, according to one or more embodiments shown and described herein.

The density of element 'e' 404 may be modified considering the effect of all the element densities in the primary neighborhood, $N_e$. 406 If all the elements in the primary neighborhood 406 have a density greater than or equal to a certain amount, such as 0.5 (solids), then the region of that layer 402 defined by that particular neighborhood 406 may be considered to be completely filled with solid material. In that case, it may be implied that the element 'e' 404 may be surrounded by solid material to the extent of the primary neighborhood 408 and may be not a part of a thin feature. Therefore, the density of the element 'e' is not modified. Whereas, if some of the elements in the primary neighborhood $N_e$ 408 are not solid, i.e., their density is less than 0.5, then there may be two possibilities. A first possibility may be that the element 404 is near the boundary of the design space; in which case, the neighborhood also considers the space outside the design space which may be by default void in FIG. 5, which depicts 500 an element near the boundary 502 of the design space and its primary neighborhood 504. The second possibility may be that the primary neighborhood 504 of element 'e' has some void spaces and there may be a possibility that the element 'e' is a part of a thin feature. In such a case, the element 'e' needs to be penalized by reducing its density. This penalization approach prevents the growth of material in such regions where a thin feature may be created. However, in this case it may also be possible that the element 'e' is at the edge of an allowably thick feature. In such cases, although the neighborhood $N_e$ 504 has some void elements, as shown in FIG. 6 which depicts 600 an element at the boundary 604 of a feature and its primary neighborhood '$N_e$' 606, the element 'e' may not be a part of a thin feature 602. In order to truly verify if the element needs to be penalized or not, a secondary neighborhood may be considered. For each element $e_{ij}$ from the primary neighborhood that is a void element, the secondary neighborhood, $N_{ij}$ 708, may be created around the element $e'_{ij}$ which is diametrically opposite to $e_{ij}$, as shown in FIG. 7, which depicts 700 a primary neighborhood $N_e$ 704 and a sample secondary neighborhood '$N_{ij}$' 708. The radius 706 of this secondary neighborhood 708 may be calculated using equation 1, where, for example, R 702 is the radius of the primary neighborhood, $r_{ij}$ 706 is the radius 706 of the secondary neighborhood 708 and |$e_{ij}$-e| is the distance between the centroids of elements $e_{ij}$ and e.

$$r_{ij}=2*(R-|e_{ij}-e|) \quad (1)$$

Figure 8:
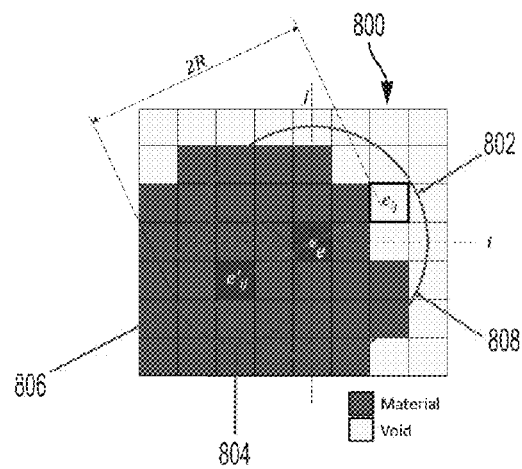
FIG. 8 depicts a diagram schematically illustrating a combined effect of primary and secondary neighborhoods, according to one or more embodiments shown and described herein.

Equation 1 has been developed, as depicted 800 in FIG. 8 for example, to search the element layer beyond the primary neighborhood 802, such that the effective distance of the extreme boundary of the secondary neighborhood 804 from the void element $_{ei1}$ is equal to the threshold for thin features, where $r_{ij}$ 806 is expressed by equation 1 and 808 is the primary neighborhood radius.

In order to incorporate the effect of both the primary neighborhood 802 and the secondary neighborhood 804, equations 2 and 3 have been developed.

$$x_{TR} = w * \frac{\sum_{a=1}^{N_e} F(\tilde{x}_{ij})_a}{N_e} * \tilde{x} + (1-w) * \tilde{x} \quad (2)$$

$$F(\tilde{x}_{ij}) = \tilde{x}_{ij} * \lfloor \tilde{x}_{ij} \rfloor + \lfloor \tilde{x}'_{ij} \rfloor * \frac{\Sigma N_{2_{\tilde{x}'_k}}}{N} * \lfloor 1 - \tilde{x}_{ij} \rfloor \quad (3)$$

Figure 9:
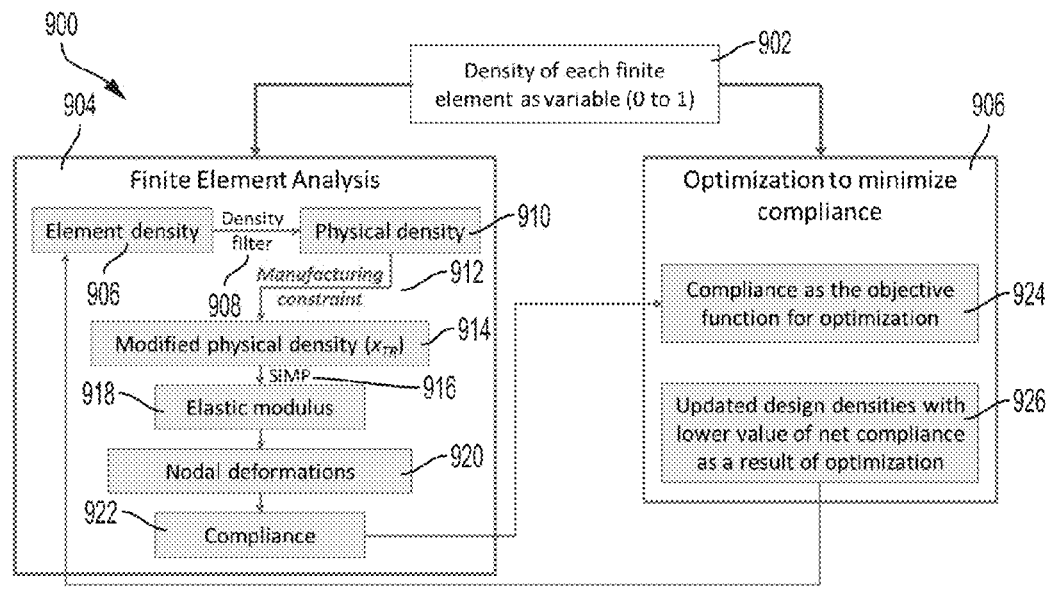
FIG. 9 depicts a diagram schematically illustrating a modified topology optimization algorithm with a manufacturing constraint for thin features, according to one or more embodiments shown and described herein.

Equation 2 gives the relation, for example, between the physical density variable ($\tilde{x}$) and a new mapped density variable ($x_{TR}$). w is the weight assigned to the mapping function to control the effect of the density filter and to help in the convergence of topology optimization. For this research, the value of w is taken as 0.9. $N_e$, in equation 2, is the number of elements in the primary neighborhood $N_e$ 802. $F(\tilde{x}_{ij})$ is the neighborhood impact function, given by equation 3, which translates the effect of the density of element $e_{ij}$ into the mapping function, where $\tilde{x}_{ij}$ is the physical density variable for element $e_{ij}$. The operator $\lfloor \tilde{x}_{ij} \rfloor$ is a rounding operator with the round half up rule. If the value of $\tilde{x}_{ij}$ is less than 0.5, $\lfloor \tilde{x}_{ij} \rfloor$ gives 0 and if $\tilde{x}_{ij}$ is greater than or equal to 0.5, $\lfloor \tilde{x}_{ij} \rfloor$ gives 1. The rounding operator works in the similar manner for the term (1-$\tilde{x}_{ij}$). Therefore, depending on the relation of the density $\tilde{x}_{ij}$ with the threshold value of 0.5, either the first or the second term of $F(\tilde{x}_{ij})$ is active. If element is solid ($\tilde{x}_{ij} \geq 0.5$), $F(\tilde{x}_{ij})$ takes the value of $\tilde{x}_{ij}$ and the effect of the density variable $\tilde{x}_{ij}$ is considered in the mapping function. Whereas, if the element $e_{ij}$ is void ($\tilde{x}_{ij} < 0.5$), then only the second term of equation 3 may be considered. This term represents the case where the effect of the secondary neighborhood 804 around element $e'_{ij}$ needs to be taken into consideration (such as in FIG. 7). $\tilde{x}'_{ij}$ is the physical density variable of element $e'_{ij}$. $N_2$ is the number of elements in the secondary neighborhood 804 and $\tilde{x}'_k$ represents the physical density of the elements from the secondary neighborhood 804. $\lfloor 1-\tilde{x}_{ij} \rfloor$ ensures that this second term from equation 3 may be taken into consideration only when the element $e_{ij}$ is void. For example, $\lfloor \tilde{x}'_{ij} \rfloor$ checks if the element $e'_{ij}$ is solid and ensures that the second term has effect only if the element $e'_{ij}$ is solid. With this logic, for each element $e_{ij}$ from the primary neighborhood 802 of element e, the impact function $F(\tilde{x}_{ij})$ translates the effect of either the solid element $e_{ij}$ or the effect of the secondary neighborhood 804 of element $e'_{ij}$ on the new mapped density of element e. FIG. 9 depicts the modified topology optimization algorithm 900 with manufacturing constraint for thin features, based on a variable density of a finite element 902, with the introduction of the new density filter 908. Finite element analysis 904 utilizes received element density 906 in a density filter 908 to derive physical density 910, which serves as input to a manufacturing constraint 912. Based on this, a modified physical density $x_{TR}$ 914 is derived, which may be derived from equation 2, and may serve as input to SIMP 916. Based on this, an elastic modulus 918, a nodal deformation 920, and a compliance value 922 are derived. The compliance value 916 is utilized for optimization to minimize compliance 906, where compliance 906 serves as the objective function for optimization 924. Design densities are updated with a lower value of net compliance as a result of optimization 926.

Manufacturability Constraint for Support Structures-Weighted Multi-Objective Approach Another manufacturing constraint has been developed which restricts the requirement of support structures in the topology optimized designs to a minimum. This constraint takes the multi-objective function approach for the integration with the topology optimization algorithm.

Uniform cubic elements have been used in the topology optimization and positive Z direction may be considered as the build direction. Many different support structure generation algorithms may be available for placing optimum supports with maximum removability. Solid support structures may be used between the part surface and the substrate along a direction opposite to the build direction. A weighted multi-objective optimization function, given by equation 4, has been developed and integrated into the conventional SIMP based topology optimization.

$$f(\tilde{x}) = w_1 \frac{c(\tilde{x})}{C_1} + w_2 \frac{s(\tilde{x})}{S_1} \quad (4)$$

In equation 4, ($\tilde{x}$) is the objective function for the optimization model with ($\tilde{x}$) as the variable to be optimized, for example. ($\tilde{x}$) is the physical density variable that defines a corresponding unique distribution of material in the design space. ($\tilde{x}$) is the typical compliance function and ($\tilde{x}$) is the support function which represents the amount of support required by the part defined by the material distribution derived from ($\tilde{x}$). In order to bring the functions to the same order of magnitude, these may be normalized. $C_1$ and $S_1$ are normalization factors which may be obtained from the conventional unconstrained topology optimization for pure compliance reduction. $C_1$ is the compliance and $S_1$ is the support volume of the final unconstrained topology optimized design. The weightages act to quantify a tradeoff between compliance reduction and support reduction, where the relative magnitude of each weightage represents the relative importance in minimizing each function.

During the development of the constraint, the weighted objective function may be differentiable, to allow the use of efficient gradient-based optimization algorithms instead of resorting to non-gradient methods. For perfectly solid-void element mesh, the support function returns an accurate value equal to the volume of support structure required. However, in the case where densities have not reached binary value, because of the unrealistic nature of intermediate densities of the elements it may be impossible to calculate an accurate value of support volume. For such cases, the function calculates the support volume by interpolation from the non-binary element densities. Equations 5 and 6 have been developed to mathematically define the support function.

$$s(\tilde{x}) = \Sigma i \in D^{\tilde{x}_i}(1-\tilde{x}_{m,i})*Y_{xyz} \quad (5)$$

where, $$Y_{xyz} \begin{cases} \tilde{x}_{xyz}(1-\tilde{x}_{xy(z-1)})\sum_{k<z}[(1-\tilde{x}_{xyz})v_{xyk} - Y_{xyk}] & \text{if } z > 1 \\ 0 & \text{if } z = 1 \end{cases} \quad (6)$$

Figure 10:
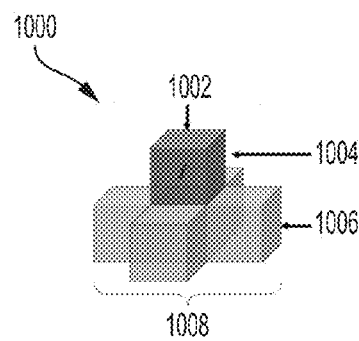
FIG. 10 depicts a diagram schematically illustrating a support region, according to one or more embodiments shown and described herein.

For a set of physical density variables in an iteration, the total volume of supports may be calculated by adding the support required by each element of the design space (D). The support requirement for each element may be calculated in a columnar manner upward along the build direction from the substrate. For example, ($\tilde{x}_i$) 1004 is the physical density variable for any element 'i' 1002 in the design space (D), and ($\tilde{x}m$,) is the maximum density among the elements in the support region 1006 underneath the element 'i' 1002, as shown in the FIG. 10 depicting 1000 a support region 1006. The function can effectively be split into two parts for interpretation. The first part [$\tilde{x}(1-\tilde{x}_{m,i})$] is the support requirement factor that calculates a value which signifies how well supported the element 'i' 1002 is, wherein $\tilde{x}_{m,i}$ is represented by 1008, and the second part [$\gamma_{xyz}$] calculates the amount of support required for that element. The support region 1006 for element 'i' 1002 may be defined by the elements which may be in the layer immediately below that element. Following the exemplary 45-degree criterion for support requirement, an element 1002 may be considered in the support region 1006 only if the line joining the centroid of that element 1002 with the centroid of element 'i' 1002 make an angle greater than or equal to 135-degrees with the build direction. Because the mesh may be perfectly cubic, the element directly below and the four elements that face adjacent to that element 1002 make up the entirety of the support region 1006 for element 'i' 1002, as shown in FIG. 10. In equation 5, as the density of the element 'i' 1002 gets closer to 1, the support requirement factor also gets closer to 1. Conversely, as the density of the element 'i' 1002 gets closer to 0, the support requirement factor also gets closer to 0. Furthermore, as the maximum support density ($\tilde{x}_m$,) gets closer to 1, the support requirement factor gets closer to 0, and as the maximum support density gets closer to 0 the support requirement factor gets closer to 1.

Figure 11:
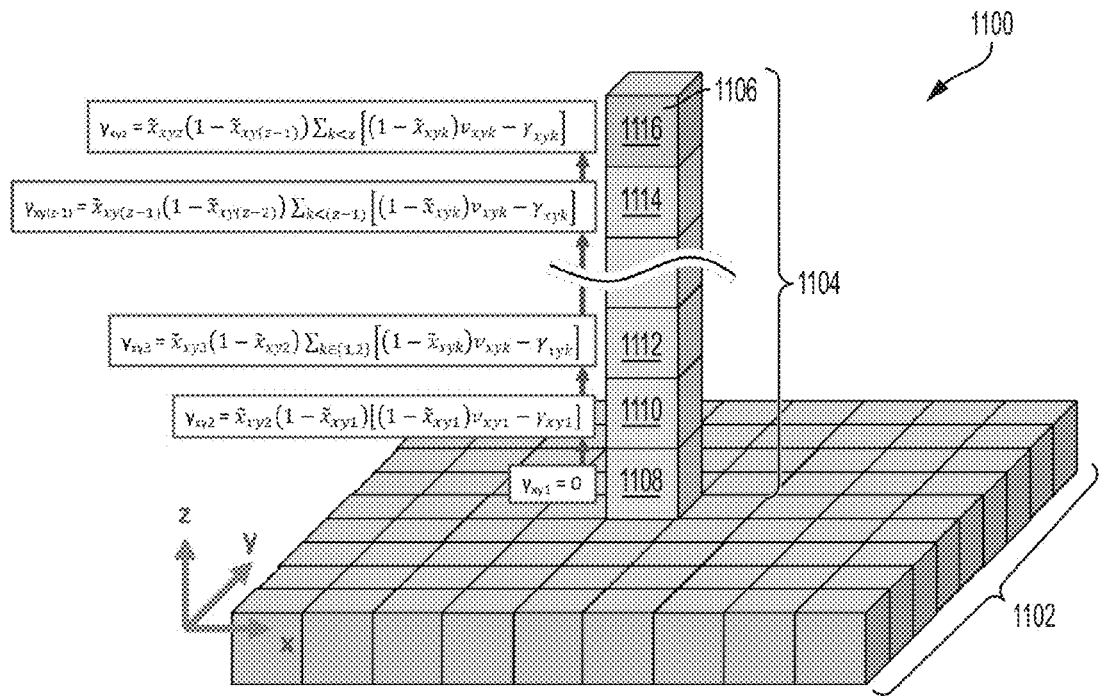
FIG. 11 depicts a diagram schematically illustrating of an approach to evaluate support volume required for an element of interest, according one or more embodiments shown and described herein.

The second part of the function, i.e., the value of $\gamma_{xyz}$, may be calculated recursively in a columnar manner along the build direction starting from the substrate 1102 in FIG. 11, which depicts an approach to calculate support volume required for an element of interest 1106. For any element on the bottom most layer, the substrate may be directly supporting the element 1106 and thus there may be no need for support. In this case, the function ($\gamma_{xyz}$), given by equation 6, returns zero. On the other hand, if an element 1106 is not in the bottom most layer then it may require support 1104. The support 1104, in the negative build direction, may go either all the way to the substrate 1102 or only until another solid element that is directly below the current element 1106 but above the substrate 1102. Both these support cases may be taken care of during the calculation of support volume in equation 6. Also, during the optimization process the densities variables are usually not binary in value and therefore it may not be possible to definitively determine whether the support goes all the way to the substrate or it hits another solid element. Thus, equation 6 may be formulated in such a way where an estimation may be implicitly interpolated. For a system of purely binary element densities, equation 6 returns a number which exactly matches the required support volume. However, for the system of topology optimization with intermediate densities the best estimate may be found based on the interpolation. Because SIMP does push the density variables towards binary values while converging, equation 6 also converges on a value of support volume that closely matches the actual support volume.

As described previously, $\gamma_{xyz}$ may be representative of (and ideally, but not necessarily, equal to) the amount of support volume that needs to be generated in order to fully support an element 1106 in the position (x, y, z). The first term in equation 6 is the physical density variable ($\tilde{x}_i$) of the current element 'i' 1106, which may be alternatively denoted as $\tilde{x}_{xyz}$ for the ease of understanding equation 6. As the density of this element 1106 increases, necessity for support 1104 also increases. If the density of this element 1106 is zero, then the calculated support volume may be multiplied by a factor of zero, which signifies that the support is not needed, and vice versa. The next term is the complement of the density of the element directly below the element 'i' 1106. If the element right below the element 'i' 1106 has a high density, then the element 'i' 1106 may be considered to be well supported and the multiplication factor for the support volume calculation decreases.

Figure 12:
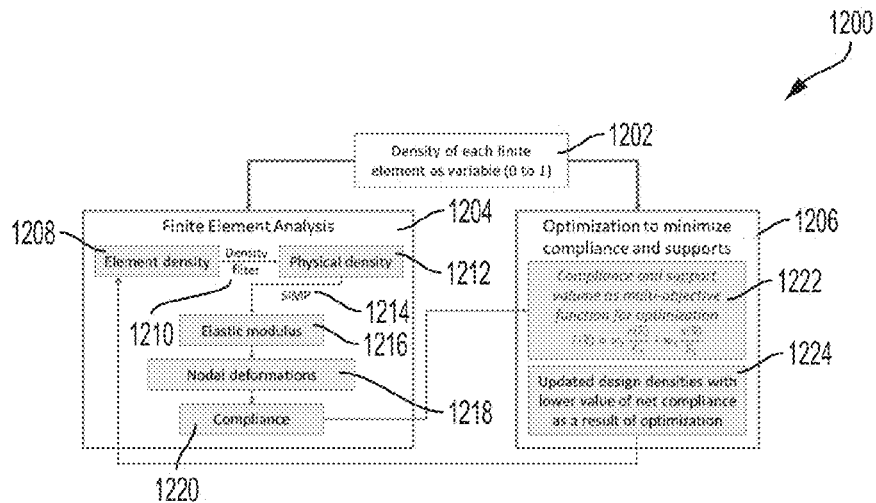
FIG. 12 depicts a diagram schematically illustrating a modified topology optimization algorithm with manufacturing constraint for support structure volume, according to one or more embodiments shown and described herein.

The third term is where the recursive nature of equation 6 comes into play. The summation sequentially iterates through all the elements in the column below the element 'i' 1106, starting from the lowest element. Equation 6 helps determine the value of $\gamma$ for element 'i' ($\gamma_{xyz}$) based on the values of $\gamma$ for all of the elements in the support column 1104. The first section within the summation, $(1-\tilde{x}_{xyk})$, is the multiplication of the complement of element density and the volume of the element 1106. This gives the amount of material that needs to be added to the element at (x, y, k) in order to make it fully dense and able to act as the support column 1104, if necessary. The last term $\gamma_{xyk}$ is included to consider the case in which the support column 1104 may not go all the way to the substrate 1102. If we exclude the term $\gamma_{xyk}$ and assume that the support column 1104 may be built to the substrate 1102, equation 6 returns the amount of support material column 1104 required from the element 'i' 1106 to the substrate 1102. However, the support column 1104 may go only until it reaches a solid element below element 'i' 1106 and not all the way to the substrate 1102. This is where the term $\gamma_{xyk}$ comes into picture. The iterative calculation of support volume works upward from the bottom element of the support column 1104 toward the element at (x, y, z). The volume of the void space may be added up to find the volume of support required to reach the substrate 1102 while the volume of support already found for the elements lower in the column may be subtracted from the calculation. This ensures that all support volume is only accounted for once taking into consideration that the support column 1104 may not always be required up to the substrate 1102. FIG. 12 depicts the modified topology optimization algorithm 1200 for the multi-objective optimization approach, based on a variable density of a finite element 1202, with manufacturing constraint for support structure volume. Finite element analysis 1204 utilizes element density 1208 in a density filter 1210 to derive physical density 1212, which may serve as input to SIMP 1214. Based on this, an elastic modulus 1216, nodal deformation 1218, and compliance value 1220 are derived. The compliance value 1220 is utilized for optimization to minimize compliance and supports 1206, where compliance 1220 serves as the objective function for optimization to minimize compliance and supports 1222, which may be expressed by equation 7 as:

$$f(\tilde{x}) = w_1 \frac{c(\tilde{x})}{C_1} + w_2 \frac{s(\tilde{x})}{S_1} \quad (7)$$

Design densities may then be updated with a lower value of net compliance as a result of optimization 1224.

Results

The two manufacturing constraints and their integration with the topology optimization have been validated with the help of two case studies for each constraint. The results of the test cases for integration of a thin feature filter with topology optimization are discussed first, followed by the test cases for the integration of support minimization constraint. In order to validate the effectiveness of the manufacturing constraints, and to compare the conventional unconstrained topology optimized designs with the new ones, design analysis and quantification techniques may be used. These algorithms help identify the critical design features in any part design and assign a score to each part based on the superiority of the design for part buildability.

Test Cases for the Thin Feature Constraint

The manufacturing constraint for minimizing the number of thin features in topology optimization has been tested with the help of two case studies. A test case of a cantilever beam and another test case of an L-shaped bracket have been used for validation. Along with the comparative static structural analysis between constrained and unconstrained topology optimization designs, the designs have also been compared on the basis of the design analysis for part manufacturability.

Cantilever Beam

Figure 13:
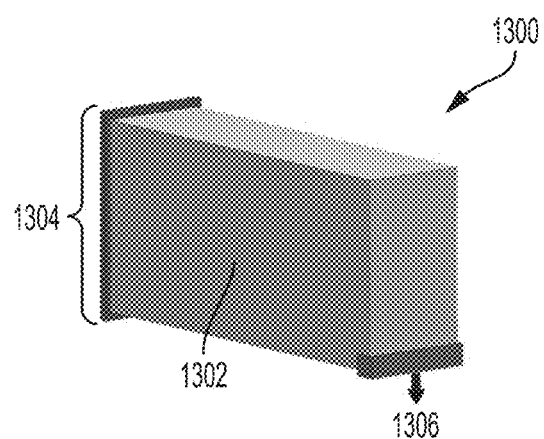
FIG. 13 depicts a diagram schematically illustrating a design space and boundary conditions for a cantilever beam, according to one or more embodiments shown and described herein.

The design space for topology optimization of a cantilever beam has been considered as a cuboid supported at one of the faces and loaded at the lower edge of the face opposite to the support face, as depicted by 1300 in FIG. 13 as a design space 1302 and boundary conditions for a cantilever beam test case, with a fixed support 1304 and a loading feature 1306. In this example, the design space 1302 has been subjected to topology optimization for compliance reduction with a target volume reduction of 90%. In other words, the desired volume of the optimized design may be equal to 10% of the volume of the design space 1302. Furthermore, for the constrained topology optimization, the threshold on the size of layer-wise cross sections of thin features has been considered as 8 units. Therefore, the radius of the primary neighborhood (R) has been taken as 4 units.

Figure 14:
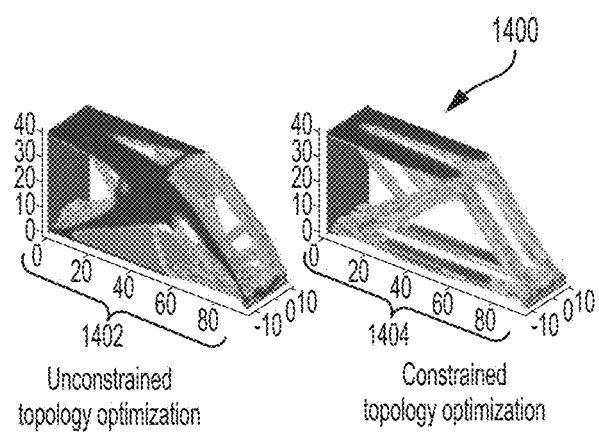
FIG. 14 depicts a computer rendered schematic illustrating design outputs of constrained and unconstrained topology optimization, according to one or more embodiments shown and described herein.
Figure 15:
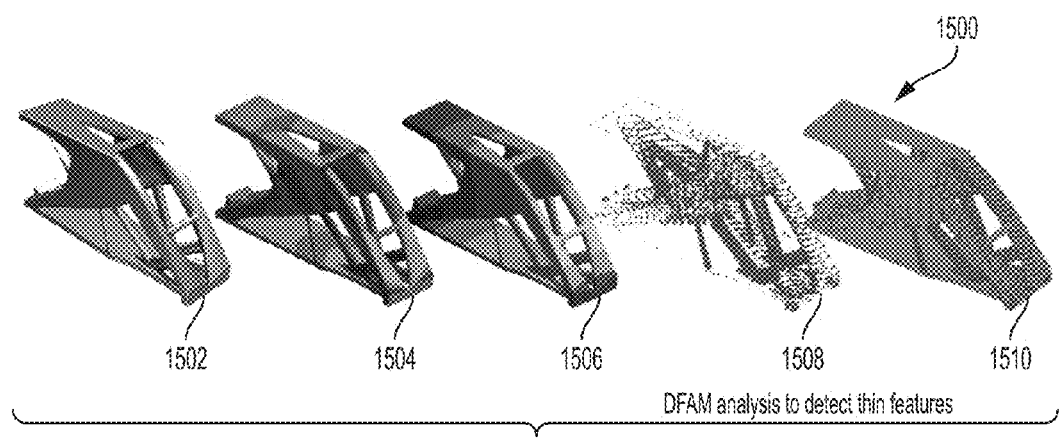
FIG. 15 depicts a computer rendered schematic illustrating structural analysis and manufacturability analysis of unconstrained topology optimization design, according to one or more embodiments shown and described herein.

The results of both the constrained and unconstrained topology optimization are depicted by 1400 in FIG. 14 as design outputs of constrained and unconstrained topology. Unconstrained topology optimization 1402 and constrained topology optimization 1404 are shown. These optimized designs may be in the form of voxel elements. From these results solid models have been created to subsequently perform the structural analysis on the designs. Also, a STereoLithography (STL) file has been created from the solid models and manufacturability scores for thin features may be obtained. FIG. 15 shows the solid model, the results of structural analysis and the results of manufacturability analysis on the unconstrained topology optimization design. FIG. 15 depicts structural analysis and manufacturability analysis of unconstrained topology optimization design 1500, including depictions of a CAD model 1502, stresses 1504, total displacement 1506, and based on Design for Additive Manufacturing (DFAM) analysis to detect thin features: critical regions in slice contours 1508, and critical regions shown on STL 1510.

Figure 16:
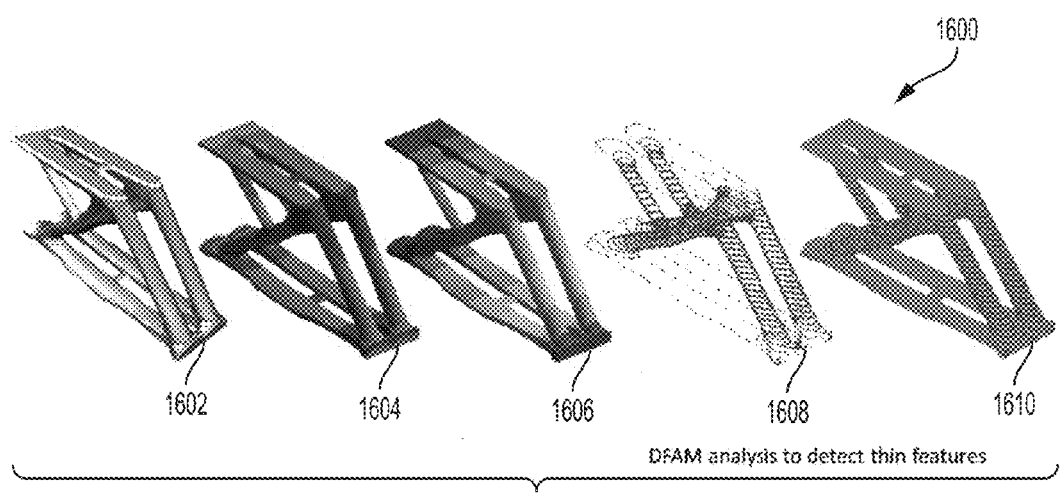
FIG. 16 depicts a computer rendered schematic illustrating structural analysis and manufacturability analysis of constrained topology optimization design, according to one or more embodiments shown and described herein.

FIG. 16 shows the solid model, the results of structural analysis as well as the manufacturability analysis for the constrained topology optimization design. FIG. 16 includes depictions of a CAD model 1602, stresses 1604, total displacement 1606, and based on DFAM analysis to detect thin features: critical regions in slice contours 1608, and critical regions shown on STL 1610. The maximum total deformation, maximum equivalent stress and the manufacturability score for thin features for both of the designs are tabulated in Table 1. It can be observed that the design of constrained optimization has better manufacturability score as compared to the unconstrained optimization. It can also be seen that the structural performance in terms of the maximum total deformation and maximum equivalent stress is not compromised in the constrained topology optimization, thus proving the efficiency of the manufacturing constraint.

TABLE 1

Comparative results for cantilever beam case study

| | Unconstrained Topology | DFAM Constrained Topology |
|---|---|---|
| Manufacturability score for thin features | 0.0834 | 0.8925 |
| Max. Total Deformation | $4.7 * 10^{-5}$ m | $5.8 * 10^{-5}$ m |
| Max. Equivalent Stress | 16 MPa | 20 MPa |

Lamp Bracket

Figure 17:
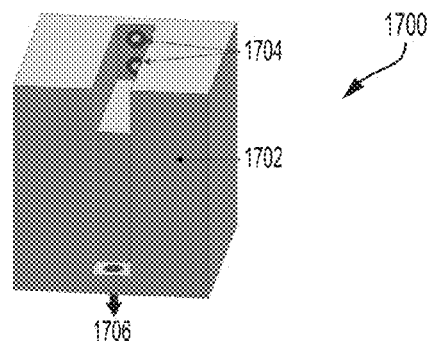
FIG. 17 depicts a diagram schematically illustrating design space and boundary conditions for an L-bracket test case, according to one or more embodiments shown and described herein.

The second test case of an L-shaped bracket has been formulated as topology optimization for compliance minimization with a target volume reduction of 95% as compared to the design space. FIG. 17 depicts 1700 a design space 1702 and boundary conditions for the L-bracket in which the two holes at the top are the fixed supports 1704 and the hole at the opposite lower corner is the loading feature 1706. The threshold on the size of thin features has been considered as 4 units and the radius of the primary neighborhood (R) has been taken as 2 units.

Figure 18:
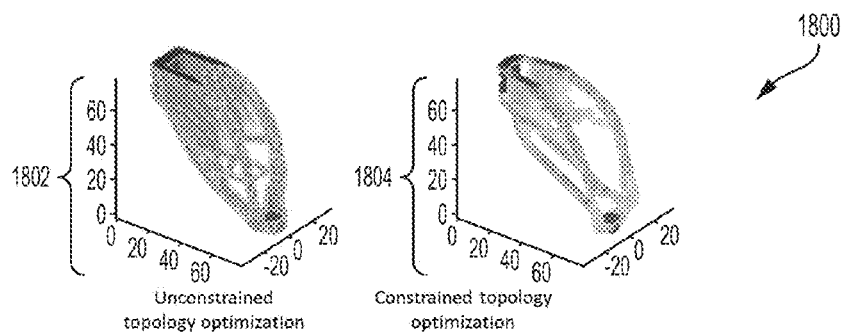
FIG. 18 depicts a computer rendering illustrating design outputs of constrained and unconstrained topology optimization, according to one or more embodiments shown and described herein.
Figure 19:
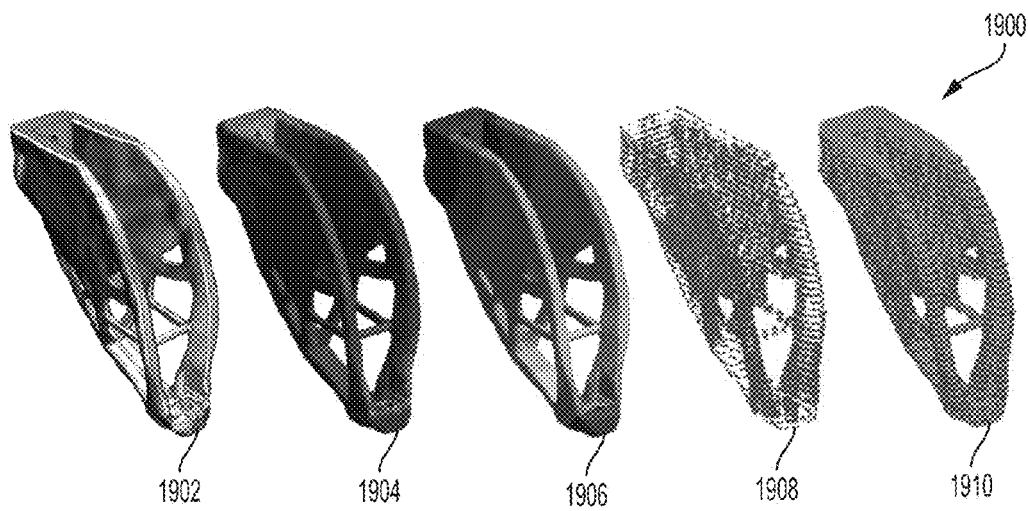
FIG. 19 depicts a computer rendering illustrating structural analysis and manufacturability analysis of unconstrained topology optimization design, according to one or more embodiments shown and described herein.
Figure 20:
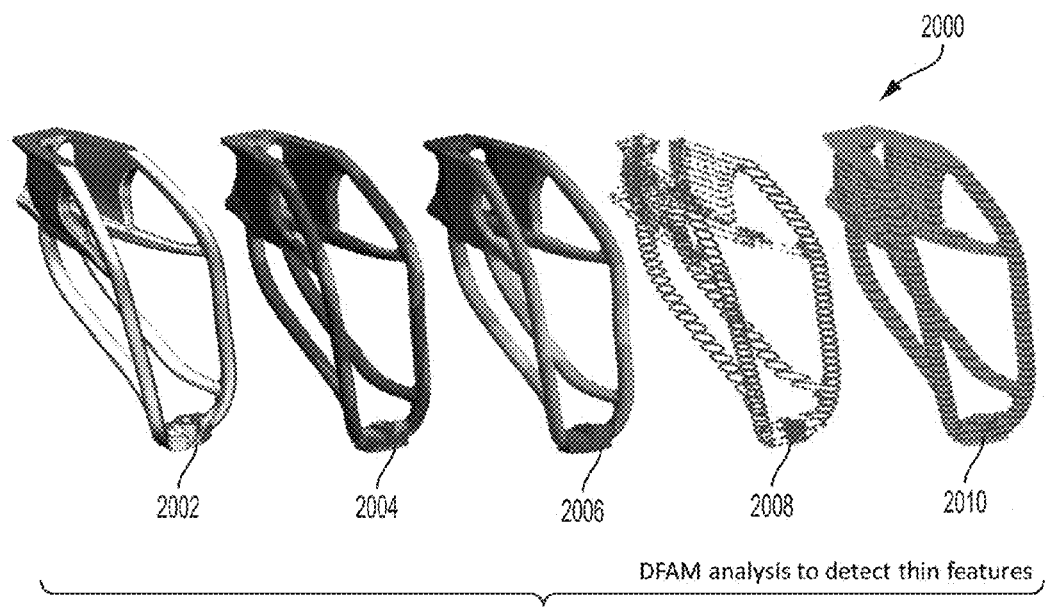
FIG. 20 depicts a computer rendering illustrating structural analysis and manufacturability analysis of constrained topology optimization design, according to one or more embodiments shown and described herein.

FIG. 18 depicts the optimized outputs 1800 of the constrained topology optimization 1804 and unconstrained topology optimization 1802. From these results solid models may be created and structural analysis performed on the designs. Manufacturability analysis has also been performed on the STL of the optimized designs and manufacturability scores for thin features have been calculated. The unconstrained topology optimized design along with its structural analysis and manufacturability analysis of unconstrained topology optimization design are shown in FIG. 19. Depicted in FIG. 19 are a CAD model 1902, stresses 1904, total displacement 1906, and based on DFAM analysis to detect thin features: critical regions in slice contours 1908, and critical regions shown on STL 1910. FIG. 20 shows the solid model, structural analysis and the manufacturability analysis, for the constrained topology optimization design. Depicted in FIG. 20 are a CAD model 2002, stresses 2004, total displacement 2006, and based on DFAM analysis to detect thin features: critical regions in slice contours 2008, and critical regions shown on STL 2010. The maximum total deformation, maximum equivalent stress and the manufacturability score for thin features for both the designs are tabulated in Table 2. Improvement in the manufacturability of the topology optimized design can be observed from the increase in a manufacturing score after introducing the constraint.

TABLE 2

Comparative results for L-shaped bracket case study

| | Unconstrained Topology | DFAM Constrained Topology |
|---|---|---|
| Manufacturability score for thin features | 0.0778 | 0.7591 |
| Max. Total Deformation | $1.3 * 10^{-5}$ m | $1.2 * 10^{-5}$ m |
| Max. Equivalent Stress | 56.97 MPa | 58.83 MPa |

Both of the case studies show up to a ten-fold improvement in the manufacturability of the optimized designs.

Test Cases for Support Structure Volume Constraint

The proposed support structure reduction methodology has been tested on two case studies, the first of which being a simple cantilever beam with a vertical load on the far bottom edge and the second being a bracket designed to hold a lateral load on one of its vertical faces. In addition to the static structural analysis, the constrained and unconstrained topology optimization designs have also been compared on the basis of the support structure volume. For both test cases, the weights in the multi-objective function may be set to different combinations in order to vary and observe the effect of the support reduction filter. The weights independently range from 1 to 5 and in combinations as $(w_1, w_2)$=(5, 1), (2, 1), (1, 1), (1, 2), (1, 5), respectively in the order of increasing relative weight of the support volume function.

Cantilever Beam

Figure 21:
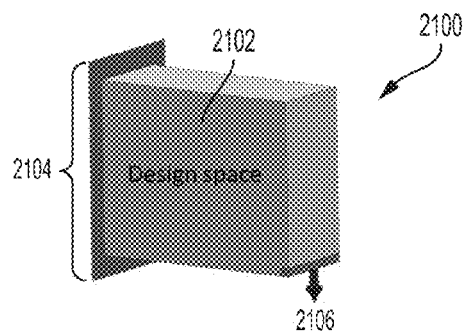
FIG. 21 depicts a computer rendering illustrating a design space and boundary conditions for a cantilever beam, according to one or more embodiments shown and described herein.
Figure 22:
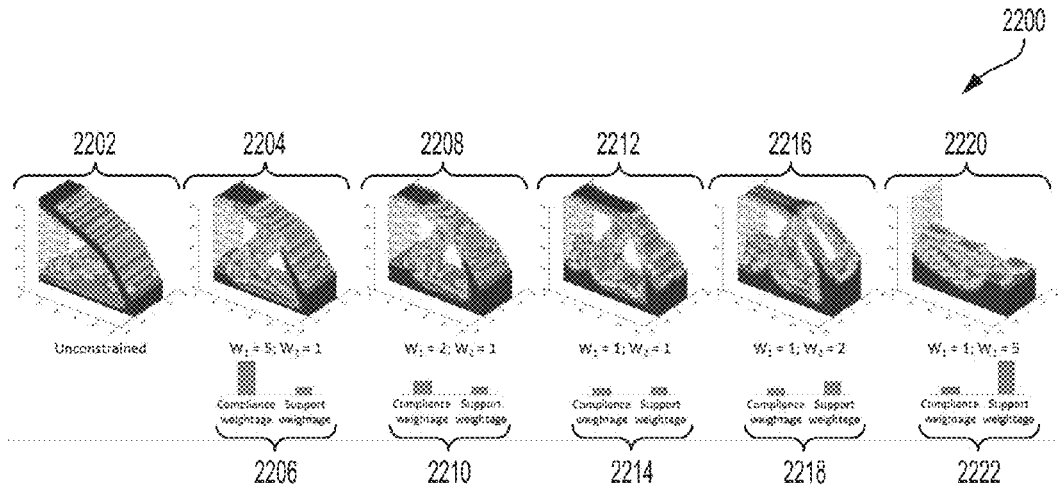
FIG. 22 depicts a computer rendering illustrating outputs of topology optimization for different combinations of weights for compliance and support volume, according to one or more embodiments shown and described herein.
Figure 23:
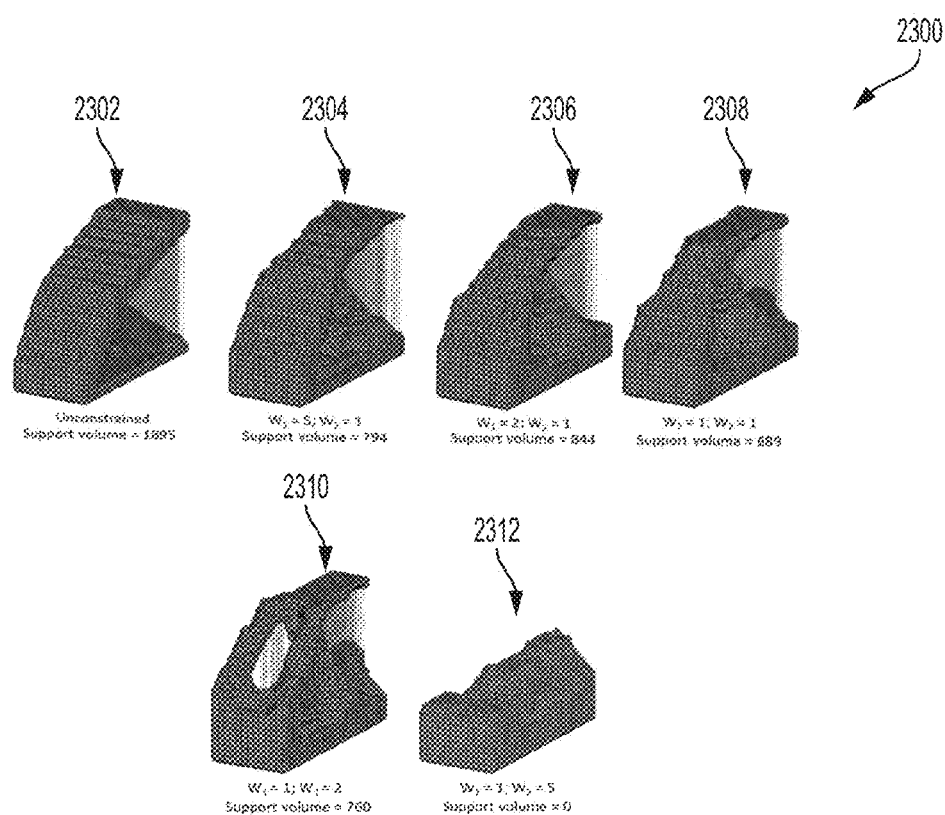
FIG. 23 depicts a computer rendering illustrating STL models of topology optimization results for different combinations of weights for compliance and support volume, according to one or more embodiments shown and described herein.

Cantilever beam has been used for the first test case to validate the support minimization constraint in topology optimization. FIG. 21 shows 2100 the design space 2102 along with the boundary conditions, along with a fixed support 2104 and a loading feature 2106. The reduction in total part volume has been targeted at 60% of the volume of the design space. For the aforementioned sets of weights, topology optimization gives different outputs depending on the values of the weights. FIG. 22 shows 2200 voxel element representations (2202, 2204, 2208, 2212, 2216, and 2220) of the different outputs of topology optimization, specifically different combinations of weights for compliance and support volume (2206, 2210, 2214, 2218, and 2222). FIG. 23 shows 2300 the iso-surface representation of the topology optimization outputs (2302, 2304, 2306, 2308, and 2310) for different combinations of weights for compliance and support volume. The iso-surface comprising of the STL facets may be used to calculate the volume of support structure. It has been observed that as the weight of the support function increases, the support requirement decreases, proving the effectiveness of the optimization process in reducing the support necessity for the part geometry.

Figure 24:
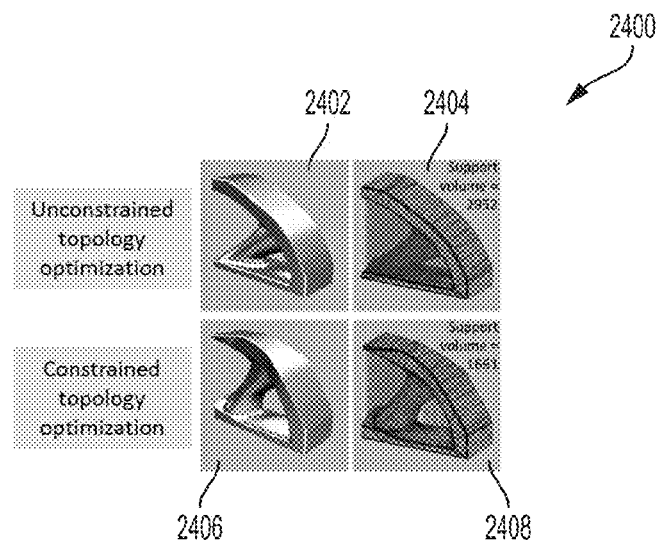
FIG. 24 depicts a computer rendering illustrating support volume for optimized parts, according to one or more embodiments shown and described herein.

For further analysis, smoothened solid part models have been created from the outputs of unconstrained topology optimization as well as constrained topology optimization with $w_1$=5 and $w_2$=1. FIG. 24 shows 2400 the support volume for the optimized parts and the support volume required by the smoothened solid models of the parts. Unconstrained topology optimization is depicted in 2402, 2404, and constrained topology optimization is depicted in 2406, 2408. The unconstrained topology optimized part requires a support volume of 2952 mm$_3$ and the constrained topology optimized part requires a support volume of 1661 mm$_3$, which shows a 44% reduction in support volume.

Figure 25:
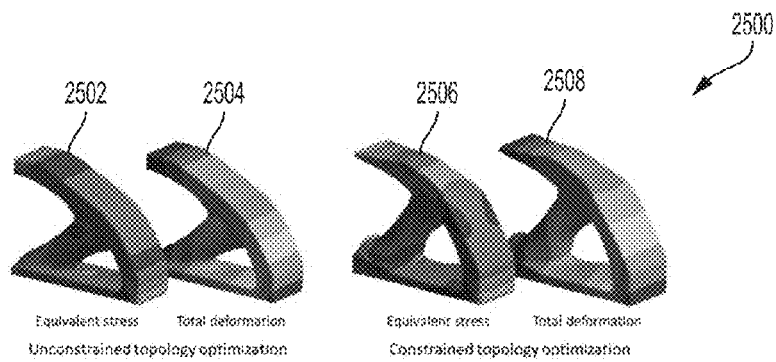
FIG. 25 depicts a computer rendering illustrating structural analysis of optimized designs, according to one or more embodiments shown and described herein.

Furthermore, static structural analysis for optimized designs has been performed on the part models as shown in FIG. 25. This includes depictions 2500 of unconstrained topology optimization (equivalent stress 2502 and total deformation 2504) and constrained topology optimization (equivalent stress 2506 and total deformation 2508). All of the results for unconstrained and constrained ($w_1$=5 and $w_2$=1) topology optimization are tabulated in Table 3.

TABLE 3

Comparative results for cantilever beam case study

| | Unconstrained Topology Optimization | DFAM Constrained Topology |
|---|---|---|
| Volume of support structures | 2952 mm$^3$ | 1661 mm$^3$ |
| Max. Total Deformation | $1.16 * 10^{-5}$ m | $1.25 * 10^{-5}$ m |
| Max. Equivalent Stress | 110.5 MPa | 109.3 MPa |

Lateral Bracket

Figure 26:
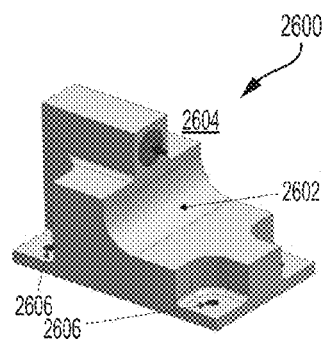
FIG. 26 depicts a computer rendering illustrating design space and boundary conditions for a lateral bracket, according to one or more embodiments shown and described herein.
Figure 27:
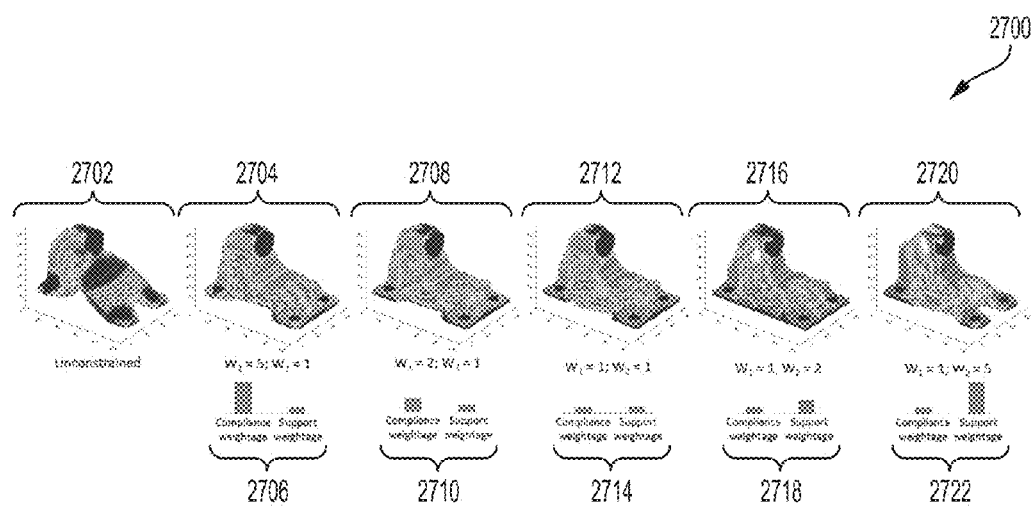
FIG. 27 depicts a computer rendering illustrating outputs of topology optimization for different combinations of weights for compliance and support volume, according to one or more embodiments shown and described herein.
Figure 28:
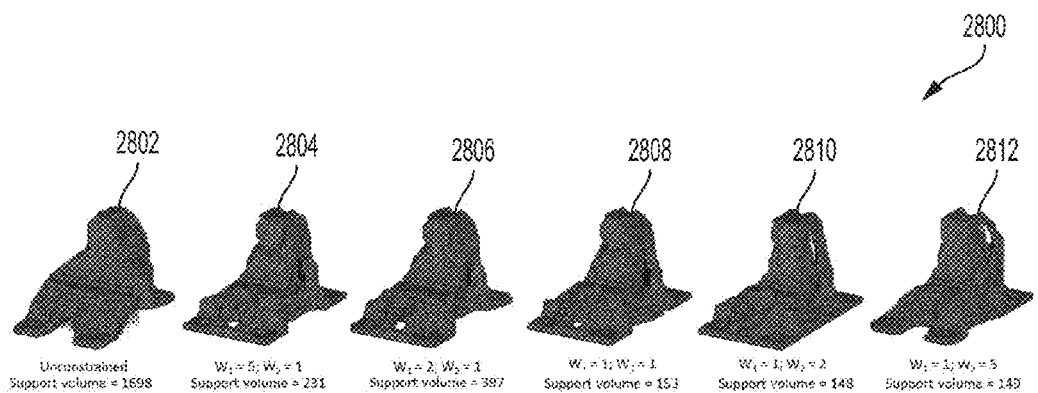
FIG. 28 depicts a computer rendering illustrating STL models of topology optimization results for different combinations of weights for compliance and support volume, according to one or more embodiments shown and described herein.

For the second test case for support structure constraint, a lateral bracket has been used in topology optimization. FIG. 26 shows 2600 the design space 2602 and the boundary conditions that define the topology optimization problem for the lateral bracket. Also depicted are a fixed support 2606 and a loading feature 2604. The reduction in total part volume has been targeted at 80% of the volume of the design space. FIG. 27 shows 2700 voxel element representations (2702, 2704, 2708, 2712, 2716, and 2720) of the different outputs of topology optimization from different combinations of weights for compliance and support volume (2706, 2710, 2714, 2718, and 2722). Similar to the case of cantilever beam, support volume has been calculated for the iso-surface output of unconstrained topology optimization as well as constrained topology optimization with aforementioned weight combinations for compliance and support volume (2802, 2804, 2806, 2808, 2810, and 2812), as shown 2800 in FIG. 28. This test case also supports the previous observation that as the weight of the support function increases, the support structure requirement decreases.

Figure 29:
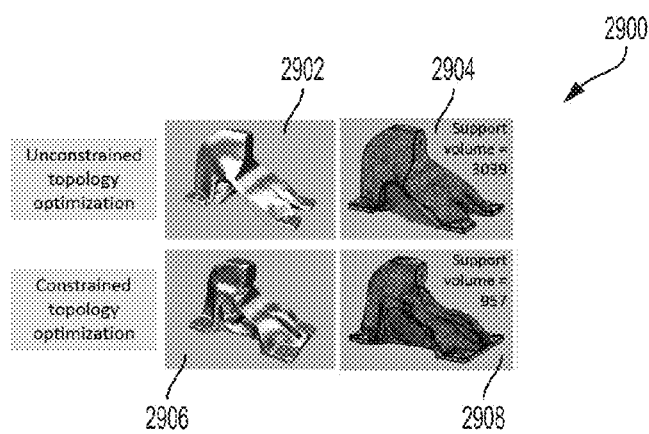
FIG. 29 depicts a computer rendering illustrating support volume for optimized parts, according to one or more embodiments shown and described herein.

Solid models have been created from the outputs of unconstrained topology optimization and constrained topology optimization with weights $w_1$=5 and $w_2$=1. In this case, the support volume drops by 68% in the constrained topology optimization as compared to the unconstrained one, as shown in FIG. 29. Unconstrained topology optimization is depicted in 2902, 2904, and constrained topology optimization is depicted in 2906, 2908.

Figure 30:
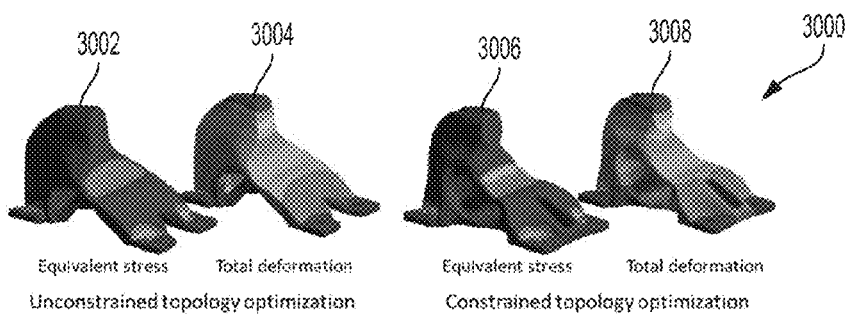
FIG. 30 depicts a computer rendering illustrating structural analysis of optimized designs, according to one or more embodiments shown and described herein.

A static structural analysis has also been performed on the part models as shown in FIG. 30. This includes depictions 3000 of unconstrained topology optimization (equivalent stress 3002 and total deformation 3004) and constrained topology optimization (equivalent stress 3006 and total deformation 3008). All the results for unconstrained and constrained ($w_1$=5 and $w_2$=1) topology optimization are tabulated in Table 4.

TABLE 4

Comparative results for lateral bracket case study

| | Unconstrained Topology Optimization | DFAM Constrained Topology |
|---|---|---|
| Volume of support structures | 3039 mm$^3$ | 957 mm$^3$ |
| Max. Total Deformation | $1.02 * 10^{-5}$ m | $1.10 * 10^{-5}$ m |
| Max. Equivalent Stress | 210.5 MPa | 209.0 MPa |

Image Processing Assisted Tools for Pre- and Post-Processing Operations in Additive Manufacturing AM or 3D printing is a layer-by-layer manufacturing process. The process is gaining popularity and is becoming a mainstream manufacturing process for complex and custom geometries of aerospace components and medical devices (EWI, 2015). The STL file is the de-facto industry standard for almost all the AM/3D printing machines manufacturing components using various additive processes such as Direct Metal Laser Sintering (DMLS), Fused Deposition Modelling (FDM), and Stereolithography (SLA) (Leong et al., 1996).

The STL file is a triangular mesh representation of the CAD geometry represented as NURBS surfaces and thus there is always some approximation error associated with CAD to STL conversion. This approximation error subsequently translates into part GD&T errors such as flatness, cylindricity, and profile error. During the conversion of CAD geometry to an STL file, there is also the possibility of loss of geometric data that may result in the generation of a corrupt STL file (Grimm, 2004). These defects may either render the STL file useless or manufacture a faulty part.

Slicing the CAD geometry directly eliminates the CAD to STL conversion step in the AM/3DP process and thus eliminates the errors and pitfalls associated with this conversion. Direct CAD slicing is computationally expensive and a time consuming process. Presented herein is a novel and fast Image Processing based slicer, IPSlicer, for directly slicing the CAD geometry within the CAD software. All additive processes start with modelling the part to be manufactured in CAD software, followed by conversion to an STL file. The STL file geometry is then sliced normal to the build direction to generate 2D slice contours (Kulkarni et al., 2000). The proposed IPSlicer captures sectional image snapshots, extracts a sectional 2D bounding box of CAD geometry and uses a Contour Mapping Algorithm (CMA) to generate slice contour points. These slice contour points can subsequently be used to generate a G-Code/CLI file to manufacture the part. The effectiveness of IPSlicer is verified by virtually manufacturing test parts and checking the GD&T errors of these parts using published computational metrology algorithms.

Subsequently, support removability analysis may be performed using color-based segmentation on sectional image snapshots of the part and supports followed by a pixel traversal approach. The segmented image and 2D bounding box data from previous analysis may be also used to calculate a sintering area and time for each layer and the complete part model. In the last tool, an image processing algorithm may be used to identify sharp corners in geometry which may be difficult to manufacture. Based on the developed algorithms, 1-click tools 100 in FIG. 31 have been developed in CAD software.

Figure 31:
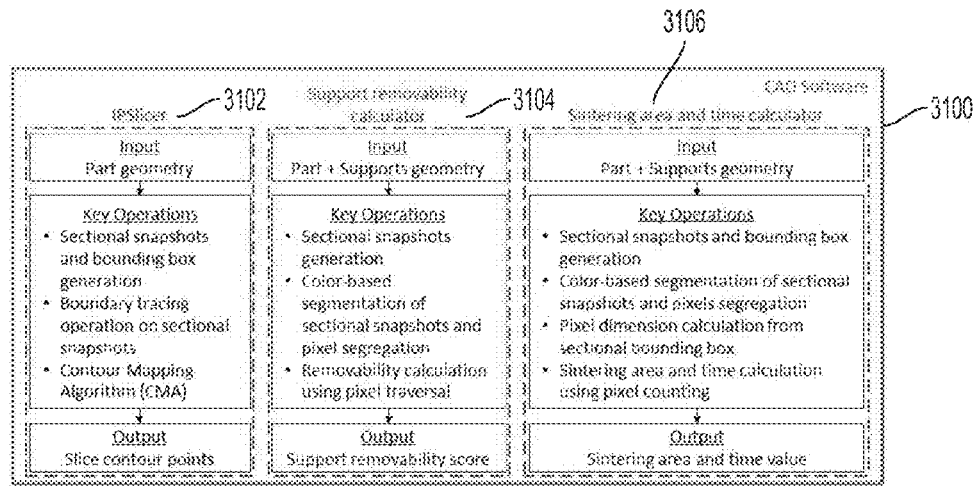
FIG. 31 depicts a diagram schematically illustrating structure of image processing assisted tools, according to one or more embodiments shown and described herein.

FIG. 31 depicts the methodology, steps and the flow of the algorithm for each of the three image processing (IP) based tools (IPSlicer 3102, Support Removability Calculator 3104, and Sintering Area and Time Calculator 3106) described herein. The methods and tools developed herein may be applicable to all metal powder bed fusion processes such as Direct Metal Laser Sintering (DMLS) or Direct Metal Laser Melting (DMLM) processes.

The next section highlights a brief literature review of the research carried out in the field of STL errors, input file modifications, direct CAD slicing, removability of support structures in AM, and sintering area and time calculations associated with AM. Following this section, methodology and implementation of the proposed tools are explained. The algorithms are tested on a variety of test parts to validate the tools.

Literature Review

STL File Defects and Input File Modifications

Figure 32:
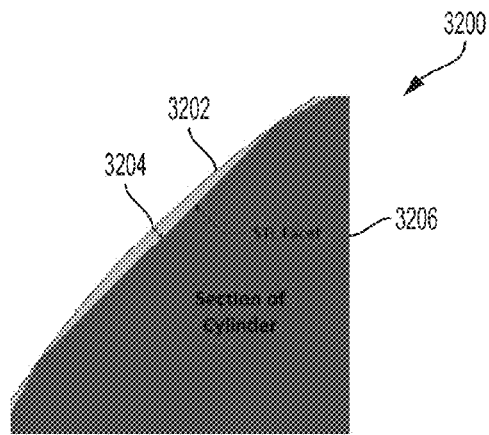
FIG. 32 depicts a diagram schematically illustrating CAD to STL conversion error, according to one or more embodiments shown and described herein.

STL file is an approximation of CAD geometry using triangular planar facets. This approximation leads to the introduction of chordal error 3204 as shown in FIG. 32 (Fadel and Kirschman, 1996), which depicts 3200 a CAD surface 3202 and an STL facet 3206 as part of a CAD to STL conversion error. An STL file does not store any topological data associated with the geometry. Thus, during the conversion of CAD geometry to STL file, there is a possibility of introduction of errors such as inverted surface normal, missing facets or gaps, degenerate facets, overlapping facets, and non-manifold conditions (Grimm, 2004), (Leong et al., 1996).

The inventors have performed prior work to reduce the chordal error through development of alternate file formats for AM and STL file modification. (Paul and Anand, 2015) have developed a bi-quadratic Bezier patch and Steiner patch based alternate input file formats for better approximation of CAD surfaces. (Navangul et al., 2013), (Zha and Anand, 2015) have developed algorithms for increasing facet density in STL file locally and adaptively based on GD&T errors.

Direct CAD Slicing

The errors associated with CAD to STL conversion can be eliminated by manufacturing parts directly from the CAD model. (Guduri et al., 1993) presented a mathematical approach for generating exact contour files from CSG representation. (Starly et al., 2005) proposed a ray-casting based approach for slicing NURBS surfaces in a STEP format. Direct CAD slicing within a CAD software has been reported previously. (Rajagopalan et al., 1995) used the plane and model surface intersection function within I-DEAS to generate cross-sectional profiles of the object. (Jamieson and Hacker, 1995) reported an approach for adaptive direct slicing by using software calls to Parasolid kernel of Unigraphics. (Cao and Miyamoto, 2003) performed direct slicing operation within AutoCAD and saved the slice data in a DXF file using lines, arcs and circles. (Sunanon et al., 2005) used an image processing technique in rapid prototyping for identification of layer thickness.

The IPSlicer presented herein uses image processing algorithms for generating slice contour points. The methodology is computationally inexpensive and can be implemented in any of the CAD software with minor changes. To prove the concept, it may be implemented in an open-source (FreeCAD, 2015) as well as in commercial CAD software (Siemens PLM Software, 2015).

Support Structures Removability Analysis

The concept of accessibility for conventional manufacturing processes such as milling and injection molding has been reported extensively. (Woo, 1994) extended the concept of Gaussian maps to develop visibility maps which categorize manufacturing processes based on point, line and surface visibility. (Bassi and Bedi, 2013) calculated accessibility of each surface of injection molded component in candidate parting direction using image processing and then determined undercut-free parting direction.

The inventors' research group, (Samant, 2015) used a hierarchical octree data structure to determine the accessibility of support structures for removal. An algorithm is proposed herein which identifies the accessibility of support structures for removal by capturing sectional snapshots of CAD model followed by image processing based algorithms.

Sintering Area and Time Calculation (Paul and Anand, 2012) presented an optimization model for minimizing the laser energy in SLS process by formulating the laser energy as a function of Total Area of Sintering (TAS). They proposed a convex hull based approach for calculation of TAS. In the current research, slice sintering area and time may be calculated using run-length encoding of sectional image snapshot data.

Methodology

The methodology section is sub-divided into three different sections wherein each sub-section explains the algorithm and steps of each tool to be adapted in CAD software.

Direct CAD Slicing Using Image Processing Algorithms: IPSlicer

Figure 33:
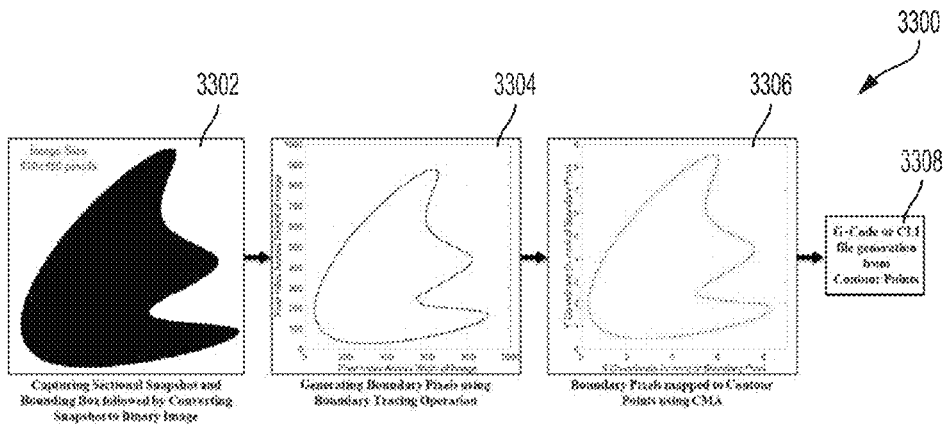
FIG. 33 depicts a diagram schematically illustrating a working principle of IPSlicer, according to one or more embodiments shown and described herein.

A typical AM/3DP process follows the following three steps: geometry slicing, toolpath generation and translating toolpath into machine instructions (Topçu et al., 2011). The proposed IPSlicer performs the first step of geometry slicing. The working principle of the IPSlicer is explained in FIG. 33. To start with, the IPSlicer captures the sectional image snapshot, extracts a sectional 2D bounding box within the CAD software and converts the sectional snapshot into a binary image at 3302. In the next step, a boundary tracing operation 3304 may be performed on the captured snapshot to identify boundary pixels. In the last step, using a Contour Mapping Algorithm (CMA) at 3306, the boundary pixels may be mapped to contour points in XYZ co-ordinate space. At 3308, G-Code or CLI file generation is performed based on the contour points. The entire process may be repeated for all layers of the part which may be separated by the defined slice thickness along the build direction.

Sectional Snapshots and Extraction of Bounding Box Data (Step 1)

Figure 34:
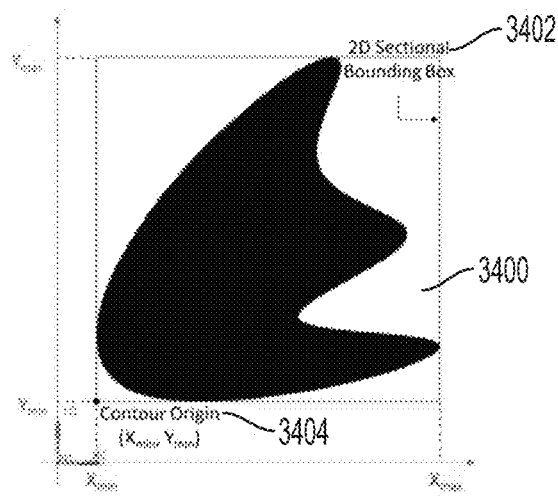
FIG. 34 depicts a diagram schematically illustrating a two-dimensional sectional bounding box of actual contour, according to one or more embodiments shown and described herein.

The IPSlicer may be initiated by importing the CAD model of the part to be manufactured and defining process parameters such as build direction and slice thickness. In the next step, the bounding box for the entire part, sectional image snapshots that mimic slicing, and sectional bounding box at each slice thickness level along the build direction (+Z in this research) may be generated within the CAD software. All CAD software have the capability to generate a sectional view for the geometry within the graphic window. As depicted by 3400 in FIG. 34, using the screen capture feature of the CAD software, the sectional image snapshots can be generated. Similarly, a sectional 2D bounding box 3402 which represents limits of section contour in X+, X−, Y+, and Y− direction may be captured along with contour origin 3404. These limits may be denoted as $X_{min}$, $X_{max}$, $Y_{min}$, and $Y_{max}$. These operations may be performed in an open-source FreeCAD 0.15 software (FreeCAD, 2015) as well as in Siemens NX 10 (Siemens PLM Software, 2015). The process of sequential snapshot and bounding box data capture at each incremental slice thickness level may be automated using, by way of non-limiting example, python based FreeCAD API (Riegel et al., 2013) for FreeCAD and NX Open API (Siemens PLM Software, 2014) for Siemens NX.

Boundary Tracing Operation (Step 2)

AM machines or 3D printers may be driven by G-Codes or CLI file, which stores the information about toolpath at each layer. The toolpath for each layer can be determined from the sectional boundary points for that layer. To generate the sectional boundary points, we need boundary pixels for the sectional snapshot generated in Step 1.

Figure 35A:
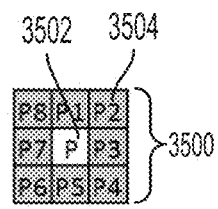
FIG. 35a depicts a diagram schematically illustrating Moore-neighborhood traversal for a pixel, according to one or more embodiments shown and described herein.

Boundary pixels may be identified using Moore-neighbor tracing algorithm modified by Jacob's stopping criteria (Ghuneim, 2015), (Gonzalez et al., 2004). Since this algorithm operates on a binary image (image having a pixel value of either 0—white or 1—black), the sectional image snapshot captured in Step 1 may be first converted to a binary image using simple binary thresholding. The Moore-neighborhood of a pixel 3502 is depicted by 3500 in FIG. 35a and it includes 8 neighboring pixels 3504 which are in contact with a given pixel 3502 (Ghuneim, 2015).

Figure 35B:
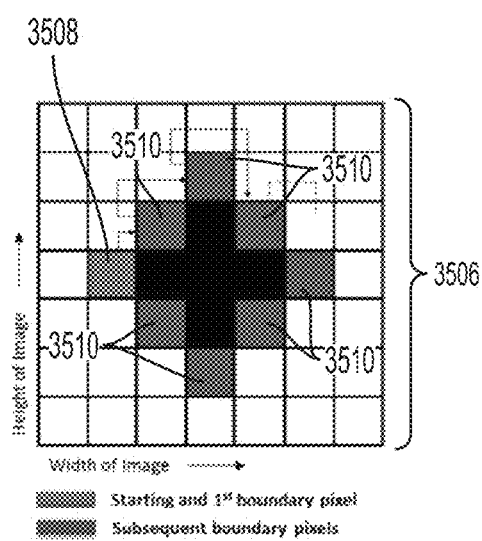
FIG. 35b depicts a diagram schematically illustrating the Moore-neighborhood tracing algorithm, according to one or more embodiments shown and described herein.
Figure 36:
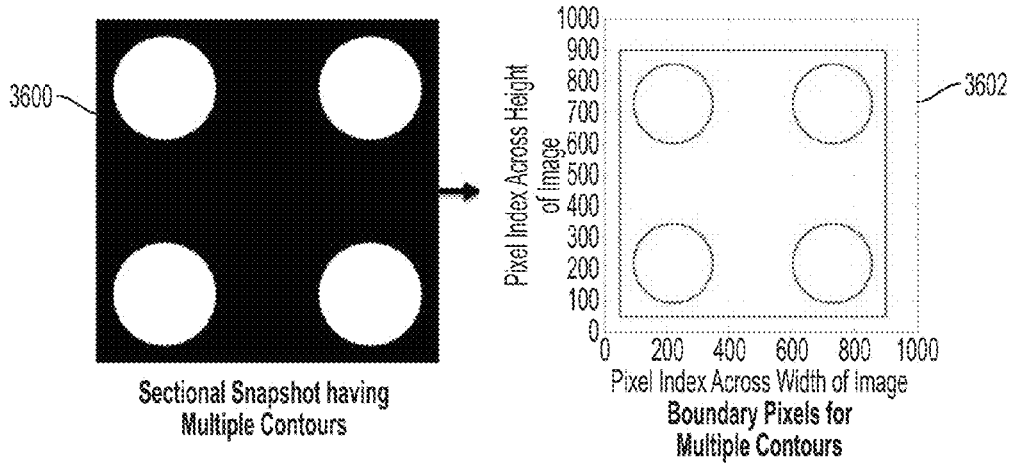
FIG. 36 depicts a diagram schematically illustrating, according to one or more embodiments shown and described herein.

In the Moore-neighbor tracing algorithm, a starting black (1) pixel is identified by raster scanning across the length and width of an image until a black pixel is identified. Once the starting pixel is identified, traversal in the Moore neighborhood of that pixel in a clockwise direction is performed. During traversal if a black pixel is encountered, the white pixel just prior to that black pixel is marked as a backtracking pixel and the black pixel is marked as next boundary pixel. Moore-neighborhood traversal is continued on the newly identified boundary pixel from the backtracking pixel. This process is repeated until the starting boundary pixel is encountered for at least two times (Ghuneim, 2015), (Gonzalez et al., 2004). The algorithm is depicted by 3506 in FIG. 35b with a starting and first boundary pixel 3508, along with subsequent boundary pixels 3510. This algorithm is capable of generating boundary pixels for single or multiple contours present in an image as shown in FIG. 36. This includes a sectional snapshot having multiple contours 3600 and boundary pixels for multiple contours 3602.

Contour Mapping Algorithm (Step 3)

Figure 37:
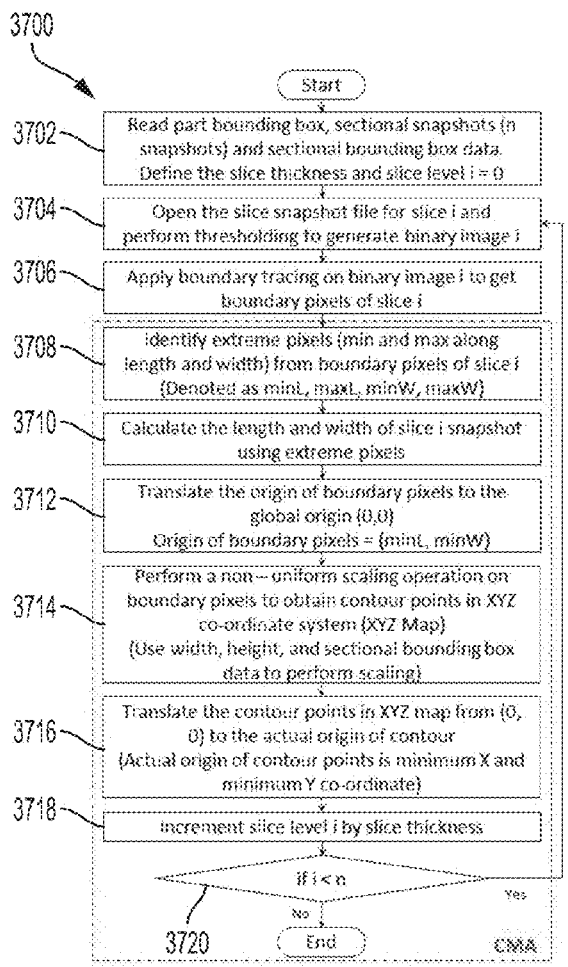
FIG. 37 depicts a flowchart for a Contour Mapping Algorithm illustrating, according to one or more embodiments shown and described herein.

The boundary pixels identified in Step 2 may be stored in an array based on the length and width indices of these pixels. But for G-Code/CLI file generation, the location of sectional boundary points in XYZ co-ordinate space may be needed. Contour Mapping Algorithm (CMA) performs the operation of converting pixel data to XYZ co-ordinate data. CMA in conjunction with Step 1 and Step 2 forms the IPSlicer module. CMA is explained with the help of the flowchart 3700 shown in FIG. 37. At 3702 bounding box data, sectional snapshots, sectional bounding box data, and a defined slice thickness value are read. Slice thickness is defined, along with slice level i=0. At 3704, a slice snapshot file is opened for current slice i and thresholding is performed to generate a binary image i of the current slice. At 3706, boundary tracing is applied on the binary image i to obtain boundary pixels of the current slice i. At 3708, extreme pixels (min and max along length and width) are identified from boundary pixels of the current slice i (minL, maxL, minW, maxW). At 3710, length and width of the current slice i snapshot are calculated using extreme pixels. At 3712, the origin of the boundary pixels is translated to the global origin (0, 0), where origin of boundary pixels=(minL, MinW). At 3714, a non-uniform scaling operation is performed on at least some of the boundary pixels to obtain contour points in the XYZ co-ordinate system (XYZ map) using width, height, and sectional bounding box data to perform scaling. At 3716, the object contour points are translated in the XYZ map from (0, 0) to the actual origin of contour (actual origin of contour points is minimum X and minimum Y coordinates) of the object. At 3718, the slice level i is incremented by slice thickness. At 3720, if I<n number of snapshot, CMA returns to 3702 for the next slice level i. Otherwise, CMA ends.

The data generated after performing operations in Step 1 and Step 2 may be passed to the CMA. Based on the slice thickness, build direction and bounding box data of the entire geometry, the total number of slices (i.e., total number of snapshots) may be obtained as follows:

$$No.\, of\, Slices/Snapshots = \frac{Total\ build\ height}{Slice\ thickness} \quad (8)$$

Figure 38:
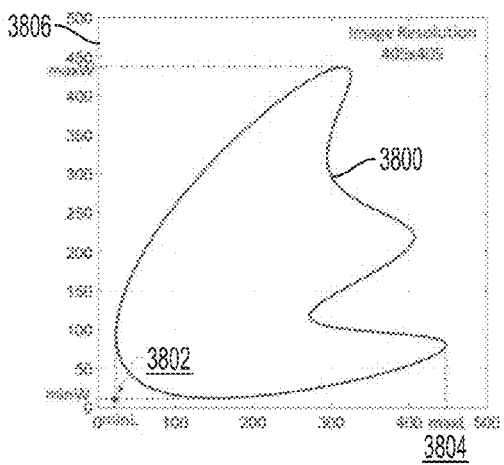
FIG. 38 depicts a diagram schematically illustrating extreme pixels from boundary pixels, according to one or more embodiments shown and described herein.

CMA starts with identification of extreme pixels among boundary pixels across the length and width of a sectional snapshot ($i^{th}$ layer of build) as shown in FIG. 38, which depicts the combined effect of primary and secondary neighborhoods and effective neighborhood size. These may be the pixels that have their length and width indices at either minimum or maximum. These indices may be denoted as minL, maxL, minW, and maxW. Using these indices, the length and width of contour in a snapshot may be calculated as follows:

$$\text{Length of contour in a snapshot of } i^{th} \text{ layer} = abs(maxL - minL) \quad (9)$$

$$\text{Width of contour in a snapshot of } i^{th} \text{ layer} = abs(maxW - minW) \quad (10)$$

In the next step (referring to the depiction 3800 of FIG. 38), the origin of boundary pixels 3802 (and the rest of the boundary pixels relative to it) may be translated to the global origin (0, 0) with respect to the pixel index across width 3804 and the pixel index across height 3806 of the image. The origin of boundary pixels 3802 may be the point of intersection of horizontal and vertical line passing through point corresponding to minL and minW respectively. The translation matrix to perform this operation may be represented as:

$$Tr_{(i)} = \begin{bmatrix} 1 & 0 & 0 & 0 \\ 0 & 1 & 0 & 0 \\ 0 & 0 & 1 & 0 \\ -minL & -minW & 0 & 1 \end{bmatrix} \quad (11)$$

Once all the boundary pixels 3802 are translated such that origin of these pixels lie at the global origin, non-uniform scaling operation may be performed on the boundary pixels as the next step to map the pixel data to actual XYZ co-ordinates. Using the extreme pixel indices and sectional bounding box data obtained in Step 1, scaling factors to convert pixel data to XYZ co-ordinates may be calculated as follows:

$$X \text{ axis scaling factor}(Sx_{(i)}) = \quad (12)$$
$$\frac{\text{Length of contour in a snapshot of } i^{th} \text{ layer}}{Dim.\text{ of actual contour of } i^{th} \text{ layer along } X \text{ axis}} = \frac{maxL - minL}{X_{max} - X_{min}}$$

$$Y \text{ axis scaling factor}(Sy_{(i)}) = \quad (13)$$
$$\frac{\text{Width of contour in a snapshot of } i^{th} \text{ layer}}{Dim.\text{ of actual contour of } i^{th} \text{ layer along } Y \text{ axis}} = \frac{maxW - minW}{Y_{max} - Y_{min}}$$

and the corresponding scaling matrix $$S_{(i)} = \begin{bmatrix} Sx_{(i)} & 0 & 0 & 0 \\ 0 & Sy_{(i)} & 0 & 0 \\ 0 & 0 & 1 & 0 \\ 0 & 0 & 0 & 1 \end{bmatrix} \quad (14)$$

The scaling operation results in the slice contour points in XYZ co-ordinate space with the origin of this point set as a global origin, i.e., (0, 0). This may not be the case for actual contour points. Thus a subsequent inverse translation operation may be performed on these scaled points such that the origin of contour points coincide with actual contour origin. The actual contour origin may be ($X_{min}$, $Y_{min}$) as shown in 3404 of FIG. 34. The inverse translation matrix may be represented as:

$$ITr_{(i)} = \begin{bmatrix} 1 & 0 & 0 & 0 \\ 0 & 1 & 0 & 0 \\ 0 & 0 & 1 & 0 \\ X_{min} & Y_{min} & 0 & 1 \end{bmatrix} \quad (15)$$

Thus, if matrix $P_{CPixels(i)}$ contains slice contour pixel data for $i^{th}$ layer, the matrix $P_{CPoints(i)}$ containing the slice contour XYZ co-ordinate points for the $i^{th}$ layer, can be obtained from equation 16 as follows:

$$P_{CPoints(i)} = P_{CPixels(i)} \times T_{(i)} \times S_{(i)} \times ITr_{(i)} \quad (16)$$

The point data set obtained after inverse translation operation may be the actual points lying on the sectional contours of the CAD surface. CMA when applied iteratively on all sectional snapshots, generates a set of contour points at each slice thickness level. These points lie on an actual CAD surface and thus can be used for G-code/CLI file generation and subsequently to manufacture the part.

Support Structure Removability Calculator Using Image Processing

Figure 39:
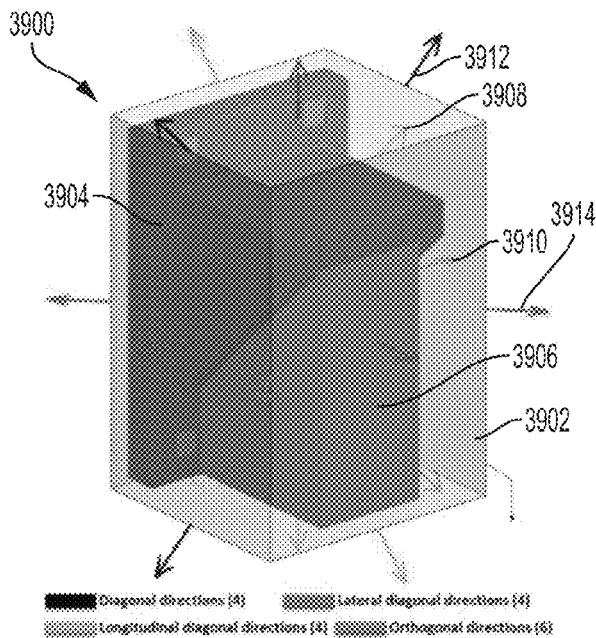
FIG. 39 depicts a diagram schematically illustrating directions considered for removability analysis of supports, according to one or more embodiments shown and described herein.
Figure 40:
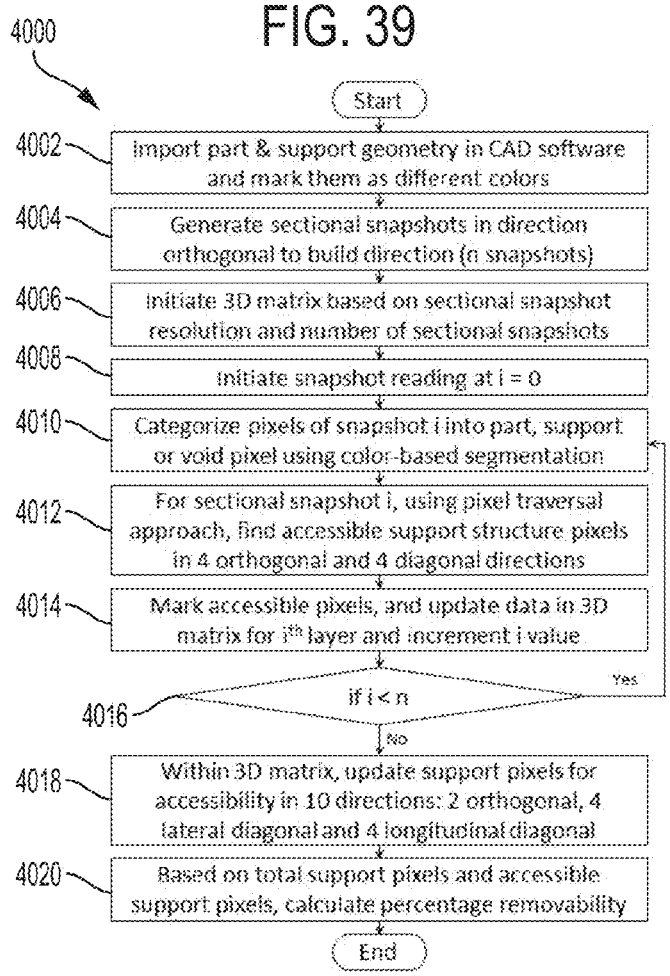
FIG. 40 depicts a flowchart of a supports removability calculator, according to one or more embodiments shown and described herein.

In this section the sectional snapshot capture method may be integrated with a color-based segmentation method and pixel-traversal approach to develop support structure removability analysis. In this tool, the CAD model of the part to be manufactured and the support structures required for the geometry form the input. The tool then generates a support structure removability score which denotes the percentage of support structure which can be accessed with a tool from outside the part and removed. Removability of supports may be considered, for example, along 18 directions as depicted in FIG. 39 by a bounding box 3900 for a part 3904 and support 3906, along with void space 3902, longitudinal diagonal directions 3908 (4 longitudinal diagonal directions in some embodiments), orthogonal directions 3910 (4 orthogonal directions in some embodiments), diagonal directions 3912 (4 diagonal directions in some embodiments), and lateral diagonal directions 3914 (4 lateral diagonal directions in some embodiments). The steps of the algorithm for the removability calculator tool 4000 are explained with respect to FIG. 40. At 4002, part and support geometry in CAD software (for example) are imported and marked with different colors. At 4004, sectional snapshots in an orthogonal direction are generated in the build direction (n snapshots). At 4006, a 3D matrix is initiated based on sectional snapshot resolution and a number of sectional snapshots At 4008, snapshot reading is initiated at i=0. At 4010, pixels of snapshot I are categorized into part, support or void pixel using color-based segmentation. At 4012, for sectional snapshot i, a pixel traversal approach is used to find accessible support structure pixels in 4 orthogonal (for example) and 4 diagonal directions (for example). At 4014, accessible pixels are marked and data is updated in a 3D matrix for it layer and increment i value. At 4016, if i<n, the algorithm returns to 4010. Otherwise, at 4018, within a 3D matrix, support pixels for accessibility are updated in (for example) 10 directions: 2 orthogonal, 4 lateral diagonal and 4 longitudinal diagonal. At 4018, based on total support pixels and accessible support pixels, percentage removability is calculated.

Sectional Snapshot Generation and Color-Based Segmentation

The supports removability calculation begins by importing the CAD model for part geometry and the support structures required to build the part. The support structures for this research may be generated using Materialise Magics software (Materialise, 2015). For ease of image processing, the part geometry and the support structure geometry may be marked as two different colors within the CAD software. The part model may be marked as blue, supports may be marked as red and void space may be marked as white. In order to identify the eight directions of accessibility (four orthogonal and four diagonal), sectional snapshots of the combined part and support geometry may be captured iteratively. Snapshots may be captured along parallel planes orthogonal to the build direction, i.e., if the build direction is Z+, snapshots may be captured either along X or Y axis. The pixels of the captured snapshot may be categorized into part, support or void using color-based segmentation (MathWorks, 2015a).

In color-based segmentation, initially the palette image containing reference colors may be read and converted to L*a*b* colorspace from RYG colorspace. In our case, the palette image would have blue, red, and white colors. Using the colors present in the palette, the reference L*, a*, and b* markers may be calibrated. In the next step, the sectional snapshot may be converted to L*a*b* colorspace and nearest-neighbor search may be performed for each pixel of the sectional snapshot with respect to reference L*, a*, and b* markers. Based on this step, pixels of a snapshot may be categorized into either part, support, or void pixel. The image generated at the end of this stage may be the segmented image and its 2D matrix representation would contain either 0, 1, or 2 integers where 0 represents void pixel, 1 represents part pixel, and 2 represents support pixel.

Segregation of Support Pixels into Accessible and Inaccessible

Figure 41:
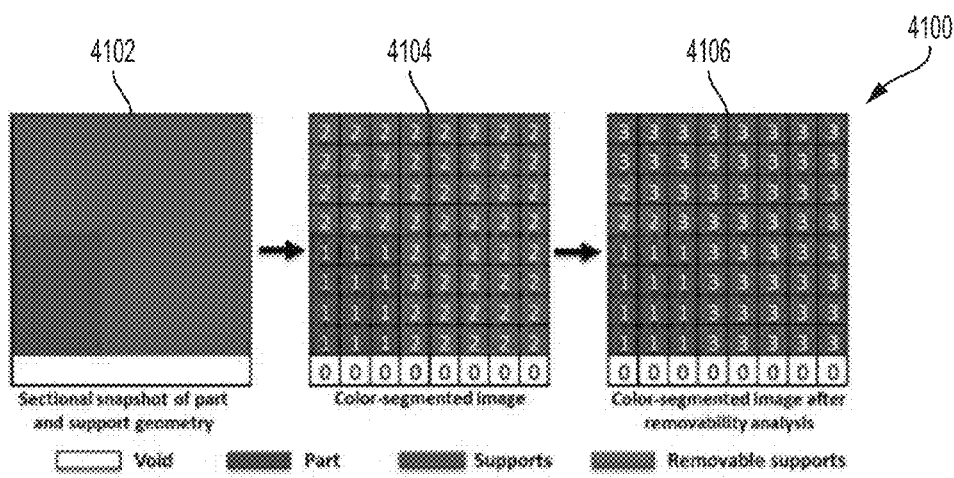
FIG. 41 depicts a diagram schematically illustrating color-based segmentation and criteria for making removable supports, according to one or more embodiments shown and described herein.

In the segmented image, for all the pixels marked with 2, i.e., support pixels, we need to decide if they may be accessible from outside and removable. As mentioned previously, removability of support structures, for example, checked along 18 directions; 6 orthogonal directions and 12 diagonal directions. This may be achieved in 2 different stages. In the first stage, during the iterative snapshot generation, the removability of support pixels along 8 directions may be identified. The pixel may be termed as accessible and may be marked as 3 only if it can reach a border void pixel (0 pixel) of the snapshot without being obstructed by any part pixel i.e., a pixel marked with 1 as shown in FIG. 41, which depicts color-based segmentation and criteria for making removable supports 4100. FIG. 41 depicts a sectional snapshot of part and support geometry 4102, a color-segmented image 4104, and the color-segmented image after removability analysis 4106. Once the 8 directional analysis is performed for one particular snapshot, the 2D matrix data for that snapshot may be updated and stored as a layer in the 3D matrix which comprises the data for the entire geometry. This process may be repeated until all the snapshots corresponding to each layer may be segmented and analyzed for 8 directions.

At the end of the first stage, 8 directional analysis for each sectional snapshot generates a 3D matrix for the entire part. Using this matrix, pixel traversal for the remaining 10 directions may be performed. These directions include 2 orthogonal, 4 lateral diagonal, and 4 longitudinal diagonal directions (see FIG. 39). During pixel traversal in the 3D matrix, each support pixel may be marked as accessible (pixel marked as 3) if it can reach either the face or the edge of the 3D matrix without encountering any other part pixel. In this manner by the end of this stage, the 3D matrix having 0, 1, 2, or 3 integer values may be generated where 3 represents support pixels which are accessible and 2 represents support pixels which are inaccessible. Thus, we can calculate a percentage of removable support structures in equation 17 as follows:

$$\% \text{ Removable supports} = \frac{\text{Removable support pixels}}{\text{Total support pixels}} = \frac{\sum \text{Pixels marked as 3}}{\sum (\text{Pixels marked as 2} + \text{Pixels marked as 3})} \quad (17)$$

Sintering Area and Time Calculator

Figure 42:
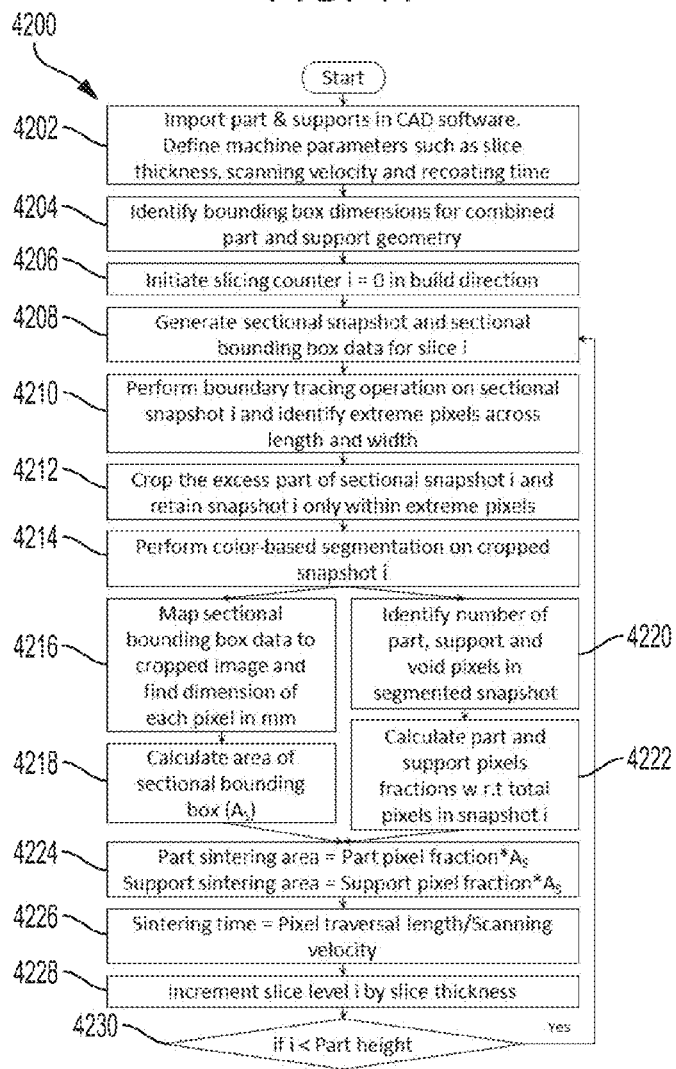
FIG. 42 depicts a flowchart of a sintering parameters calculator, according to one or more embodiments shown and described herein.

Sintering area may be the area hatched by the laser during any laser sintering additive processes or area traversed by the nozzle for deposition based additive processes. Sintering time may be described as the time taken to perform either hatching or deposition operation. Sintering time may be assumed to be linearly proportional to the hatch area and the effect of different hatch pattern geometries may be not taken into consideration. For the current work, a zig-zag type of hatch pattern may be considered while calculating the sintering area and time. By using the sectional snapshots and the associated sectional bounding box along the build direction as described above, and the segmented image of sectional snapshots described above, part and support sintering area as well as sintering time can be calculated. Taking into account machine parameters such as laser or deposition head scanning velocity and recoating time (time required to spread a new layer of powder or platform lowering time) in the area calculation method, the time required for total part build can be calculated. The details of the algorithm for this tool are explained in the flowchart 4200 shown in FIG. 42. At 4202, part & supports in CAD software are imported, and machine parameters such as slice thickness, scanning velocity and recoating time are defined. At 4204, bounding box dimensions are identified for combined part and support geometry. At 4206, slicing counter i=0 is initiated in the build direction. At 4208, sectional snapshot and sectional bounding box data is generated for slice i. At 4210, boundary tracing operation is performed on sectional snapshot i and identify extreme pixels across length and width. At 4212, the excess part of sectional snapshot i is cropped and snapshot i is retained only within extreme pixels. At 4214, color-based segmentation is performed on cropped snapshot i. At 4216, sectional bounding box data is mapped to the cropped image and dimension of each pixel are found in mm. At 4218, the area of the sectional bounding box ($A_s$) is calculated. At 4220, the number of part, support and void pixels are identified in the segmented snapshot. At 4222, part and support pixels fractions with respect to total pixels are calculated in snapshot i. At 4224, part sintering area=part pixel fraction*$A_s$ and support sintering area=support pixel fraction*$A_s$. At 4226, sintering time=pixel traversal length/scanning velocity. At 4228, slice level i is incremented by slice thickness. At 4230, if i<part height, the algorithm returns to 4208. Otherwise, the algorithm terminates.

The sintering area calculator may be initiated by taking into account the part and support geometry. Part and supports may be marked as two different colors to facilitate image processing operations later. As before, the part may be marked as blue and supports may be marked as red. The bounding box dimensions for the entire geometry (part and supports combined) may be extracted. Further, the input machine parameters such as scanning velocity, recoating time and slice thickness may be taken into consideration. Once all the initiating parameters are identified, the process of sectional image snapshot capturing and extraction of sectional bounding box may be performed normal to the build direction as described above.

In the next step, boundary tracing operations may be performed to identify the boundary pixels. From the boundary pixels, extreme pixels may be identified. The indices of extreme pixels across width may be designated as minW and maxW while those across length may be termed as minL and maxL. Based on the extreme pixels, the sectional snapshot may be cropped and only the area which represents the contour of the part and support geometry may be retained. Color-based segmentation may be performed on the cropped snapshot to categorize pixels into part, support, or void pixels. Once the pixels are categorized, the fraction of part and support pixels with respect to total pixels in a cropped sectional snapshot ($i^{th}$ layer of build) may be calculated as follows:

$$\text{Part pixels fraction } (P_{f(i)}) = \frac{\text{Part pixels}}{\text{Total pixels}} \quad (18)$$

$$\text{Support pixels fraction } (S_{f(i)}) = \frac{\text{Support pixels}}{\text{Total pixels}} \quad (19)$$

The Sectional bounding box represents limits of sectional contour along X+, X−, Y+ and Y− axis in terms of 4 variables: $X_{min}$, $X_{max}$, $Y_{min}$, and $Y_{max}$. For the $i^{th}$ layer, the area of the 2D sectional bounding box can be calculated as follows:

$$\text{Area of sectional bounding box of } i^{th} \text{ layer}(A_{S(i)}) = (X_{max} - X_{min})*(Y_{max} - Y_{min}) \quad (20)$$

Thus, the sintering areas for part and supports for $i^{th}$ layer can be calculated as follows:

$$\text{Part sintering area of the } i^{th} \text{ layer} = P_{f(i)}*A_{S(i)} \quad (21)$$

$$\text{Support sintering area of the } i^{th} \text{ layer} = S_{f(i)}*A_{S(i)} \quad (22)$$

By using the indices of extreme pixels along the length and width, the number of pixels in the cropped sectional snapshot across the length and width can be calculated. Using the dimensions of the sectional bounding box and the number of pixels in the cropped sectional snapshot, the dimension of each pixel in XYZ co-ordinate space for the $i^{th}$ layer can be identified by the following formula:

$$\text{Pixel dimension}(P_{d(i)}) = \quad (23)$$

$$\frac{\text{Dim. of sect. bounding box of } i^{th} \text{ layer along } X \text{ axis}}{\text{Number of pixels across length for } i^{th} \text{ layer}} =$$

$$\frac{X_{max} - X_{min}}{\text{maxL} - \text{minL}}$$

Thus based on the number of part pixels and support pixels, the sintering time for each layer can be calculated using following formulae:

$$\text{Part sintering time of the } i^{th} \text{ layer} = \quad (24)$$
$$\frac{(\text{Number of part pixels in } i^{th} \text{ layer})*P_{d(i)}}{\text{Sacnning velocity}}$$

$$\text{Support sintering time of the } i^{th} \text{ layer} = \quad (25)$$
$$\frac{(\text{Number of part pixels in } i^{th} \text{ layer})*P_{d(i)}}{\text{Sacnning velocity}}$$

The entire process may be repeated iteratively for all the slices of the part. To calculate the total build time, sintering areas for all layers may be summed together and recoating time may be added for each slice level increment.

Sharp Corner Detector

AM offers a unique advantage of manufacturing complex parts. In metal based AM processes such as DMLS, a laser beam may be used for sintering the metal powder. Due to the limitations posed by the laser beam diameter, features such as sharp corners, thin region, and small openings may not be manufactured as per the design. Identifying such features before actually manufacturing the part can provide input to re-design the part or change the build orientation. The proposed sharp corner detector tool detects and highlights sharp features in the CAD geometry within a CAD environment. The criteria to decide if a feature is sharp or not may be based on a user defined threshold angle.

Figure 43:
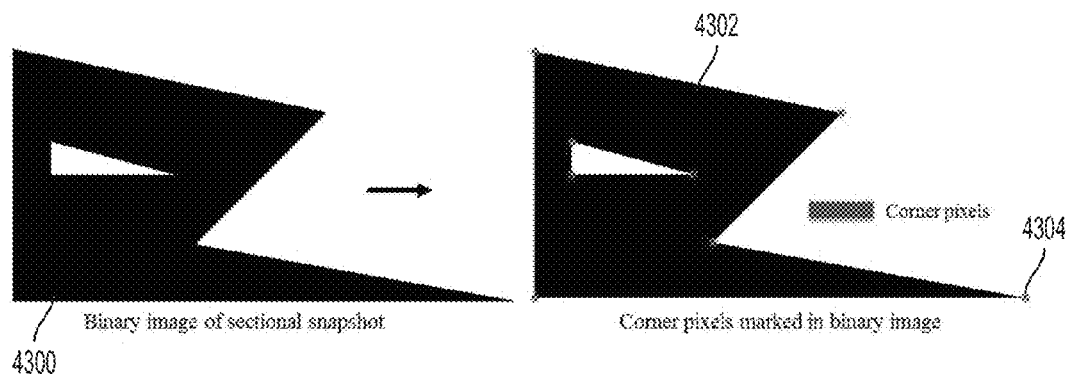
FIG. 43 depicts a diagram schematically illustrating corner pixel detection from a binary image, according to one or more embodiments shown and described herein.

The sharp corner detector highlights sharp regions at each layer. In the first step the tool captures sectional snapshots of part to be manufactured. These snapshots may be spaced at a distance of layer thickness specified by a user. In the next step, the captured sectional snapshot may be converted to a binary image using binary thresholding operation. This operation may be performed as a precursor to the next two steps. From the binary image, boundary pixels may be extracted using the Moore-neighbor tracing algorithm modified by Jacob's stopping criteria (Ghuneim, 2015), (Gonzalez et al., 2004). The same binary image may also be used to identify pixels that form corners in the binary image as shown in FIG. 43. A binary image of a sectional snapshot is depicted in 4300 and 4302, with corner pixels in 4302. Corner and edge detection algorithm proposed by (Harris and Stephens, 1988) may be used to perform this IP operation.

Figure 44:
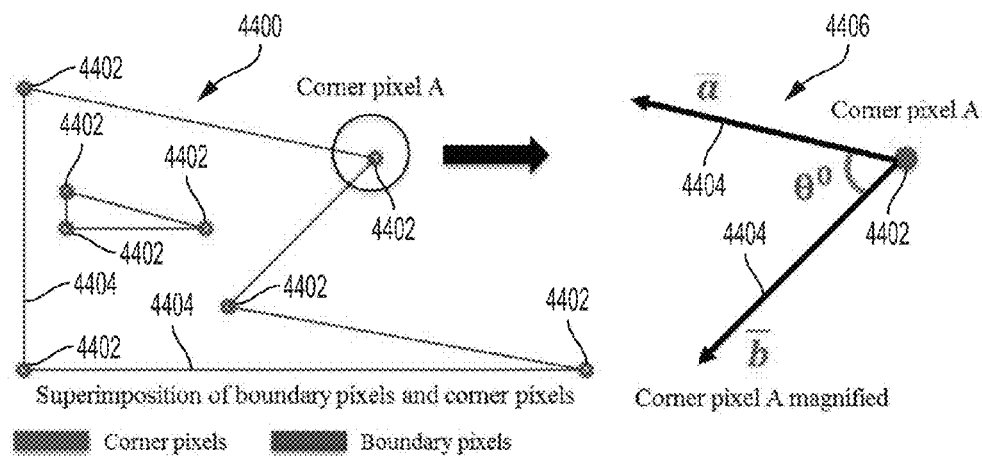
FIG. 44 depicts a diagram schematically illustrating a vector method for finding an angle, according to one or more embodiments shown and described herein.

Once we get the boundary pixels as well as corner pixels, they may be superimposed with each other to generate two vectors which may be formed at a corner pixel. An example of the vector method for finding an angle is shown in FIG. 44 in 4400 (superimposition of boundary pixels 4404 and corner pixels 4402) and a closer view in 4406 depicting corner pixel A magnified. The feature angle at corner pixel A depicted in 4400 and 4402 can be identified by the following formulation.

$$\overline{a}.\overline{b} = |a|.|b|.\cos(\theta) \quad (26)$$

$$\cos(\theta) = \frac{\overline{a}.\overline{b}}{|a|.|b|} \text{ i.e.} \quad (27)$$

$$\theta = \cos^{-1}\left(\frac{\overline{a}.\overline{b}}{|a|.|b|}\right)$$

Figure 45:
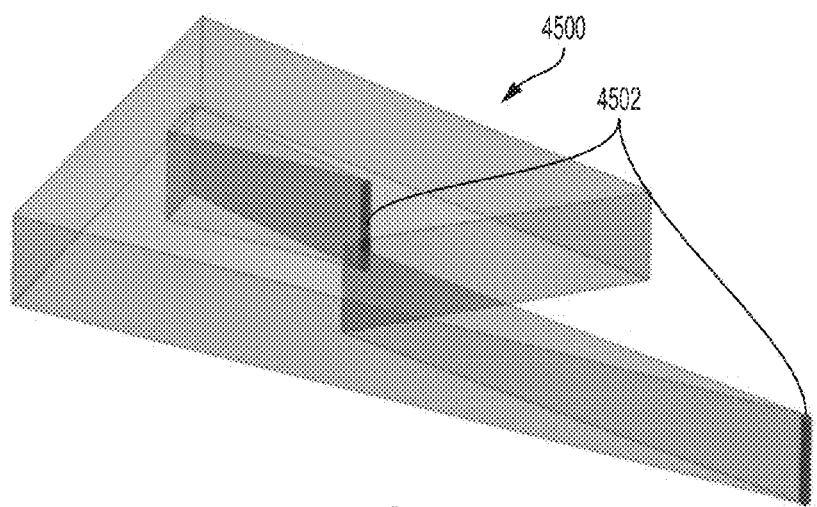
FIG. 45 depicts a diagram schematically illustrating highlighted sharp corner regions, according to one or more embodiments shown and described herein.

A similar process may be performed for the rest of the corner pixels at each layer to identify angles associated with all the corners. Once we have the angle data for all the corners in the part, based on user input of threshold angle, all the corner pixels that do not satisfy threshold angle criteria may be isolated. These may be the pixels associated with corners that may be difficult to manufacture. Using the sectional bounding box data, the location of those pixels on actual geometry may be mapped. Such features can be highlighted on actual geometry as shown by 4500 in FIG. 45 using a vector method for finding angles, including corner pixels that do not satisfy the threshold angle criteria 4502.

Examples and Results

In this section the algorithms and the developed tools may be validated using test cases. FreeCAD and Siemens NX 10 may be used as CAD tools. The Image Processing Toolbox offered by MATLAB (MathWorks, 2015b) and OpenCV 3.1 module (Itseez, 2015) may be used for performing Image Processing operations.

Direct CAD Slicing Using IPSlicer

The IPSlicer offers a unique capability to generate data for a G-code/CLI file directly from CAD geometry. Thus the parts manufactured by this method will have reduced GD&T errors as compared to components manufactured from the STL file. The effectiveness of the IPSlicer may be validated by virtually building the part models based on the specified parameters (Navangul et al., 2013).

Test Case 1: Component with Cylindrical and Spherical Features

Figure 46A:
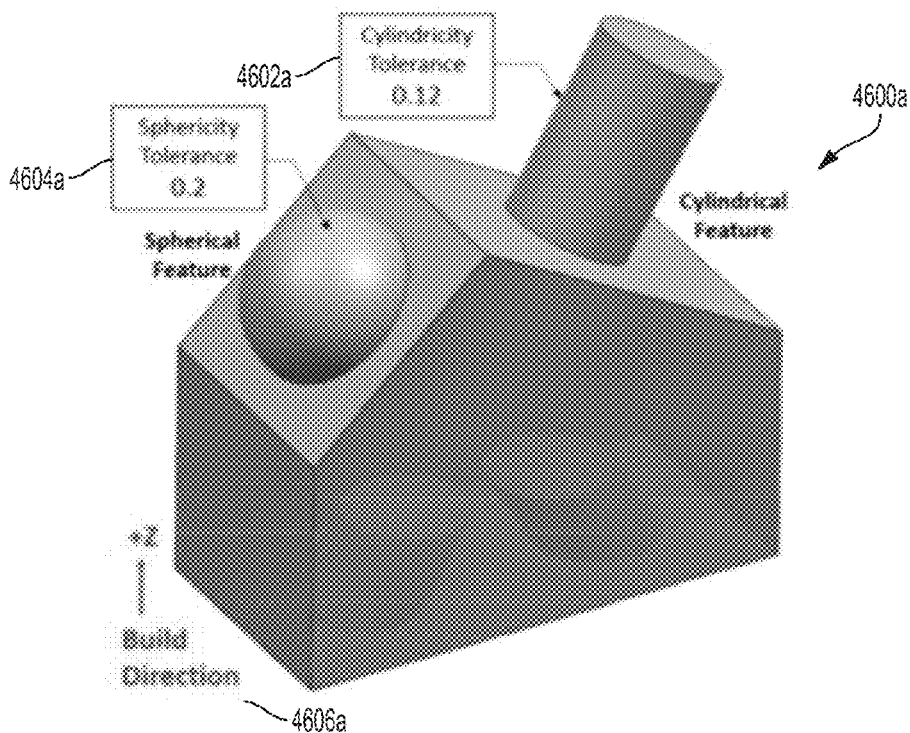
FIG. 46a depicts a computer rendering illustrating a part with spherical and cylindrical features, according to one or more embodiments shown and described herein.
Figure 46B:
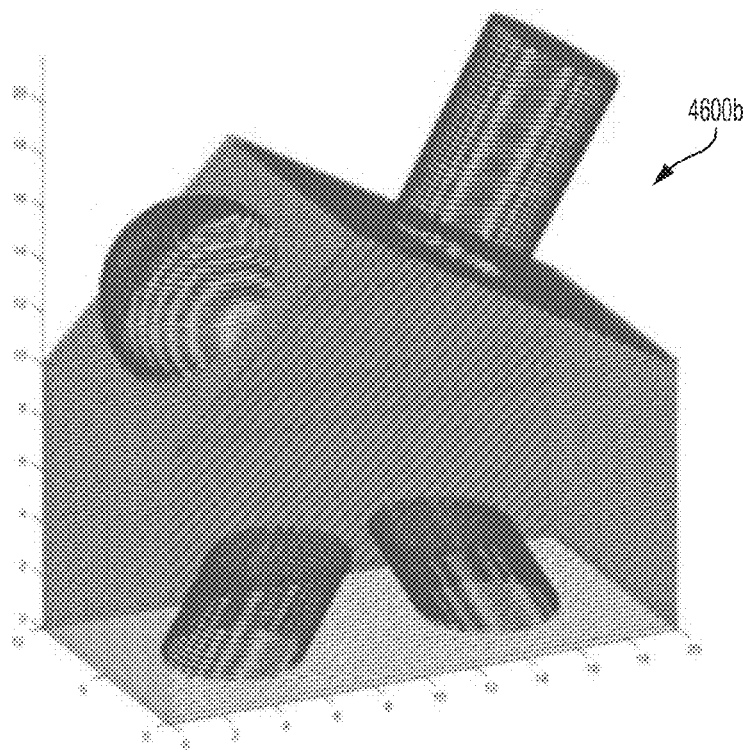
FIG. 46b depicts a computer rendering illustrating slice contour points for the part, according to one or more embodiments shown and described herein.

FIG. 46*a* shows the CAD model 4600*a* of a part having cylindrical features 4602*a* and spherical features 4604*a* with a build direction 4606*a*. The axis aligned bounding box dimensions for this geometry may be 20 mm×10 mm×21.83 mm. The part is sliced as normal to the build axis using the IPSlicer to generate the slice contour point cloud as depicted by 4600*b* in FIG. 46*b*. The resolution for sectional snapshot images generated by IPSlicer is 3200×2400. By using this point cloud, the part can be manufactured by generating G-code/CLI file. The same point cloud is used for virtually manufacturing the component. The results obtained by using IPSlicer may be compared against the results obtained by slicing an STL file with a translation tolerance of 0.05 mm (Topçu et al., 2011).

The GD&T parameters considered for this part may be cylindricity and sphericity. These parameters may be calculated using minimum zone algorithms (Carr and Ferreira, 1995). Table 5a and Table 5b show the reduction in sphericity and cylindricity errors for IPSlicer compared to STL slicing method.

TABLE 5a

Comparison of sphericity

| | Slicing Procedure | |
|---|---|---|
| | STL Slicing | IPSlicer |
| Sphericity (in mm) | 0.2164 | 0.1934 |
| % Reduction | — | 10.63 |

TABLE 5b

Comparison of cylindricity

| | Slicing Procedure | |
|---|---|---|
| | STL Slicing | IPSlicer |
| Cylindricity (in mm) | 0.1301 | 0.1092 |
| % Reduction | — | 16.06 |

Test Case 2: Component with Freeform Surface

Figure 47:
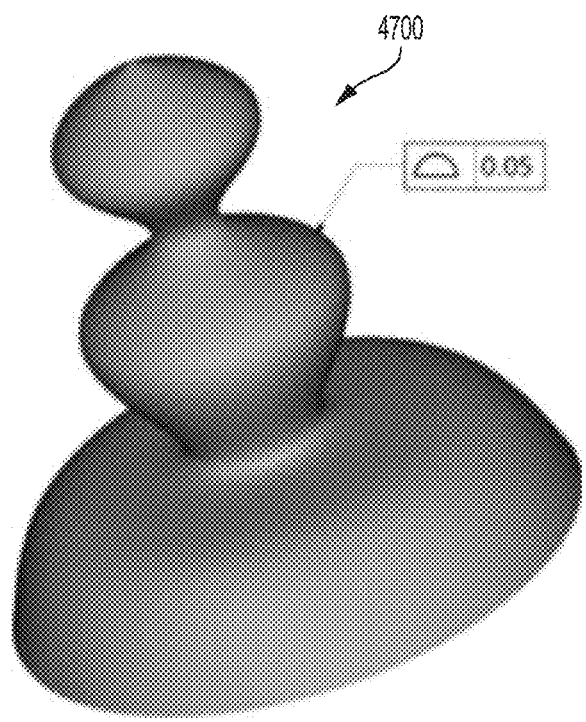
FIG. 47 depicts a computer rendering illustrating a part with freeform surfaces, according to one or more embodiments shown and described herein.

The IPSlicer may also be tested on a part 4700 made up of freeform surfaces as depicted in FIG. 47. The dimensions of the axis aligned bounding box for this geometry may be 5 mm×5 mm×5 mm. The GD&T parameter under consideration for this part is profile error. The profile error calculation is performed by superimposing the CAD model and virtually manufactured point cloud within Siemens NX 10. Using NX Open API (Siemens PLM Software, 2014), we calculate the deviation of each slice point and virtually manufactured point from the actual CAD surface to obtain the profile error associated with each point in the point cloud. The average of this error yields the average profile error. Table 6 shows the average profile error comparison for the part virtually manufactured using the IPSlicer and the part virtually manufactured by slicing the STL file. The STL file used in this test case has a fine translation tolerance of 0.01 mm and the IPSlicer uses a default and the lowest possible image resolution of 1581×891 while generating a sectional snapshot images.

TABLE 6

Comparison of profile error

| | Slicing Procedure | |
|---|---|---|
| | STL Slicing | IPSlicer |
| Avg. Profile Error | 0.0539 | 0.0486 |
| % Reduction | — | 9.83 |

Support Structures Removability Calculator

The support removability calculator generates the removability score which may be the percentage of support structures which can be accessed and removed in the post processing stage. Two test cases will be considered to validate and demonstrate this tool. The sectional snapshots generated by the tool have an image resolution of 1581×891.

Test Case 1: Component with 100% Removability Score

Figure 48:
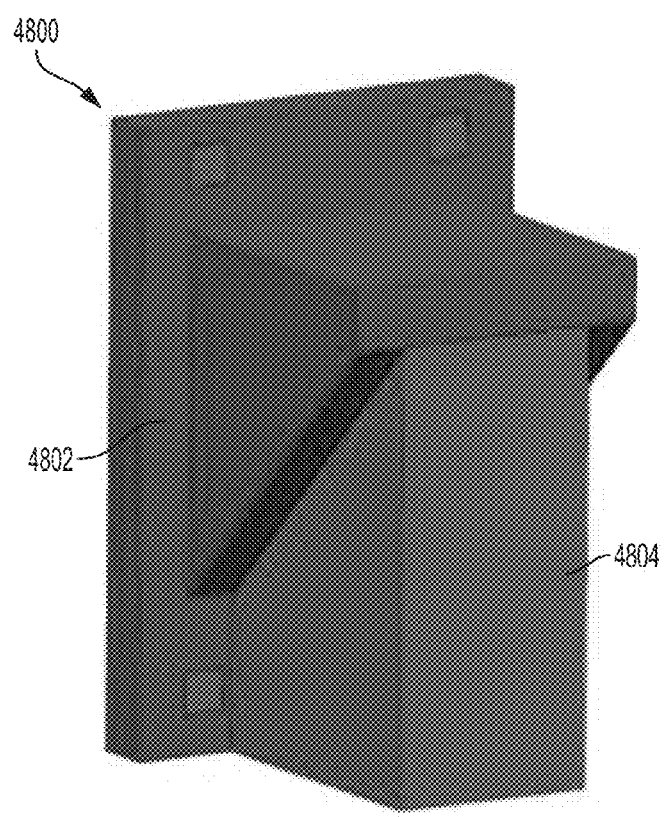
FIG. 48 depicts a computer rendering illustrating a bracket with supports, according to one or more embodiments shown and described herein.
Figures 49, 50, 51A:
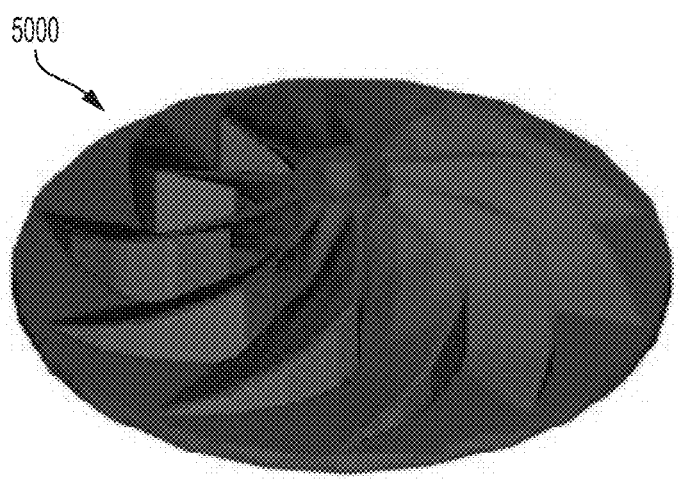
FIG. 49 depicts a diagram schematically illustrating removability calculations for a bracket, according to one or more embodiments shown and described herein.
FIG. 50 depicts a computer rendering illustrating a turbine with support structures, according to one or more embodiments shown and described herein.
FIG. 51a depicts a diagram schematically illustrating removability calculations in orthogonal directions for the turbine, according to one or more embodiments shown and described herein.

FIG. 48 shows a CAD model of bracket 4802 and supports 4804 required for the depicted bracket 4800 in this build orientation. The supports may be generated using the Materialise Magics (Materialise, 2015) software. The bracket and supports may be imported into the CAD software and then may be marked with two different colors. As can be seen from FIG. 48, all of the supports for this model can be removed from six standard orthogonal directions. The removability calculator also generates the same results thus validating the algorithm. An exemplary result is shown in FIG. 49.

Test Case 2: Component with Inaccessible Supports

Figure 51B:
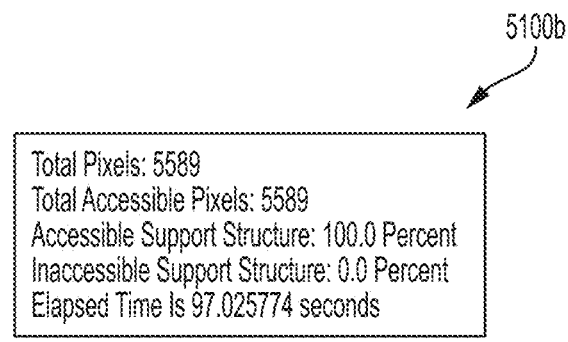
FIG. 51b depicts a diagram schematically illustrating removability calculations in 18 directions for the turbine, according to one or more embodiments shown and described herein.

In the second test case, a complex CAD geometry is considered. FIG. 50 depicts a CAD model of a turbine 5000 (Sula, 2015) and the supports required for it along build direction. As can be seen in FIG. 50, some of the supports below the turbine fins may be not accessible from any of the orthogonal directions and thus accessibility score will not be 100%. The obtained score has been validated by comparing with a similar test case presented in (Samant, 2015). If all 18 accessible directions are considered for support removal then all the supports can be removed. The reports are generated for the cases shown in FIG. 51*a* and FIG. 51*b*. Report 5100*a* relates to removability calculations in orthogonal directions for the turbine 5000. Report 5100*b* relates to removability calculations in (for example) 18 directions for the turbine 5000.

Sintering Area and Time Calculator

Figure 52A:
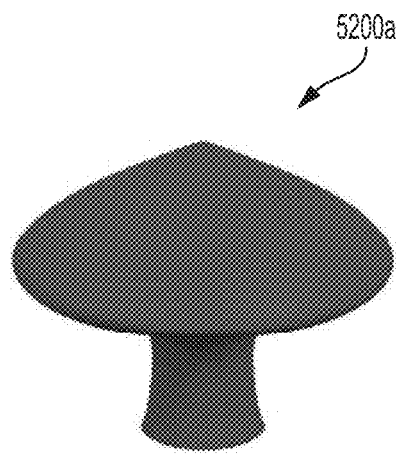
FIG. 52a depicts a computer rendering illustrating part geometry, according to one or more embodiments shown and described herein.
Figure 52B:
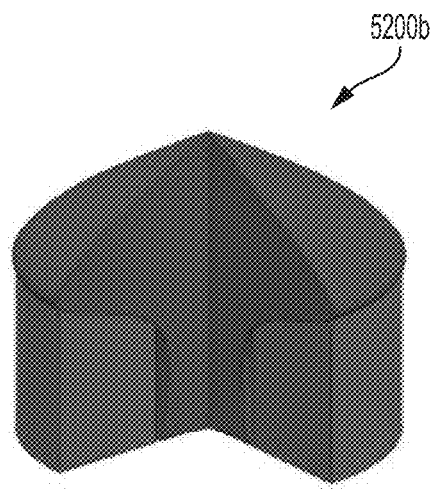
FIG. 52b depicts a computer rendering illustrating a sectional view of the part and supports geometry, according to one or more embodiments shown and described herein.

The sintering area and the sintering time calculator are validated on the CAD model shown in the part geometry 5200*a* depicted in FIG. 52*a*. FIG. 52*b* presents a section view of part and supports geometry 5200*b*. The blue colored geometry represents the part while the red colored geometry represents the support structure required by the part. A scanning velocity of 5 m/s may be used for calculation (EOS e-Manufacturing Solutions, 2015). The sectional snapshots generated by the tool have an image resolution of 1581×891. A snippet 5300 of the sintering area and time calculation report generated by this tool is shown in FIG. 53.

Further Considerations

This application presents an Image Processing based method for directly slicing the CAD geometry. By using this method, the part to be manufactured by using additive processes can be manufactured directly without the need of converting it to STL file. The effectiveness of this method may be validated by demonstrating improvement in GD&T errors on sample parts.

The concepts and tools used in direct CAD slicing method may be coupled with color-based segmentation algorithm to develop support structure removability and sintering area and time calculation. Both the tools may be validated with sample parts.

Further considerations include coupling G-code/CLI generator with IPSlicer to provide a 1-click tool for manufacturing components by additive processes. The supports removability calculator can be further enhanced to highlight all the inaccessible regions. The sintering area/time calculation tool can be further refined to account for factors such as hatch pattern, recoating time and build platform lowering time. The support generation tool can be integrated within the CAD software along with the IPSlicer, support removability and sintering area/time tools to assist designers with pre- and post-processing information of additively manufactured parts during early design stage. Finally, design for additive manufacturing rules including identification of thin sections, small openings, sharp corners and support contact area can be inferred directly from the image snapshot of each layer. This could be used for further design modifications and selection of optimal build orientation.

Artificial Neural Network Based Geometric Compensation for Thermal Deformation in Additive Manufacturing Processes Artificial Neural Networks (ANN) based methodology can be utilized for compensating the part CAD geometry to counter the thermal shrinkage and deformations in the manufactured part. The approach uses a feed-forward ANN trained using back-propagation algorithm on the surface data of the given CAD model and the final AM prototype resulting from an AM process with a defined set of process parameters, to learn the geometrical differences between the two. The trained network may be then used to make the required modifications to the part geometry, so that manufacturing the part using the modified geometry results in a dimensionally accurate finished product.

The rest of this application has been structured as follows. The next section discusses factors affecting thermal deformations of parts in AM processes and approaches developed to compensate for these inaccuracies. This is followed by a comprehensive explanation of the proposed ANN based geometry compensation methodology. The part profile conformity based performance evaluation for the proposed ANN compensation approach is then elaborated on. This is followed by two case studies to show the application and evaluation of the proposed Compensation Methodology.

Literature Review

The shrinkage and deformations resulting in an AM part due to the cyclic melting, cooling and re-solidification of the material have a significant impact on the part dimensional accuracy, part strength and by extension, on the usability of the final product. As a result, this subject has generated a lot of research interest in the AM community. The available literature on the experimental study, computational modeling and prediction and mitigation of part shrinkage and deformation in AM processes are presented in the following sub-sections.

Experimental Analysis of Thermal Effects of Am Processes

Pohl et al., (2001) carried out DMLS experiments to study the effect of laser beam scan length and patterns on the induced thermal stresses and warpage in plate-shaped sample parts. Zhu et al. (2006) investigated the in-plane metal powder shrinkage during SLS process for Cu based metal. Ning et al., (2006) investigated the effect of geometric shapes on the part shrinkage during DMLS process; and proposed a compensation approach by dynamic adjustment of laser scan speed based on part geometry.

Development of Models for Analyzing the Am Process

Wang et al., (2000) developed an analytical model based on a ray tracing approach to simulate the effect of laser energy in the SLS process. This model was employed by (Wang et al., 2002) to study the SLS of WC-Co hard metal powders. (Matsumoto et al., 2002) developed a finite element method for analyzing temperature and thermal stresses distribution within a single metallic layer manufactured using the SLS process. (Jamshidinia et al., 2013) developed and used a 3D model to simulate thermal fluid flow to investigate the melt pool geometry and temperature distribution in the Electron Beam Melting (EBM) process. (Roberts, 2012) developed a comprehensive finite element analysis (FEA) based model to simulate and study thermal stresses and resulting deformations in metal powder melting based AM processes. (Paul and Anand, 2013) used an analytical method to evaluate the effect of part shrinkage on the form error during the AM processes. (Paul et al., 2014) developed a thermo-mechanical FEA model to investigate part thermal deformation based on process parameters such as material properties, slice thickness, scanning speed and part build orientation.

Previous Thermal Compensation Approaches for Am Processes

Tong et al., (2004) and Tong et al., (2008) developed STL and slice based compensation approaches for machine/geometric errors in parts fabricated using Rapid Prototyping processes. (Raghunath and Pandey, 2007) studied the impact of different process parameters on part shrinkage during the SLS process, and used the Taguchi method to develop scaling models along x, y and z directions to compensate for the shrinkage. Huang et al, (2014) and Huang et al., (2015) investigated the offline shape shrinkage compensation for the individual layer contours using a statistical approach. (Wang et al., 2007) reported a Neural Network based approach for establishing the relation between the AM process parameters and shrinkage ratio for parts fabricated using SLS. (Senthilkumaran et al., 2009) proposed a part geometry and beam offset based shrinkage model and a CAD slice shrinkage compensation approach for polymer parts manufactured using SLS.

Methodology

Figure 54:
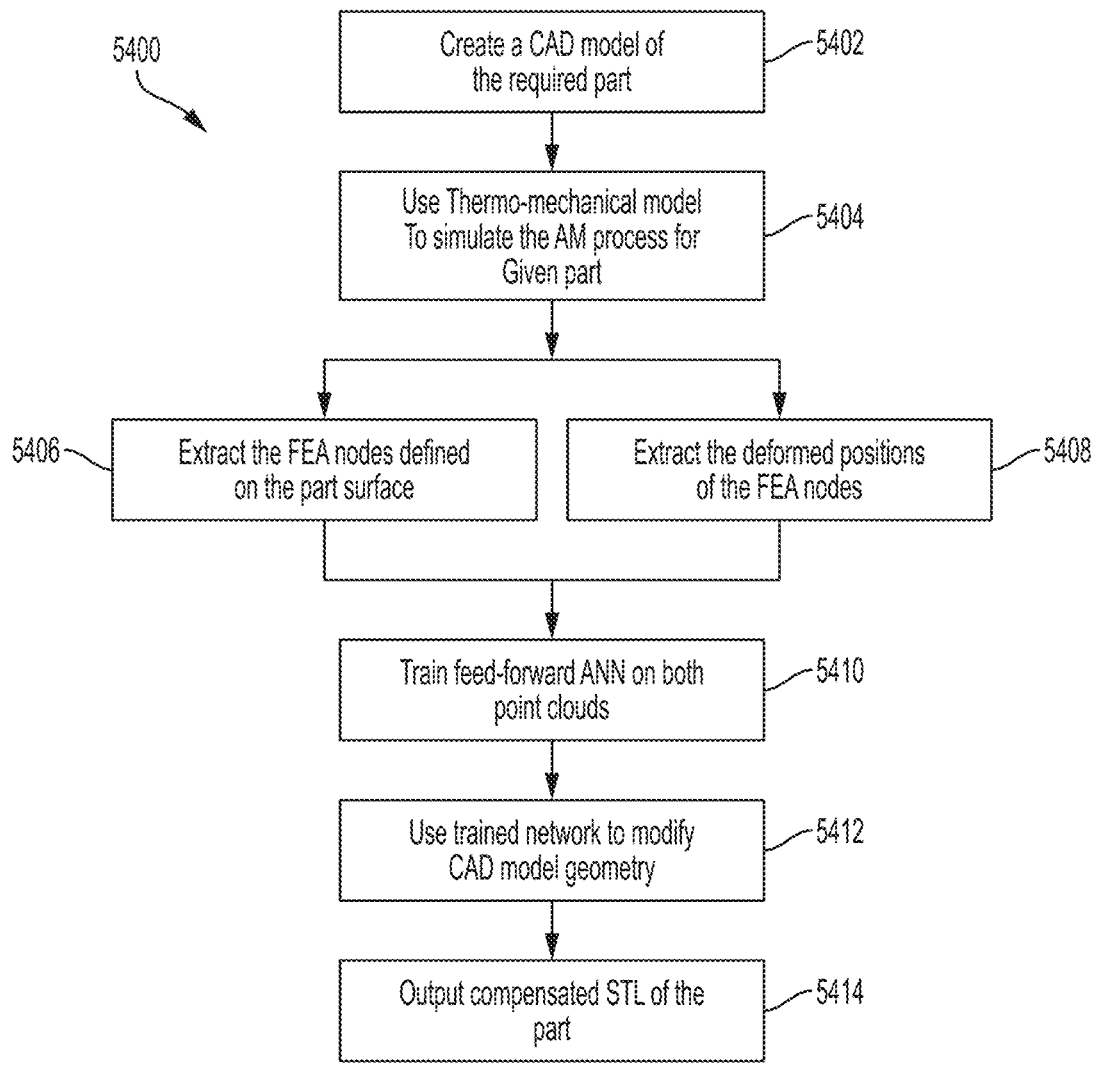
FIG. 54 depicts a flowchart illustrating a methodology for an artificial neural network model based CAD geometry compensation, according to one or more embodiments shown and described herein.

This section elaborates on the proposed methodology of using an ANN model for making direct modifications to the geometry of a given part CAD model. The applied geometric modifications help compensate for thermal shrinkage and deformations during the AM process. FIG. 54 shows the schematic overview of the compensation methodology, specifically a methodology for ANN model-based CAD geometry compensation. The process 5400 begins with modeling a part in any available CAD software at 5402. A thermo-mechanical FEA model may be used to simulate the AM process for the part with a defined set of process parameters at 5404. The simulation returns the part geometry deformation data as its output, such as the part surface data from the CAD model at 5406 and the output of the AM process simulation (such as extracted deformed positions of the FEA nodes at 5408) may be used to create the datasets for the ANN model training. These surface data may be then used by the ANN model to train on/learn the direction and magnitude of deformation at different regions of the part at 5410. The learning process for the network may be equivalent to the approximation of a deformation function for the part under consideration. The trained network may then be used on the CAD model geometry to generate the modified geometry at 5412 which would compensate for the thermal effects induced in the part during the AM process and output a compensated STL of the part at 5414. The AM process simulation may be repeated for the modified geometry and the result of the simulation may be used to quantify and evaluate the performance of the proposed method in reducing the thermal deformation and shrinkage of the part. The rest of this section is organized as follows: First, the use of a thermo-mechanical model simulation of the AM process to generate part surface data to be used in the ANN model is discussed. Next, a brief introduction is presented to the feed-forward ANN architecture to be used and the network training methodology. This is followed by a detailed explanation of how the ANN methodology utilizes the acquired surface information to fit the part thermal deformation data as a function of the 3D location of the points on the part surface. Finally, an explanation is given as to how the trained ANN model may be implemented to generate the required compensated geometry.

Surface Data Generation Using Fe Thermo-Mechanical Model

The first step of the proposed geometry compensation methodology may be to create datasets to train the defined ANN model. Since point cloud data may be considered to be one of the most primitive and closest representations of a 3D geometry, it serves as an efficient means for studying the part deformations and shrinkage due to thermal effects of the AM process. As a result, it was established to use the point cloud representation of the part, as training data for the ANN model.

In this approach, the 3D thermo-mechanical finite element model developed within the co-inventor's research group (Paul et al., 2014) was implemented using ANSYS. The model was used to simulate the laser sintering of Ti6Al4V powder for generating the required surface data for the manufactured part. The FE model uses the element birth and death technique, for simulating the creation of layers of solid material during the AM process (Roberts, 2012; ANSYS, 2009). The model operates in two sequential steps: (i) in the first step the temperature history and thermal gradients across all layers may be calculated and (ii) in the second step, the information from step (i) may be used to determine the overall deformation induced in the part.

Figure 55:
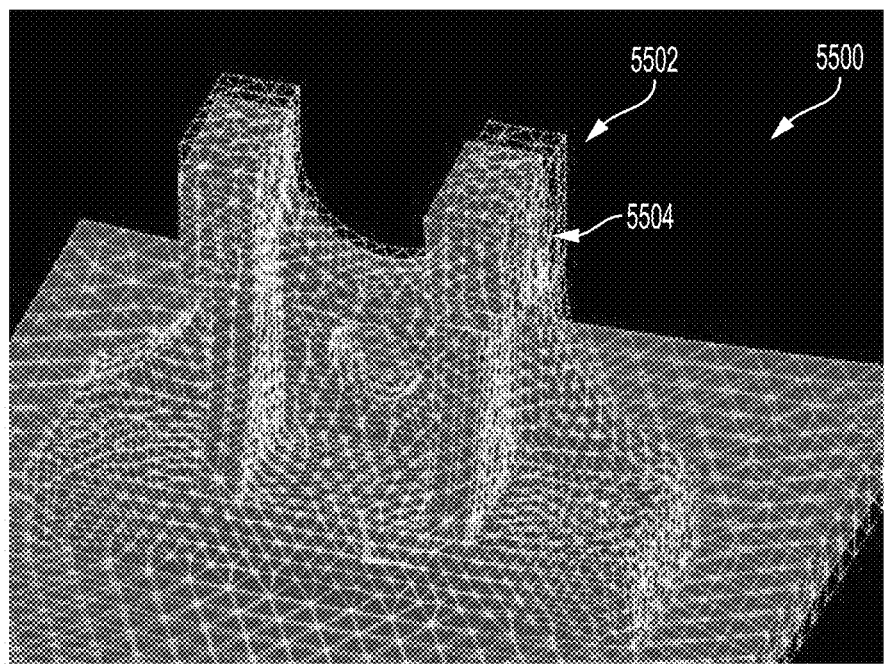
FIG. 55 depicts a computer rendering illustrating a comparison of original and deformed geometry, according to one or more embodiments shown and described herein.

FIG. 55 shows the comparison 5500 of the original geometry 5502 of Sample Part 1 and the deformed geometry 5504 after the execution of the thermo-mechanical model. The 3D point location co-ordinates of the part nodes defined by ANSYS before and after the simulation may be used as the required input training datasets for the ANN model.

The Ann Model Architecture

ANN (McCulloch and Pitts, 1943) refers to a group of advanced mathematical modeling tools, which have been proven to be capable of approximating any function from a given set of input observations. These bionic models were inspired by the functioning of the central nervous system of living organisms. They are widely used in applications like regression analysis, classification, pattern recognition, control systems, etc. The uniqueness of these models includes their capability to learn from data. ANNs are generally represented as a set of interconnected functional nodes or neurons which are capable of exchanging data between themselves through weighted connections. These weights are continuously evaluated and updated, as the data instances are input to the network, and this process includes network training. This makes the network mesh adaptive to the input data and thus imparts a learning-from-data capability to the model. Based on the defined network architecture and application requirement, there exist a wide variety of ANN models.

Figure 56:
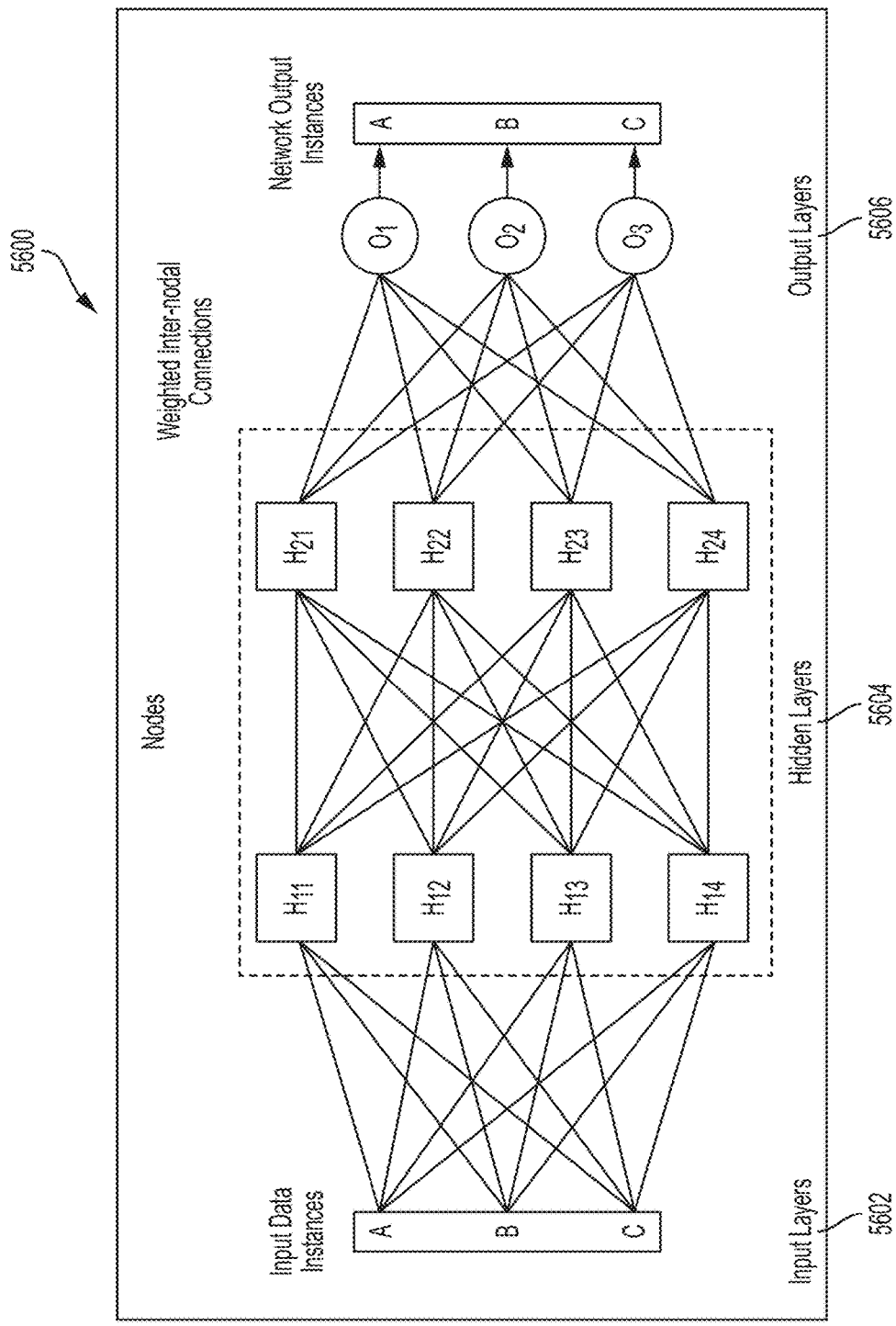
FIG. 56 depicts a diagram schematically illustrating a feed forward artificial neural network model, according to one or more embodiments shown and described herein.

For application of ANN intelligence in the proposed part geometry compensation application, a feed-forward neural network model was selected. The architecture of a generic feed-forward ANN model 5600 is shown in FIG. 56. The neurons may be arranged in a sequential layers. The first layer may be the input layer 5602, followed by one or more hidden layers 5604, and the final layer 5606 may be the output layer. Input data instances may be presented sequentially to the network at the input nodes, following which it may be transferred from one layer of functional nodes to another through the weighted inter-nodal connections.

There are several learning techniques currently being used for training different ANN models. The Error Backpropagation algorithm (Werbos, 1974) is one of the most commonly used network training approaches for ANNs. The objective of this algorithm may be to minimize the error between the desired output and the required output of the network. This may be accomplished by back propagating the errors from the output layer to the hidden layers while making the required adjustments to the inter-node weights at the same time. It also combines the ANN training together with an optimization routine such as the steepest descent method (Arfken, 1985) to speed up the convergence of the network output towards the optimal solution.

The MATLAB Neural Network Toolbox (Demuth and Beale, 2015) was used to simulate the experiments for the designed ANN model. The toolbox uses Levenberg-Marquardt (Yu and Wilamowski, 2011) variant of the Error Backpropagation Algorithm for training the feed-forward network, which carries out the network training in conjunction with two optimization routines: the Steepest Descent (Arfken, 1985) and the Gauss-Newton algorithms (Fletcher, 2013).

Trials were carried out to determine the optimal network architecture to be used for the ANN based geometric compensation methodology. The number of hidden layers and the number of neurons in each hidden layer were varied over three trials and the average mean squared error between the actual and desired outputs of the network and computational time needed for the network training were recorded. The trial results for the point cloud data from Sample Part 1 is as shown in Table 7. The trials were carried out on a PC with Intel Core i7 Processor with 8 GB RAM. It may be observed that the mean squared error reduces with an increase in the number of hidden layers and the number of neurons in each layer. However there may be a significant increase in the computational time with every increase in number of hidden layers and number of neurons in each hidden layer. Thus the final network architecture selected for the proposed geometry compensation ANN model may be as shown in FIG. 4. It consists of an input layer with three input nodes, a hidden layer with fifteen neurons and an output layer with three neurons. The selected architecture is able to keep the mean squared error between the desired output and the actual output of the network within an acceptable range at a relatively inexpensive computational time cost.

TABLE 7

ANN Architecture Trial Results

| Network Architecture | Average Mean Squared Error (3 Trials) | Average Computational Time (3 Trials) in Seconds |
|---|---|---|
| 1 Hidden Layer, 10 Neurons | 1.25E−04 | 130 |
| 1 Hidden Layer, 15 Neurons | 7.24E−05 | 175 |
| 1 Hidden Layer, 20 Neurons | 4.71E−05 | 296 |
| 2 Hidden Layer, 10 Neurons | 4.53E−05 | 290 |
| 2 Hidden Layer, 15 Neurons | 2.27E−05 | 457 |
| 2 Hidden Layer, 20 Neurons | 1.54E−05 | 582 |
| 3 Hidden Layer, 10 Neurons | 2.89E−05 | 475 |
| 3 Hidden Layer, 15 Neurons | 2.09E−05 | 587 |
| 3 Hidden Layer, 20 Neurons | 1.12E−05 | 641 |

Network Training

Once the 3D co-ordinates of the nodes and the deformed nodes are obtained from the FE model, the ANN model training process may be started. Considering the case of a single node defined on the part. Let [x y z] be its 3D co-ordinate, and [x' y' z'] be the co-ordinates of the same node in its deformed state. The deformed node location, [x' y' z'] may be presented as input to the network and at the same time the original node location [x y z] may be presented to the network as the desired output for the given input data. The input data may be transferred sequentially from the input nodes to the hidden layer neurons and finally to the output neurons through the weighted inter-nodal connections.

Figure 57:
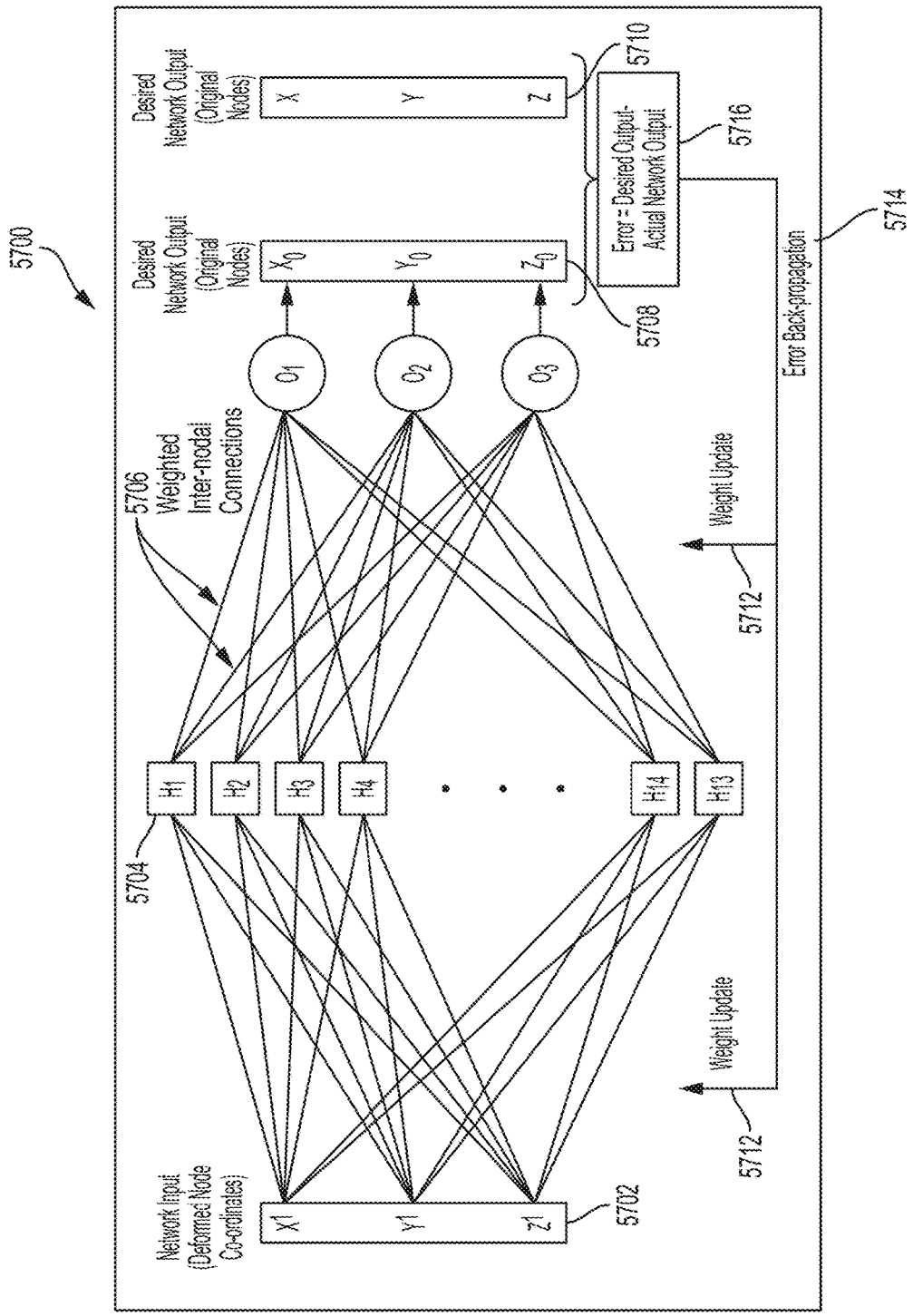
FIG. 57 depicts a diagram schematically illustrating artificial neural network based geometric compensation model training schematic, according to one or more embodiments shown and described herein.
Figure 58:
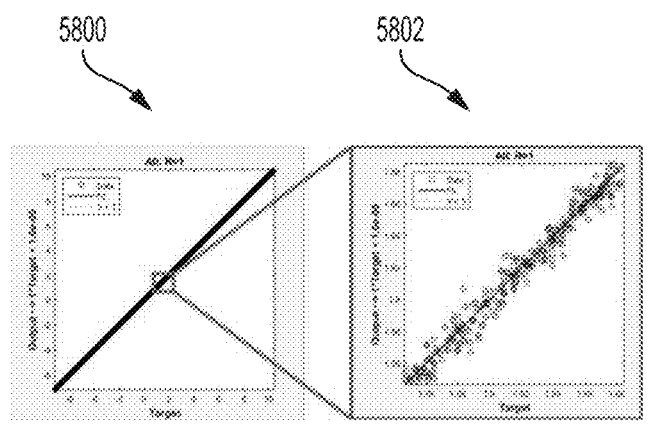
FIG. 58 depicts a diagram schematically illustrating a regression plot of an artificial neural network training process, according to one or more embodiments shown and described herein.

The output of the network may be evaluated, and the weights of the inter-nodal connections may be updated based on the difference in the desired and the actual output of the network for the given input point location. In this manner, all the nodes defined by ANSYS may be evaluated sequentially and the training process may be iterated until the network has minimized the mean squared error of the network outputs or a maximum number of iterations, such as 1000 for example, may be completed. An objective of this approach is to train the ANN efficiently such that it can model the part deformation data as a function of the point location in the 3D co-ordinate space. FIG. 57 shows the complete set up for training the designed ANN model, i.e., an ANN based geometric compensation model training schematic 5700. This schematic 5700 includes network input 5702 (deformed node coordinates), intermediate nodes 5704, weighted intermodal connections 5706, actual network output 5708, desired network output 5710 (original nodes), weight updates 5712, error back propagation 5714, and error 5716 (desired output—actual network output). FIG. 58 shows the regression plot 5800 of the ANN model training process for a sample part 1, with a magnified view in 5802. It may be observed that the trained network is able to fit the geometric deformation data of the given part geometry as a function of surface point locations very accurately.

Cad Geometry Compensation

After the network training has been completed the next step in the geometry compensation approach may be to implement the trained network to deliver a compensated design of the part which after AM would result in a finished part which is dimensionally accurate and conforms to the original CAD design of the part. AM machines in general, use the STL format of part CAD designs as input for manufacturing. The STL format is a close representation of the CAD surfaces using planar triangular facets.

Figure 59:
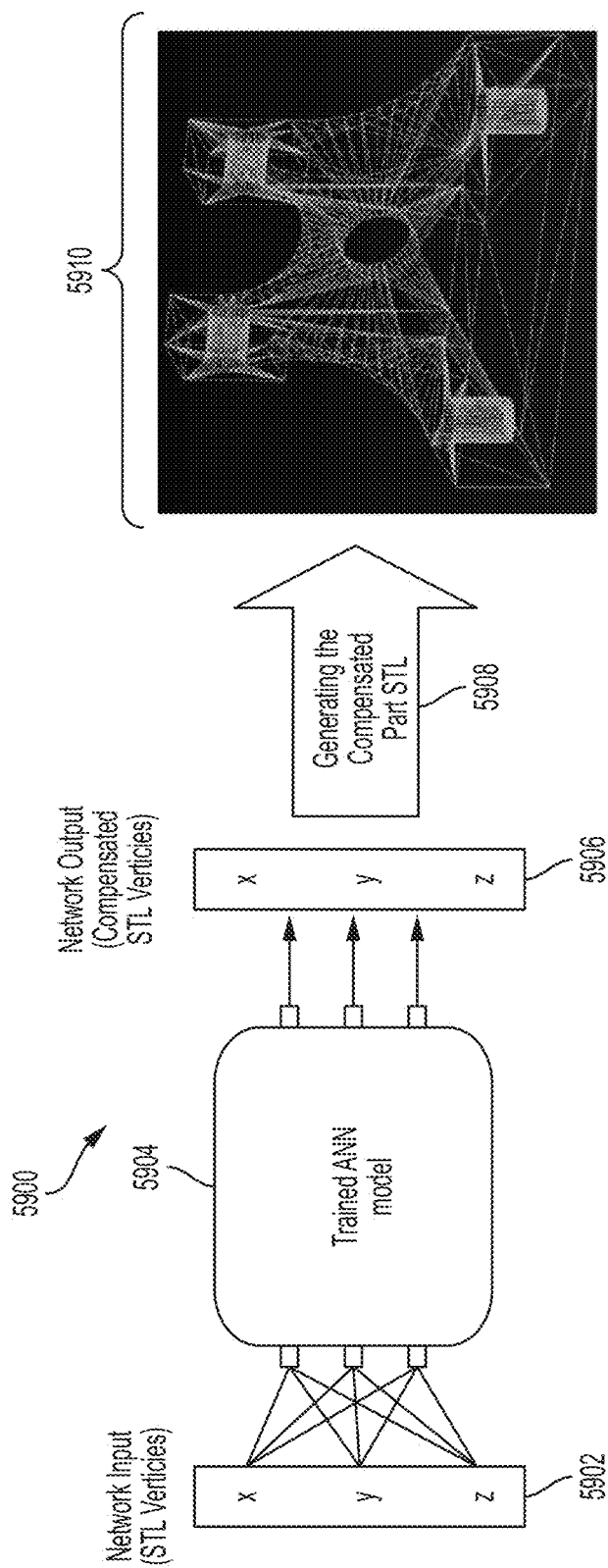
FIG. 59 depicts a diagram and a computer rendering illustrating compensated STL generation using a trained artificial neural network, according to one or more embodiments shown and described herein.

Thus, to obtain a compensated part design which is ready for processing by AM machines, the trained ANN model network may be applied on the vertices of the part STL facets. The 3D co-ordinates of the STL vertices may be sequentially input into the trained network. The network then processes the input data using the optimal weights determined from the ANN training process. This procedure results in the compensated 3D co-ordinate location for each STL vertex. The stlwrite MATLAB function (Holcombe, 2008) may be used to finally bring together the compensated STL vertices and output the complete STL model of the compensated geometry. The stlwrite function takes the compensated STL vertices and generates a valid error free STL file. FIG. 59 depicts an implementation schematic 5900 of the trained ANN model 5904 based CAD geometry compensation methodology that receives network input 5902 (STL vertices) for network output 5906 (compensated STL vertices) to generate 5908 a compensated STL file 5910.

Examples & Results

Figure 60:
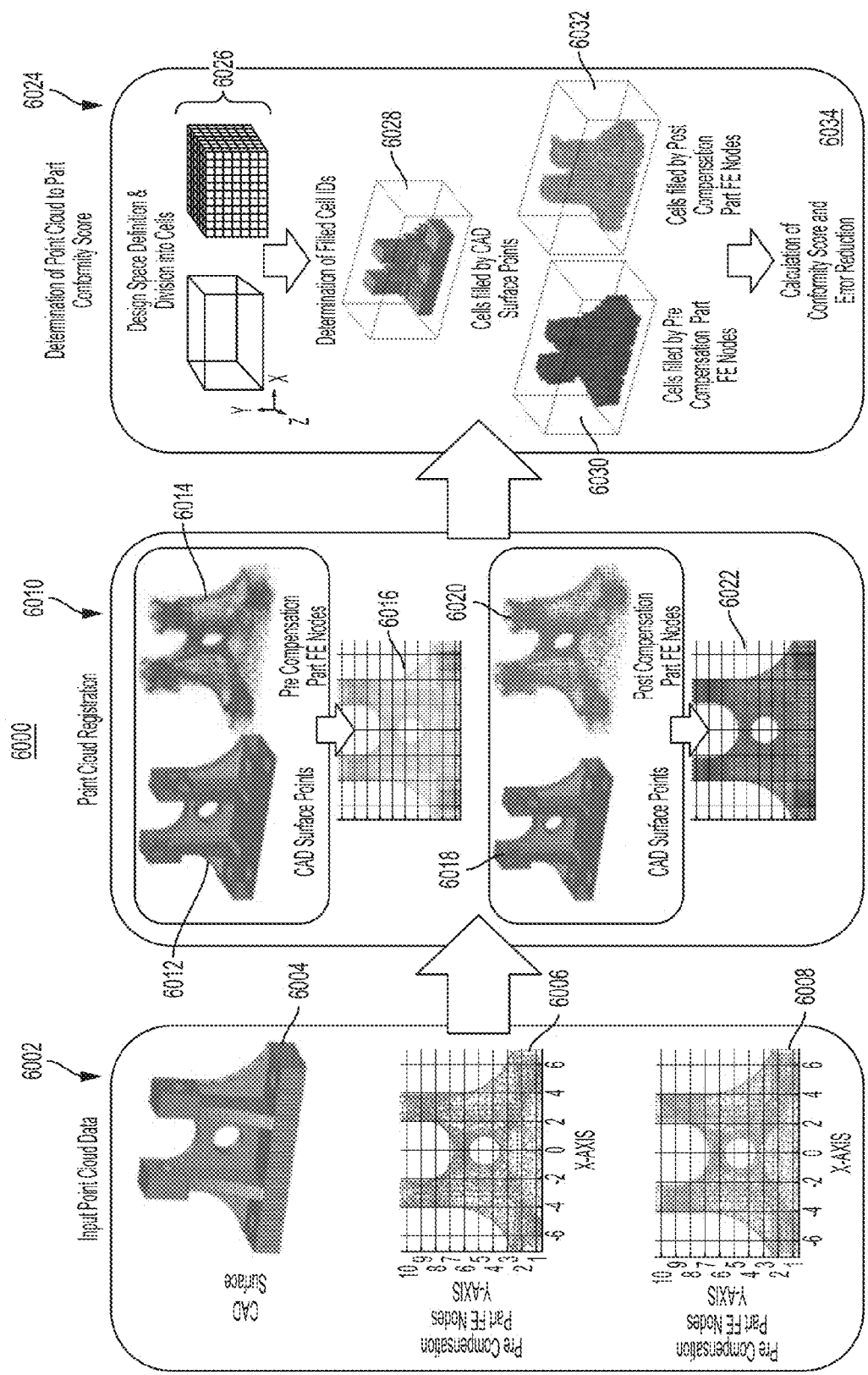
FIG. 60 depicts a computer rendering illustrating a Point Cloud to Part Conformity Score calculation methodology, according to one or more embodiments shown and described herein.

The proposed ANN model for geometry compensation may be tested on two sample parts and the results obtained from these tests are presented in this section. To evaluate the performance of the compensation methodology, the conformity of the part profiles resulting from the FE simulations may be compared with that of the actual CAD model. For this process, a novel point cloud data based conformity metric is defined in this section. A schematic 6000 of the methodology performance evaluation process is shown in FIG. 60, or put another way, a point cloud to part conformity score calculation methodology. Input point cloud data 6002 comprises CAD surface data 6004, pre-compensation part FE nodes 6006, and post-compensation part FE nodes 6008. Based on the input point cloud data 6002, point cloud registration 6010 then occurs, which comprises CAD surface points 6012 and pre-compensation part FE nodes 6014 for a pre-compensation part 6016. Additionally, the CAD surface points 6018 and post-compensation part FE nodes 6020 comprise a post-compensation part 6022.

Returning to the input point cloud data 6002, points may be defined on the CAD model surface 6004 which serves as the reference against which the manufactured part profiles will be compared. An NX Open API application in Siemens NX 8.5 may be used to discretize points on the CAD surface. The application may be used to identify all the surfaces for the given part within the CAD environment, after which points may be uniformly discretized on each surface patch. The manufactured part profiles may be represented by the deformed/compensated surface nodes resulting from the FE model based simulations of the AM process. The second step in the evaluation process is the registration 6010 of each of the two sets of manufactured point cloud data (deformed 6014 and compensated nodes 6020) with the CAD surface point cloud data. The registration may be carried out in two sequential sub-steps: (i) point cloud data alignment using a classical user defined marker based approach. The open source mesh processing tool—MeshLab (Cignoni and Ranzuglia) was used for this process; (ii) fine registration of the point cloud data using Iterative Closest Point Algorithm (Besl and McKay, 1992).

Next, a determination of point cloud to part conformity score is then determined at 6024. A design space 6026 may be defined by considering a bounding box for the CAD surface point cloud. This design space serves as the common base for the conformity evaluation for all three sets of point cloud data (cells filled by CAD surface points at 6028, cells filled by pre-compensation part FE nodes at 6028, and cells filled by post-compensation part FE nodes at 6030) and thus, the extremities of the bounding box are extended by a pre-defined tolerance to account for the part deformations. The design space may be then divided into a user defined three dimensional grid specified by the number of cells along x, y and z axes. The cells may also be assigned cell IDs depending on their position in the design space along x, y and z directions. For example, the cell at the minimum x, y and z positions may be assigned the cell ID of (Kulkarni et al., 2000). All the other cell IDs may be assigned relative to this cell. The CAD surface points may then be introduced in this design space and the cell IDs of the cells filled by one or more of the CAD surface points may be extracted. Next, the deformed and the compensated nodes may be introduced sequentially into the design space and the cell IDs filled by both separate sets of point cloud data may be determined. The final step may be to compare the similarity of cell IDs filled by both the CAD surface points 6028 and the deformed/compensated point clouds 6030 and 6032. Based on this comparison each point cloud set may be given a point cloud to part profile conformity score (CS) 6034 on a 1 to 100 scale as follows, $$CS_{deformed} = \left(\frac{N_{d-CAD}}{N_{CAD}}\right) \times 100 \text{ and} \quad (28)$$

$$CS_{compensated} = \left(\frac{N_{c-CAD}}{N_{CAD}}\right) \times 100 \quad (29)$$

where $CS_{deformed}$ and $CS_{compensated}$ are the compensation scores for the deformed and the compensated surfaces respectively. $N_{d-CAD}/N_{c-CAD}$ may be the number of filled cells IDs common to CAD & deformed/compensated surface points and $N_{CAD}$ are the number of cells filled by the CAD surface points.

Next, the reduction of conformity error due to compensation 6034 may be determined. The error ($\varepsilon$) in conformity to CAD surface for the deformed and compensated Point cloud may be respectively calculated as, $$\varepsilon_{deformed} = 100 - CS_{deformed} \quad (30)$$

and $$\varepsilon_{compensated} = 100 - CS_{compensated} \quad (31)$$

The percentage reduction in conformity error $\Delta\varepsilon$ may be then calculated as, $$\Delta\varepsilon = \left(\frac{\varepsilon_{deformed} - \varepsilon_{compensated}}{\varepsilon_{deformed}}\right) \times 100 \quad (32)$$

Example 1

Figure 61:
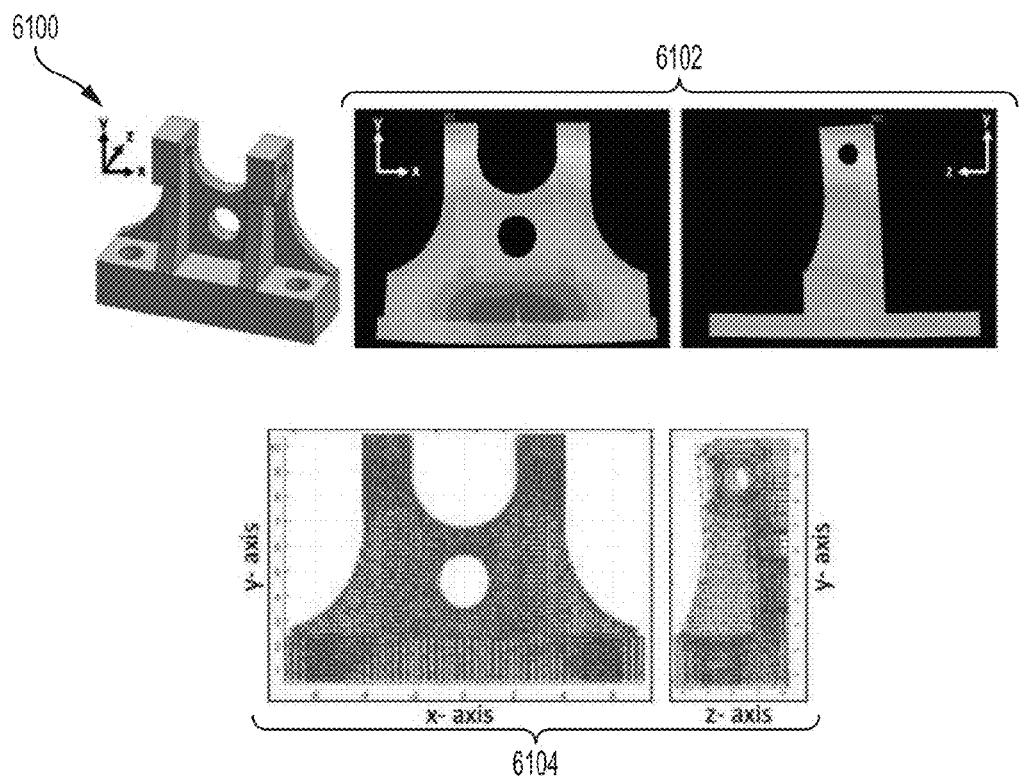
FIG. 61 depicts a computer rendering illustrating comparison of additive manufacturing simulated deformed part nodes with CAD surface points, according to one or more embodiments shown and described herein.

A simple bracket was chosen as the part to be studied for Example 1 as shown for 6100 in FIG. 61. The dimension of the given part along x, y and z axes is 14.4 mm×10.9 mm×4.50 mm. The maximum deviation observed for the given part after simulating the AM process using the FE model was 0.81 mm. 6102 shows the deformed part geometry 6102 resulting from the AM process simulation using the FE model. 6104 compares 6104 the deformed part nodes (red) with the designed CAD model surface points (blue).

Figure 62:
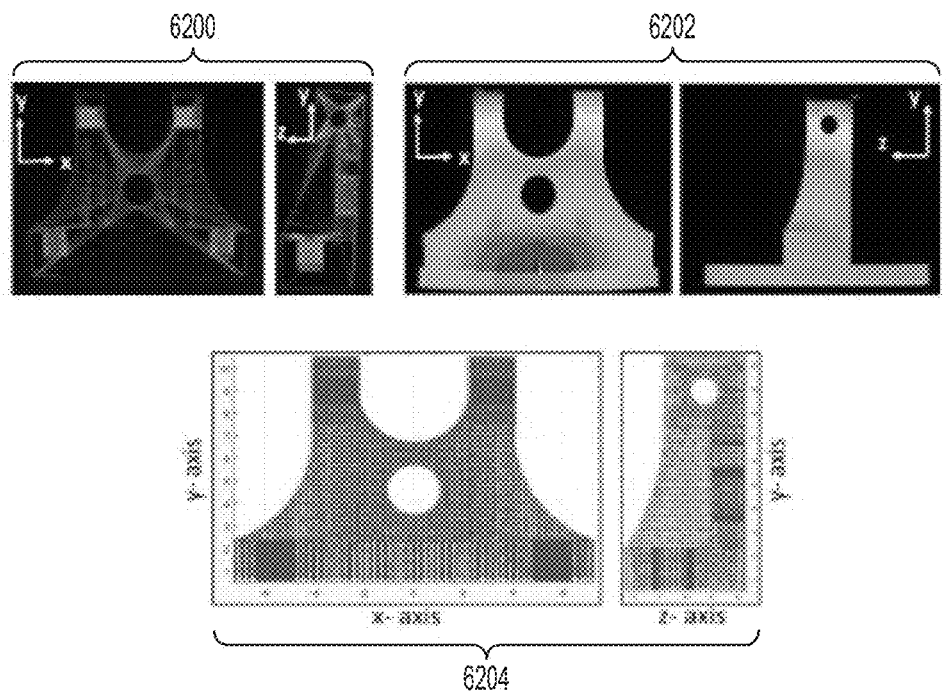
FIG. 62 depicts a computer rendering illustrating comparison of additive manufacturing simulated part nodes resulting from compensated geometry and CAD surface points, according to one or more embodiments shown and described herein.

In FIG. 62, 6200 shows the compensated STL 6200 resulting from the ANN based geometry compensation methodology. 6202 shows the part geometry 6202 resulting from the FE thermal model using the compensated geometry. 6204 shows the comparison 6204 between the nodes resulting from the AM simulation using the compensated STL geometry (green) and the CAD surface points (blue).

The point cloud to part conformity evaluation described above was used to evaluate the performance of the compensation model, and it is found that the pre-compensation conformity score of the deformed nodes for Sample Part 1 is 75.70 while post compensation the conformity score increases to 91.25. These conformity scores translate to a reduction in conformity error by 63.99%.

Example 2

Figure 63:
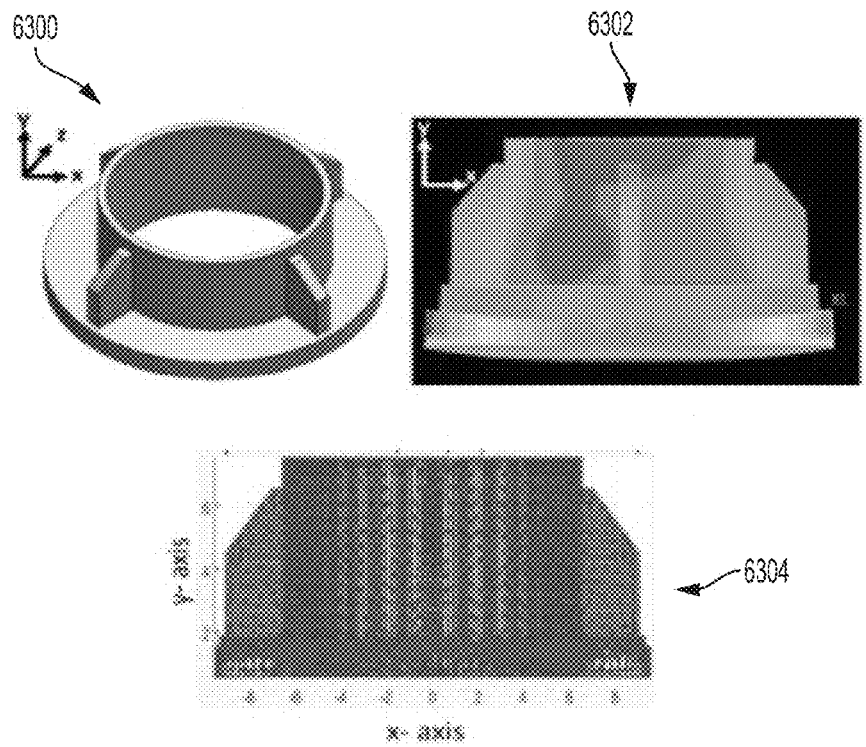
FIG. 63 depicts a computer rendering illustrating comparison of additive manufacturing simulated deformed part nodes with CAD surface points, according to one or more embodiments shown and described herein.

The flange 6300 shown in FIG. 63 was selected as the sample part to be studied for Example 2. The dimension for the given part along x, y and z axes is 19 mm×7.5 mm×19 mm and the maximum deviation was found to be 0.51 mm. 6302 shows the deformed part geometry 6302 resulting from the FE model. 6304 shows the comparison 6304 of the deformed part geometry (or nodes) resulting from the AM simulation and the CAD surface points (red) for the given part geometry (or nodes).

Figure 64:
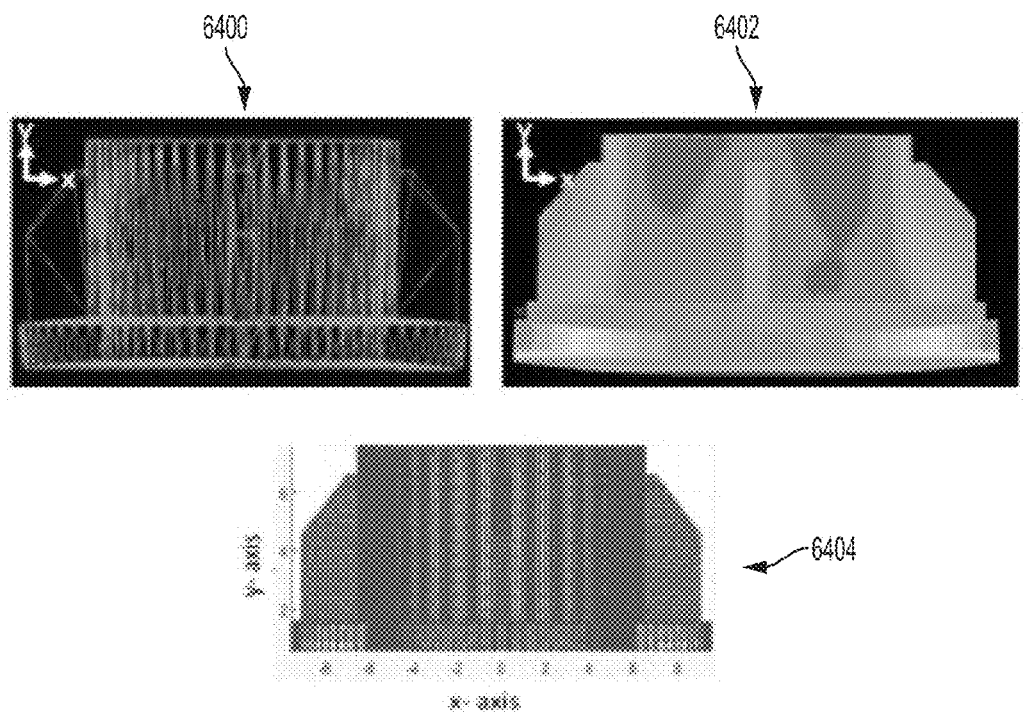
FIG. 64 depicts a computer rendering illustrating comparison of additive manufacturing simulated part nodes resulting from compensated geometry with CAD surface points, according to one or more embodiments shown and described herein.

The ANN geometry compensation model is used to generate the compensated STL 6400 as shown in FIG. 64. The geometry resulting from the FE model using the compensated STL is shown in 6402. The comparison 6404 between the compensated nodes (green) resulting from the AM simulation and the CAD surface points (blue) is as shown in 6404.

Next the previously described point cloud to part conformity evaluation methodology to evaluate the performance of the compensation model is applied. It is found that the pre-compensation conformity score of the deformed nodes with the part is 81.45 while post compensation the conformity score increases to 92.37. Thus the reduction in conformity error for this part is determined to be 58.86%.

Figure 66:
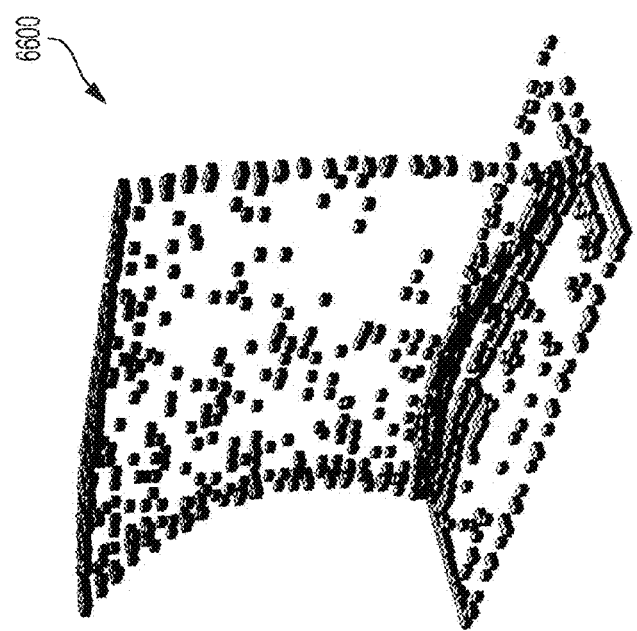
FIG. 66 depicts a computer rendering illustrating voxels identified to contain both CAD and manufactured scan data points, according to one or more embodiments shown and described herein.
Figure 65:
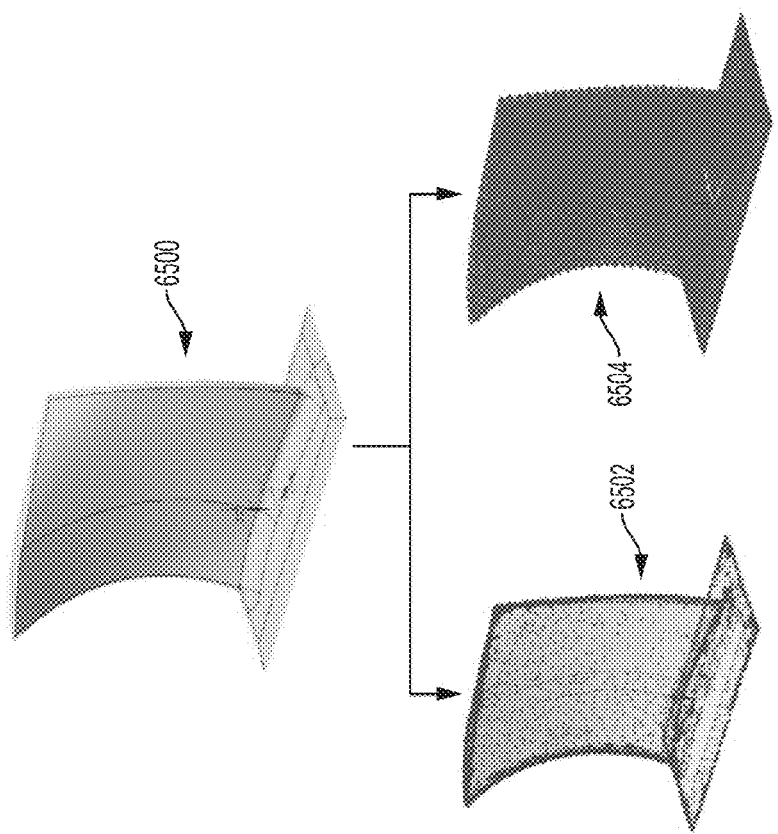
FIG. 65 depicts a computer rendering illustrating laser scanned manufactured part surface points and CAD surface points, according to one or more embodiments shown and described herein.
Figure 67:
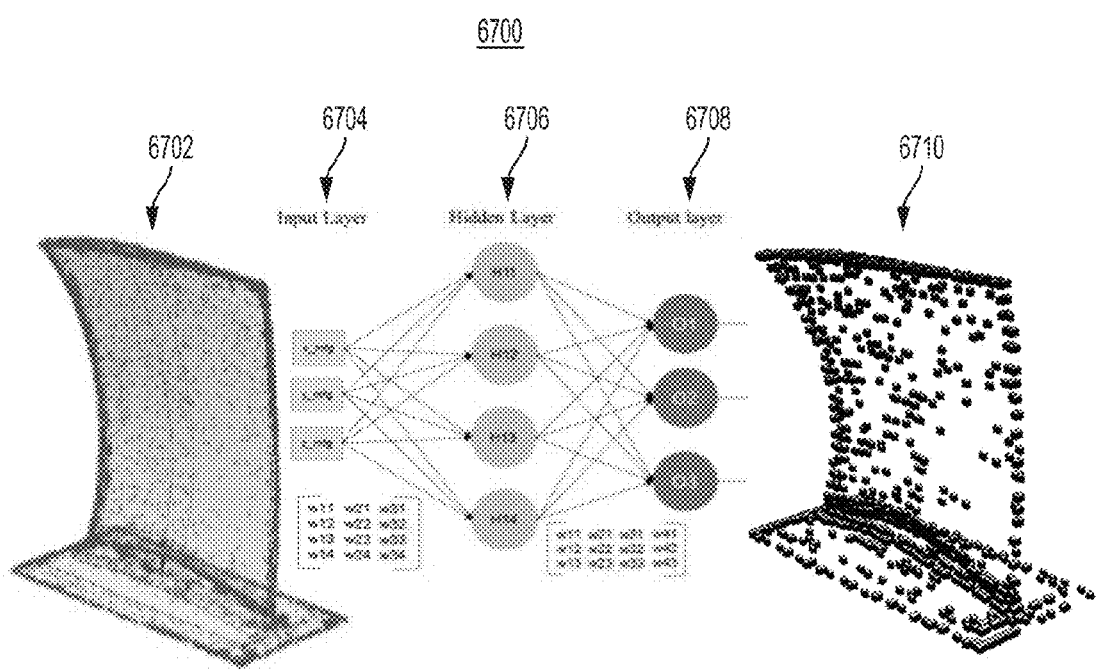
FIG. 67 depicts a computer rendering illustrating artificial neural network training on surface deformation data from CAD and manufactured parts, according to one or more embodiments shown and described herein.

FIG. 65 depicts a CAD model 6500 relating to manufactured part surface points obtained from a laser scan 6502 and CAD surface points obtained from NX Open API. Since matching of points in two separate point clouds may not be feasible, a voxel matching approach can be used to create ANN training data in FIG. 66. In FIG. 67 a diagram 6700 depicts voxels that are identified to contain both CAD and Manufacturing Scan data points. The ANN training on surface deformation data from CAD and a manufactured part. Manufactured part surface point voxels 6702 are input at the ANN input layer 6704, which are then provided to the ANN hidden layer 6706, and CAD surface point voxels are output at the ANN output layer 6708, where the target is a CAD surface with point voxels 6710.

Figure 68:
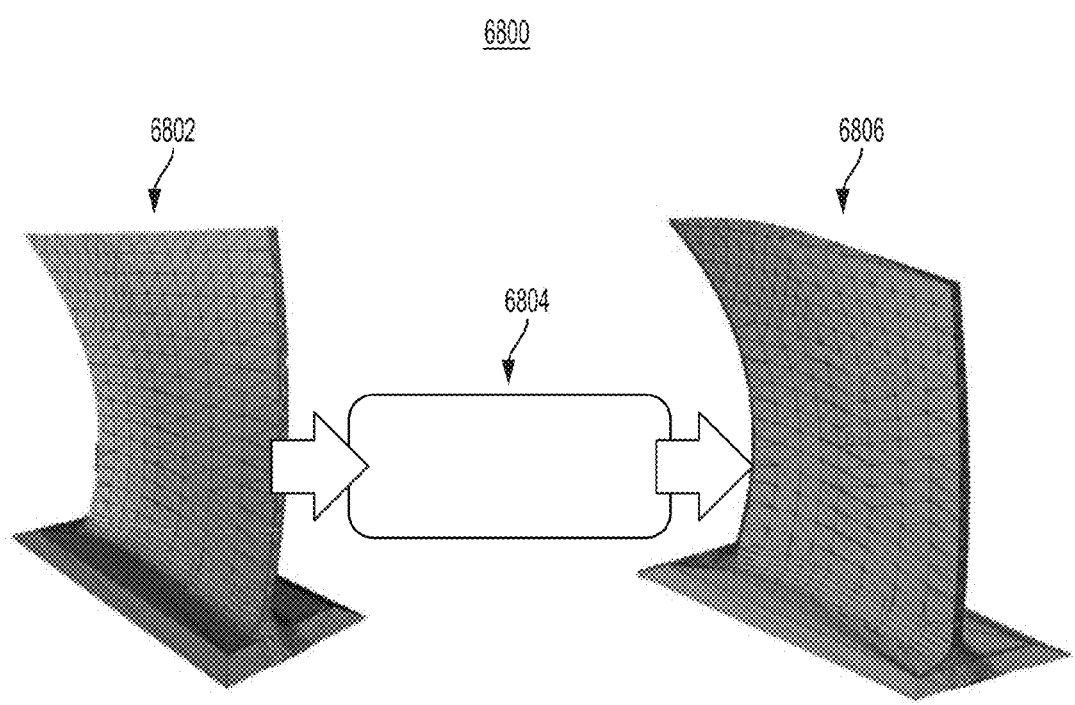
FIG. 68 depicts a computer rendering illustrating an application of a trained neural network to implement geometric compensation to an STL file, according to one or more embodiments shown and described herein.
Figure 69:
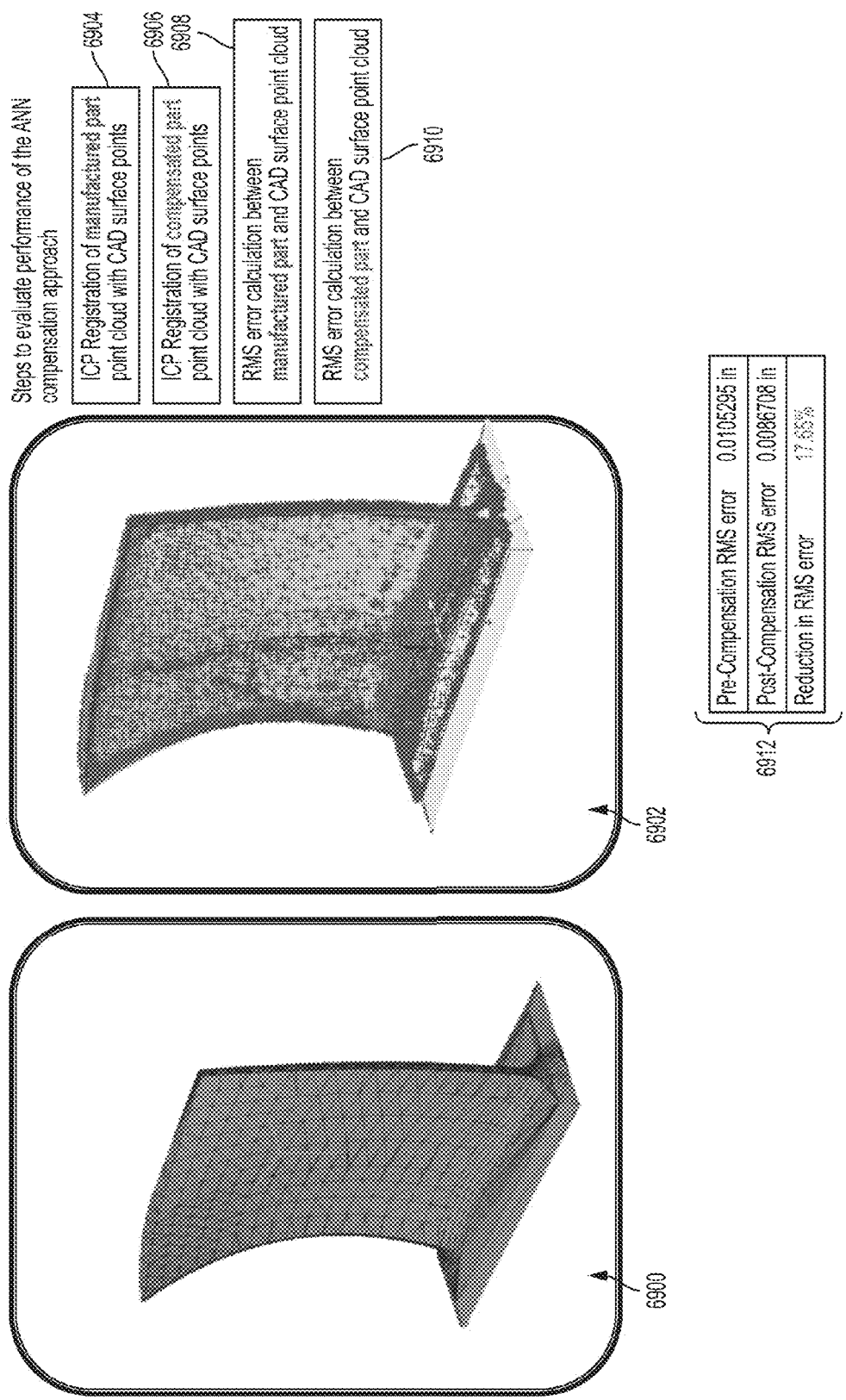
FIG. 69 depicts a computer rendering illustrating surface points of a part manufactured with a compensated STL file, according to one or more embodiments shown and described herein.

FIG. 68 depicts a diagram 6800 showing an application of a fully trained ANN 6804 to implement geometric compensation to a sample STL file, where original STL vertices 6802 are the inputs, and compensated STL vertices 6806 are the outputs. FIG. 69 depicts a compensated STL file 6900 and surface points of a part manufactured with a compensated STL file 6902. Performance of the ANN compensation approach comprises ICP registration of a manufactured part point cloud with CAD surface points at 6904, ICP registration of a compensated part point cloud with CAD surface points at 6906, root-mean-square (RMS) error calculation between the manufactured part and the CAD surface point cloud at 6908, and RMS error calculation between compensated part and CAD surface point cloud at 6910. At 6912, pre-compensation RMS error is compared with post-compensation RMS error to arrive at a calculated reduction in RMS error.

Further Considerations

ANN-based geometry compensation methodology has been proposed herein for counter-acting the thermal deformations in AM parts, resulting from the temperature gradients caused during the AM process. The methodology uses a feed forward neural network trained using the error back propagation technique. Surface data from the CAD model of the part and the manufactured part surface form the input data for the ANN model. An established FE model may be used to simulate the deformations in the AM part and thus helps generate the surface data for the manufactured part surface data. The trained network may be then used on the STL file of the part CAD model to impart the required geometrical compensations to the part design. A new point cloud based part conformity metric has also been presented to evaluate and quantify the performance of the proposed compensation methodology. Tests were carried out on two sample parts and a significant reduction has been recorded in the error in manufactured parts' conformity to the CAD design, thereby confirming the successful use of the defined ANN model for direct geometry correction to counter thermal deformations in AM parts.

The proposed ANN based geometry compensation methodology serves as an efficient complementary tool to all the FE based thermal deformation prediction models for AM processes available in literature. The next step in this endeavor would be to experimentally validate the proposed compensation methodology by building real parts. Surface data from manufactured AM prototypes extracted using 3D scanning techniques may be used for creating the training datasets for the ANN. Additional intermediate steps will also be needed to refine the data from 3D scans, such as: (i) removal of noise from the 3D scanned point cloud data, (ii) registration of the scanned point cloud with the CAD surface point cloud to ensure accurate comparison of deformation data and (iii) matching of individual points in the two point cloud data sets. However at this stage, the matching of point cloud data from the CAD model surface and the 3D scan of the manufactured part, which serves as the input data for the ANN model presents an open and non-trivial problem to be resolved. Other potential areas of improvement, could be the refinement of the proposed ANN model architecture or even the use of other established ANN models.

Turning to FIG. 70, a block diagram illustrates an example of a computing device 7000, through which embodiments of the disclosure can be implemented. The computing device 7000 described herein is but one example of a suitable computing device and does not suggest any limitation on the scope of any embodiments presented. Nothing illustrated or described with respect to the computing device 7000 should be interpreted as being required or as creating any type of dependency with respect to any element or plurality of elements. In various embodiments, a computing device 7000 may include, but need not be limited to, a desktop, laptop, server, client, tablet, smartphone, or any other type of device that can compress data. In an embodiment, the computing device 7000 includes at least one processor 7002 and memory (non-volatile memory 7008 and/or volatile memory 7010). The computing device 7000 can include one or more displays and/or output devices 7004 such as monitors, speakers, headphones, projectors, wearable-displays, holographic displays, and/or printers, for example. The computing device 7000 may further include one or more input devices 7006 which can include, by way of example, any type of mouse, keyboard, disk/media drive, memory stick/thumb-drive, memory card, pen, touch-input device, biometric scanner, voice/auditory input device, motion-detector, camera, scale, etc.

The computing device 7000 may include non-volatile memory 7008 (ROM, flash memory, etc.), volatile memory 7010 (RAM, etc.), or a combination thereof. A network interface 7012 can facilitate communications over a network 7014 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 7012 can be communicatively coupled to any device capable of transmitting and/or receiving data via the network 7014. Accordingly, the hardware of the network interface 7012 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 7016 may comprise a plurality of computer readable mediums, each of which may be either a computer readable storage medium or a computer readable signal medium. A computer readable storage medium 7016 may reside, for example, within an input device 7006, non-volatile memory 7008, volatile memory 7010, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 7000 may include one or more network interfaces 7012 to facilitate communication with one or more remote devices 7018, which may include, for example, client and/or server devices. A network interface 7012 may also be described as a communications module, as these terms may be used interchangeably.

REFERENCES

ANSYS, 2009, "Element Birth and Death," in *Advanced Analysis Techniques Guide*.

Arfken, G., 1985, "The Method of Steepest Descents," in *Mathematical Methods for Physicists*, Orlando, Fla., Academic Press, pp. 428-436.

Bassi R and Bedi S. Image Processing-Based Accessibility Analysis Method for Determining Undercut-Free Parting Direction. *International Journal of Advanced Manufacturing Technology* 2013; 69(5-8): 1581-91.

Besl, P. J., and McKay, N. D., 1992, "A method for registration of 3D shapes," *IEEE Transactions on Pattern Analysis and Machine Intelligence*, 14(2), pp. 239-256.

Cao W and Miyamoto Y. Direct Slicing from AutoCAD Solid Models for Rapid Prototyping. *International Journal of Advanced Manufacturing Technology* 2003; 21(10-11): 739-42.

Carr K and Ferreira P. Verification of Form Tolerances Part II: Cylindricity and Straightness of a Median Line. *Precision Engineering* 1995; 17(2): 144-156.

Chen, T. and Zhang, Y., 2007, "Three-Dimensional Modeling of Laser Sintering of a Two-Component Metal Powder Layer on Top of Sintered Layers," *Journal of Manufacturing Science and Engineering*, 129(3), pp. 575-582.

Cignoni, P., and Ranzuglia, G., "MeshLab," *Visual Computing Lab*—ISTI-CNR.

Das, S., Beaman, J. J., Wohlert, M., and Bourell, D. L., 1998, "Direct laser freeform fabrication of high performance metal components," *Rapid Prototyping Journal*, 4(3), pp. 112-117.

Demuth, H., and Beale, M., "MATLAB R2015a and Neural Network Toolbox," *The Math Works, Inc.*, Massachusetts, United States.

EOS e-Manufacturing Solutions. *EOS M 290*. 2015. Accessed on: October 2015.

EWI. *Additive Manufacturing: Moving Beyond Rapid Prototyping*. 2015.

Fadel G M and Kirschman C. Accuracy Issues in CAD to RP Translations. *Rapid Prototyping Journal* 1996; 2(2): 4-17.

Fletcher, R., 2013, Practical Methods of Optimization, John Wiley & Sons.

FreeCAD. *FreeCAD V0.15*. 2015. Accessed on: August 2015.

Ghuneim A G. *Moore-Neighbor Tracing*. 2015. Accessed on: July 2015.

Gonzalez R C, Woods R E and Eddins S L. *Digital Image Processing using MATLAB*. New Jersey: Pearson Prentice Hall, 2004.

Grimm T. *User's Guide to Rapid Prototyping*. Dearborn: Society of Manufacturing Engineers, 2004.

Guduri S, Crawford R and Beaman J. Direct Generation of Contour Files from Constructive Solid Geometry Representation. In: *Proceedings of Solid Freeform Fabrication Symposium*, 1993, pp. 291-302.

Harris C and Stephens M. A Combined Corner and Edge Detector. In: *Alvey vision conference*, 1988, pp. 50.

Holcombe, S., 2008, "stlwrite," The Mathworks, Inc.

Huang, Q., Zhang, J., Sabbaghi, A., and Dasgupta, T., 2015 "Optimal offline compensation of shape shrinkage for 3D printing processes," *IIE Transactions on Quality and Reliability*, 47(5), pp. 431-441.

Huang, Q., Nouri, H., Xu, K., Chen, Y., Sosina, S., and Dasgupta, T., 2014, "Statistical predictive modeling and compensation of geometric divisions of three-dimensional printed products," ASME Transactions, *Journal of Manufacturing Science and Engineering*, 136(6), pp. 061008-061018.

Itseez. *OpenCV 3.1 (Open Source Computer Vision Library)*. 2015. Accessed on: September 2015.

Jamshidinia, M., Kong, F., and Kovacevic, R., 2013, "Numerical Modeling of Heat Distribution in the Electron Beam Melting of Ti-6Al-4V," *Journal of Manufacturing Science and Engineering*, 135(6), p. 061010.

Jamieson R and Hacker H. Direct Slicing of CAD Models for Rapid Prototyping. *Rapid Prototyping Journal* 1995; 1(2): 4-12.

Kulkarni P, Marsan A and Dutta D. Review of Process Planning Techniques in Layered Manufacturing. *Rapid Prototyping Journal* 2000; 6(1): 18-35.

Leong K F, Chua C K and Ng Y M. A Study of Stereolithography File Errors and Repair. Part 1. Generic Solution. *International Journal of Advanced Manufacturing Technology* 1996; 12(6): 407-414.

Materialise. *Magics*. 2015. Accessed on: August 2015.

MathWorks. *Color-Based Segmentation Using the L\*a\*b\* Color Space*. 2015a. Accessed on: August 2015.

MathWorks. *Image Processing Toolbox*. 2015b. Accessed on: July 2015.

Matsumoto, M., Shiomi, M., Osakada, K., and Abe, F., 2002, "Finite element analysis of single layer forming on metallic powder bed in rapid prototyping by selective laser processing," *International Journal of Machine Tools & Manufacture*, 42(1), pp. 61-67.

McCulloch, W. S., and Pitts, W., 1943, "A logical calculus of the ideas immanent in nervous activity," *The bulletin of mathematical biophysics*, 5(4), pp. 115-133.

Navangul G, Paul R and Anand S. Error Minimization in Layered Manufacturing Parts by Stereolithography File Modification using a Vertex Translation Algorithm. *Journal of Manufacturing Science and Engineering, Transactions of the ASME* 2013; 135(3).

Ning, Y., Wong, Y. S., Fuh, J. Y. H., and Loh, H. T., 2006, "An Approach to Minimize Build Errors in Direct Metal Laser Sintering," *IEEE Transactions on Automation Science and Engineering,* 3(1), pp. 73-80.

Ning, Y., Wong, Y. S., and Fuh, J. Y. H., 2005 "Effect and control of hatch length on material properties in the direct metal laser sintering process," *Proceedings of the Institution of Mechanical Engineers, Part B: Journal of Engineering Manufacture,* 219(1), pp. 15-25.

Paul, R., Anand, S., and Gerner, F., 2014, "Effect of Thermal Deformation on Part Errors in Metal Powder Based Additive Manufacturing Processes," *Journal of Manufacturing Science and Engineering,* 136(3), p. 031009.

Paul, R., and Anand, S., 2013, "Material Shrinkage Modeling and Form Error Prediction in Additive Manufacturing Processes," in *Proceedings of the 41st,* Madison, Wis.

Paul R and Anand S. A New Steiner Patch Based File Format for Additive Manufacturing Processes. *Computer-Aided Design* 2015; 63: 86-100.

Paul R and Anand S. Process Energy Analysis and Optimization in Selective Laser Sintering. *Journal of* Manufacturing Systems 2012; 31(4): 429-37.

Pohl, H., Simchi, A., Issa, M., and Dias, H. C., 2001 "Thermal Stresses in Direct Metal Laser Sintering," in *Proceedings of the* 12*th Solid Freeform Fabrication Symposium,* Austin, Tex.

Raghunath, N., and Pandey, P. M., 2007, "Improving accuracy through shrinkage modeling by using Taguchi method in selective laser sintering," *International Journal of Machine Tools & Manufacture,* 47(6), pp. 985-995.

Rajagopalan M, Aziz N M and Huey C O, J. A Model for Interfacing Geometric Modeling Data with Rapid Prototyping Systems. *Advances in Engineering Software* 1995; 23(2): 89-96.

Riegel J, Mayer, W and van Havre, Y. *FreeCAD python API documentation.* 2013. Accessed on: August 2015.

Roberts, I. A., 2012, Investigation of Residual Stresses in the Laser Melting of Metal Powders in *Additive Layer Manufacturing,* Wolverhampton, UK: Ph.D. thesis, University of Wolverhampton.

Samant R. *Support Structure Accessibility and Removal in Additive Manufacturing using Octree Data Structure.* Master's Thesis. University of Cincinnati; 2015.

Senthilkumaran, K., Pandey, P. M., and Rao, P., 2009, "New model for shrinkage compensation in selective laser sintering," *Virtual and Physical Prototyping,* 4(2), pp. 49-62.

Siemens PLM Software. *NX for Design.* 2015. Available at: Accessed on: September 2015.

Siemens PLM Software. *NXOpen API.* 2014. Accessed on: September 2015.

Starly B, Lau A, Sun W, Lau W and Bradbury T. Direct Slicing of STEP Based NURBS Models for Layered Manufacturing. *CAD Computer Aided Design* 2005; 37(4): 387-397.

Sula S. *Turbine Rotor.* 2015. Accessed on: August 2015.

Sunanon P, Koomsap P and Nachaisit S. Image Processing for Rapid Prototyping Technology. In: *Proceedings of the 2005 International Conference on Simulation and Modeling,* 2005

Tong, K., Joshi, S., and Lehtihet, E. A., 2008, "Error compensation for fused deposition modeling (FDM) by correcting slice files," *Rapid Prototyping Journal,* 14(1), pp. 4-14.

Tong, K., Lehtihet, E. A., and Joshi, S., 2004, "Software Compensation of rapid prototyping machines," Precision Engineering, 28(3), pp. 280-292.

Topçu O, Taşcioğlu Y and Ünver H. Method for Slicing CAD Models in Binary STL Format. In: *Proceedings of 6th International Advanced Technologies Symposium (IATS'11),* 2011, pp. 141-145.

Wang, R.-J., Wang, L., Zhao, L., and Liu, Z, 2007, "Influence of process parameters on part shrinkage in SLS," The *International Journal of Advanced Manufacturing Technology,* 33(5), pp. 498-504.

Wang, X. C., and Kruth, J. P., 2000, "A simulation model for direct selective laser sintering of metal powders," in *B. H. V. Topping(ed.), Computational Techniques for Materials, Composites and Composite Structures,* Edinburgh, pp. 57-71.

Wang, X. C., Laoui, T., Bonse, J., Kruth, J. P., Lauwers, B., and Froyen, L., 2002, "Direct Selective Laser Sintering of Hard Metal Powders: Experimental Study and Simulation," *The International Journal of Advanced Manufacturing Technology,* 19(5), pp. 351-357.

Werbos, P., 1974, "Beyond Regression: New tools for prediction and analysis in the behavioural sciences," *PhD Thesis,* Harvard University.

Woo T C. Visibility Maps and Spherical Algorithms. *Computer Aided Design* 1994; 26(1): 6-16.

Zha W and Anand S. Geometric Approaches to Input File Modification for Part Quality Improvement in Additive Manufacturing. *Journal of Manufacturing Processes* 2015; 20: 465-477.

Yu, H., and Wilamowski, B. M., 2011, "Levenberg-Marquardt Training," in *Industrial Electronics Handbook, Vol. 5-Intelligent Systems, CRC Press,* pp. 12-1-12-16.

Zhang, Y., Faghri, A., Buckley, C. W., and Bergman, T. L., 2000, "Three-Dimensional Sintering of Two-Component Metal Powders with Stationary and Moving Laser Beams," *ASME J. Heat Transfer,* 122, pp. 150-158.

Zhu, H. H., Lu, L., and Fuh, J. Y. H., 2006, "Study on shrinkage behaviour of direct laser sintering metallic powder," *Proceedings of the Institution of Mechanical Engineers, Part B: Journal of Engineering Manufacture,* 220(2), pp. 183-190.

The invention claimed is:

1. A system for image processing of a computer-modeled object to be fabricated, comprising:
  memory; and
  a processor coupled to the memory, the processor being configured to:
    receive object geometry data and support geometry data;
    create sectional snapshots and generate a bounding box;
    perform a boundary tracing operation on the sectional snapshots;
    execute a contour mapping algorithm;
    perform color-based segmentation of sectional snapshots and pixel segregation;
    perform pixel dimension calculations utilizing a section bounding box;
    perform pixel counting to calculate a sintering area and an associated time value; and output slice contour points with respect to the object to be fabricated and the calculated sintering area and the associated time value.

2. A computer-implemented method for image processing of a computer-modeled object to be fabricated, comprising:
receiving object geometry data and support geometry data;
creating sectional snapshots and generating a bounding box;
performing a boundary tracing operation on the sectional snapshots;
executing a contour mapping algorithm;
performing color-based segmentation of sectional snapshots and pixel segregation;
performing pixel dimension calculations utilizing a section bounding box;
performing pixel counting to calculate a sintering area and an associated time value; and
outputting slice contour points with respect to the object to be fabricated and the calculated sintering area and the associated time value.

3. A computer-implemented method for image processing of a computer-modeled object to be fabricated, comprising:
receiving object geometry data and support geometry data;
generating a sectional snapshot and a bounding box;
performing color-based segmentation of sectional snapshots and pixel segregation;
performing a boundary tracing operation on the sectional snapshots;
executing a contour mapping algorithm;
utilizing a removability calculation for pixel traversal; and
outputting slice contour points with respect to the object to be fabricated and a support removability score.

4. The computer-implemented method of claim 3 further comprising a mapping algorithm for fabrication of the object that comprises, for a plurality of slices of the object:
receiving bounding box data, sectional snapshots, sectional bounding box data, and a defined slice thickness value;
opening a slice snapshot file for a current slice and performing thresholding to generate a binary image of the current slice;
applying boundary tracing on the binary image to obtain boundary pixels of the current slice;
identifying extreme pixels from boundary pixels of the current slice to calculate length and width of the current slice;
translating an origin of the boundary pixels to a global origin;
performing a non-uniform scaling operation on at least some of the boundary pixels to obtain three dimensional object contour points; and
translating the object contour points from the global origin to an actual origin of contour of the object.

5. The computer-implemented method of claim 3, further comprising a support removability calculator, for fabrication of the object, comprising:
designating portions of the object as part and support portions based upon imported part and support geometry;
generating a three-dimensional matrix based upon resolution and a quantity of sectional snapshots of the object;
categorizing pixels of a subject snapshot of the snapshots into part pixels, support pixels, and void pixels;
identifying, utilizing pixel traversal, accessible support pixels in a plurality of orthogonal directions and a plurality of diagonal directions with respect to the subject snapshot;
designating accessible pixels with respect to the subject snapshot and updating the three-dimensional matrix;
updating support pixels for accessibility in a plurality of orthogonal directions, lateral diagonal directions, and longitudinal diagonal directions; and
determining a removability percentage based upon the support pixels and the accessible support pixels.

6. The computer-implemented method of claim 3, further comprising a sintering parameters calculator for fabrication of the object, comprising:
receiving part and support portions of the object;
receiving machine parameters comprising slice thickness, scanning velocity, and recoating time;
identifying bounding box dimensions for combined part and support geometry;
for a subject slice of a plurality of slices:
generating a subject sectional snapshot and a sectional bounding box;
performing boundary tracing on the subject sectional snapshot and identifying extreme pixels across length and width;
cropping an excess portion of the subject sectional snapshot and retaining the subject sectional snapshot only within the extreme pixels;
performing segmentation on the subject sectional snapshot to:
map the sectional bounding box to the subject sectional snapshot and find a dimension of each pixel;
calculate an area of the sectional bounding box;
calculate a quantity of total pixels comprising part pixels, support pixels, and void pixels in the subject sectional snapshot; and
calculate a part pixel fraction and a support pixel fractions within the total pixels in the subject sectional snapshot;
determining a sintering part area based on multiplication of the calculated part pixel fraction by the area of the sectional bounding box;
determining a sintering support area based on multiplication of the calculated support pixel fraction by the area of the sectional bounding box; and
calculating sintering time based upon pixel traversal length divided by the received scanning velocity machine parameter.

7. The computer-implemented method of claim 3, further comprising a sharp corner detector for fabrication of the object, comprising:
capturing a sectional snapshot of the object based upon a received layer thickness value;
converted the captured sectional snapshot to a binary image using a binary thresholding operation;
identifying boundary pixels from the binary image and identifying corner pixels in the binary image; and
superimposing the boundary pixels and the corner pixels to generate vectors formed at one of the corner pixels.

8. The computer-implemented method of claim 3, further comprising a modified topology optimization algorithm regarding manufacturing constraints for thin features, comprising:
receiving a density value for a finite element;
utilizing finite element analysis to:
determine physical density based upon a density filter applied to the element density value;

applying a manufacturing constraint to the physical density to determine a modified physical density, wherein the modified physical density comprises a relation between physical density and mapped density;

applying solid isotropic material with penalization to the modified physical density to determine an elastic modulus, a plurality of nodal deformations, and a compliance value, wherein the elastic modulus comprises a ratio of force exerted to a resultant deformation;

utilizing optimization to minimize a compliance value to:
based upon the compliance value, utilize compliance as an objective function for optimization;
update design densities with a value of net compliance lower than the compliance value; and
provide the value of net compliance as an updated element density value in the finite element analysis.

9. The computer-implemented method of claim 3, further comprising a modified topology optimization algorithm regarding manufacturing constraints for support structure volume, comprising:
receiving a density value for a finite element;
utilizing finite element analysis to:
determine physical density based upon a density filter applied to the element density value;
applying solid isotropic material with penalization to the modified physical density to determine an elastic modulus, a plurality of nodal deformations, and a compliance value, wherein the elastic modulus comprises a ratio of force exerted to a resultant deformation;

utilizing optimization to minimize compliance and support to:
utilize compliance and support volume as a multi-objective function for optimization, based upon the compliance value;
update design densities with a value of net compliance lower than the compliance value; and
provide the value of net compliance as an updated element density value in the finite element analysis.

10. A non-transitory computer readable medium embodying computer-executable instructions, that when executed by a processor, cause the processor to execute operations for image processing of a computer-modeled object to be fabricated comprising:
receiving object geometry data and support geometry data;
creating sectional snapshots and generating a bounding box;
performing a boundary tracing operation on the sectional snapshots;
executing a contour mapping algorithm;
performing color-based segmentation of sectional snapshots and pixel segregation;
performing pixel dimension calculations utilizing a section bounding box;
performing pixel counting to calculate a sintering area and an associated time value; and
outputting slice contour points with respect to the object to be fabricated and the calculated sintering area and the associated time value.

11. A system for image processing of a computer-modeled object to be fabricated, comprising:
memory; and
a processor coupled to the memory, the processor being configured to:
receive object geometry data and support geometry data;
generate a sectional snapshot and a bounding box;

perform color-based segmentation of sectional snapshots and pixel segregation;
perform a boundary tracing operation on the sectional snapshots;
execute a contour mapping algorithm;
utilize a removability calculation for pixel traversal; and
output slice contour points with respect to the object to be fabricated and a support removability score.

12. The system of claim 11 further comprising a modified topology optimizer, regarding manufacturing constraints for support structure volume, configured to:
receive a density value for a finite element;
utilize finite element analysis to:
determine physical density based upon a density filter applied to the element density value;
apply solid isotropic material with penalization to the modified physical density to determine an elastic modulus, a plurality of nodal deformations, and a compliance value, wherein the elastic modulus comprises a ratio of force exerted to a resultant deformation;

utilize optimization to minimize compliance and support to:
utilize compliance and support volume as a multi-objective function for optimization, based upon the compliance value;
update design densities with a value of net compliance lower than the compliance value; and
provide the value of net compliance as an updated element density value in the finite element analysis.

13. The system of claim 11 wherein the processor is further configured to execute a mapping algorithm, for fabrication of the object with respect to a plurality of slices of the object comprising further instructions that:
receive bounding box data, sectional snapshots, sectional bounding box data, and a defined slice thickness value;
open a slice snapshot file for a current slice and performing thresholding to generate a binary image of the current slice;
apply boundary tracing on the binary image to obtain boundary pixels of the current slice;
identify extreme pixels from boundary pixels of the current slice to calculate length and width of the current slice;
translate an origin of the boundary pixels to a global origin;
perform a non-uniform scaling operation on at least some of the boundary pixels to obtain three dimensional object contour points; and
translate the object contour points from the global origin to an actual origin of contour of the object.

14. The system of claim 11 further comprising a support removability calculator configured to:
designate portions of the object as part and support portions based upon imported part and support geometry;
generate a three-dimensional matrix based upon resolution and a quantity of sectional snapshots of the object;
categorize pixels of a subject snapshot of the snapshots into part pixels, support pixels, and void pixels;
identify, utilizing pixel traversal, accessible support pixels in a plurality of orthogonal directions and a plurality of diagonal directions with respect to the subject snapshot;
designate accessible pixels with respect to the subject snapshot and updating the three-dimensional matrix;

update support pixels for accessibility in a plurality of orthogonal directions, lateral diagonal directions, and longitudinal diagonal directions; and determine a removability percentage based upon the support pixels and the accessible support pixels.

15. The system of claim 11 further comprising a sintering parameters calculator configured to:
receive part and support portions of the object;
receive machine parameters comprising slice thickness, scanning velocity, and recoating time;
identify bounding box dimensions for combined part and support geometry;
for a subject slice of a plurality of slices:
generate a subject sectional snapshot and a sectional bounding box;
perform boundary tracing on the subject sectional snapshot and identifying extreme pixels across length and width;
crop an excess portion of the subject sectional snapshot and retaining the subject sectional snapshot only within the extreme pixels;
perform segmentation on the subject sectional snapshot to:
map the sectional bounding box to the subject sectional snapshot and find a dimension of each pixel;
calculate an area of the sectional bounding box;
calculate a quantity of total pixels comprising part pixels, support pixels, and void pixels in the subject sectional snapshot; and
calculate a part pixel fraction and a support pixel fractions within the total pixels in the subject sectional snapshot;
determine a sintering part area based on multiplication of the calculated part pixel fraction by the area of the sectional bounding box;
determine a sintering support area based on multiplication of the calculated support pixel fraction by the area of the sectional bounding box; and
calculate sintering time based upon pixel traversal length divided by the received scanning velocity machine parameter.

16. The system of claim 11 comprising a comprising a sharp corner detector, for fabrication of the object, configured to:
capture a sectional snapshot of the object based upon a received layer thickness value;
convert the captured sectional snapshot to a binary image using a binary thresholding operation;
identify boundary pixels from the binary image and identifying corner pixels in the binary image; and
superimpose the boundary pixels and the corner pixels to generate vectors formed at one of the corner pixels.

17. The system of claim 11 further comprising a modified topology optimizer, regarding manufacturing constraints for thin features, configured to:
receive a density value for a finite element;
utilize finite element analysis to:
determine physical density based upon a density filter applied to the element density value;
apply a manufacturing constraint to the physical density to determine a modified physical density, wherein the modified physical density comprises a relation between physical density and mapped density;
apply solid isotropic material with penalization to the modified physical density to determine an elastic modulus, a plurality of nodal deformations, and a compliance value, wherein the elastic modulus comprises a ratio of force exerted to a resultant deformation;
utilize optimization to minimize a compliance value to:
based upon the compliance value, utilize compliance as an objective function for optimization;
update design densities with a value of net compliance lower than the compliance value; and
provide the value of net compliance as an updated element density value in the finite element analysis.

18. A non-transitory computer readable medium embodying computer-executable instructions, that when executed by a processor, cause the processor to execute operations for image processing of a computer-modeled object to be fabricated comprising:
receiving object geometry data and support geometry data;
generating a sectional snapshot and a bounding box;
performing color-based segmentation of sectional snapshots and pixel segregation;
performing a boundary tracing operation on the sectional snapshots;
executing a contour mapping algorithm;
utilizing a removability calculation for pixel traversal; and
outputting slice contour points with respect to the object to be fabricated and a support removability score.

19. The non-transitory computer readable medium of claim 18 further comprising instructions for a sharp corner detector for fabrication of the object, the instructions comprising:
capturing a sectional snapshot of the object based upon a received layer thickness value;
converted the captured sectional snapshot to a binary image using a binary thresholding operation;
identifying boundary pixels from the binary image and identifying corner pixels in the binary image; and
superimposing the boundary pixels and the corner pixels to generate vectors formed at one of the corner pixels.

20. The non-transitory computer readable medium of claim 18 further comprising instructions for a modified topology optimizer regarding manufacturing constraints for thin features, the instructions comprising:
receiving a density value for a finite element;
utilizing finite element analysis to:
determine physical density based upon a density filter applied to the element density value;
applying a manufacturing constraint to the physical density to determine a modified physical density, wherein the modified physical density comprises a relation between physical density and mapped density;
applying solid isotropic material with penalization to the modified physical density to determine an elastic modulus, a plurality of nodal deformations, and a compliance value, wherein the elastic modulus comprises a ratio of force exerted to a resultant deformation;
utilizing optimization to minimize a compliance value to:
based upon the compliance value, utilize compliance as an objective function for optimization;
update design densities with a value of net compliance lower than the compliance value; and
provide the value of net compliance as an updated element density value in the finite element analysis.

21. The non-transitory computer readable medium of claim 18 further comprising instructions for a modified topology optimizer regarding manufacturing constraints for support structure volume, the instructions comprising:
receiving a density value for a finite element;
utilizing finite element analysis to:
determine physical density based upon a density filter applied to the element density value;
applying solid isotropic material with penalization to the modified physical density to determine an elastic modulus, a plurality of nodal deformations, and a compliance value, wherein the elastic modulus comprises a ratio of force exerted to a resultant deformation;
utilizing optimization to minimize compliance and support to:
utilize compliance and support volume as a multi-objective function for optimization, based upon the compliance value;
update design densities with a value of net compliance lower than the compliance value; and
provide the value of net compliance as an updated element density value in the finite element analysis.

22. The non-transitory computer readable medium of claim 18 further comprising instructions for executing a mapping algorithm for fabrication of the object that comprises, for a plurality of slices of the object:
receiving bounding box data, sectional snapshots, sectional bounding box data, and a defined slice thickness value;
opening a slice snapshot file for a current slice and performing thresholding to generate a binary image of the current slice;
applying boundary tracing on the binary image to obtain boundary pixels of the current slice;
identifying extreme pixels from boundary pixels of the current slice to calculate length and width of the current slice;
translating an origin of the boundary pixels to a global origin;
performing a non-uniform scaling operation on at least some of the boundary pixels to obtain three dimensional object contour points; and
translating the object contour points from the global origin to an actual origin of contour of the object.

23. The non-transitory computer readable medium of claim 18 further comprising instructions for a support removability calculator for fabrication of the object, the instructions comprising:
designating portions of the object as part and support portions based upon imported part and support geometry;
generating a three-dimensional matrix based upon resolution and a quantity of sectional snapshots of the object;
categorizing pixels of a subject snapshot of the snapshots into part pixels, support pixels, and void pixels;
identifying, utilizing pixel traversal, accessible support pixels in a plurality of orthogonal directions and a plurality of diagonal directions with respect to the subject snapshot;
designating accessible pixels with respect to the subject snapshot and updating the three-dimensional matrix;
updating support pixels for accessibility in a plurality of orthogonal directions, lateral diagonal directions, and longitudinal diagonal directions; and
determining a removability percentage based upon the support pixels and the accessible support pixels.

24. The non-transitory computer readable medium of claim 18 further comprising instructions for a sintering parameters calculator for fabrication of the object, the instructions comprising:
receiving part and support portions of the object;
receiving machine parameters comprising slice thickness, scanning velocity, and recoating time;
identifying bounding box dimensions for combined part and support geometry;
for a subject slice of a plurality of slices:
generating a subject sectional snapshot and a sectional bounding box;
performing boundary tracing on the subject sectional snapshot and identifying extreme pixels across length and width;
cropping an excess portion of the subject sectional snapshot and retaining the subject sectional snapshot only within the extreme pixels;
performing segmentation on the subject sectional snapshot to:
map the sectional bounding box to the subject sectional snapshot and find a dimension of each pixel;
calculate an area of the sectional bounding box;
calculate a quantity of total pixels comprising part pixels, support pixels, and void pixels in the subject sectional snapshot; and
calculate a part pixel fraction and a support pixel fractions within the total pixels in the subject sectional snapshot;
determining a sintering part area based on multiplication of the calculated part pixel fraction by the area of the sectional bounding box;
determining a sintering support area based on multiplication of the calculated support pixel fraction by the area of the sectional bounding box; and
calculating sintering time based upon pixel traversal length divided by the received scanning velocity machine parameter.

25. A computer-implemented method for compensating for thermal deformation during fabrication of an object, comprising:
receiving a model of the object;
extracting nodes representing a surface of the object, each node having a position;
simulating fabrication of the object, said fabrication occurring across a time frame;
determining changes in the positions of the extracted nodes across the time frame;
compensating for thermal deformation by applying a trained neural network to modify the object in accordance with the changes in positions, said trained neural network trained with previous object fabrication simulations; and
outputting a modified model of the object.

26. The method of claim 25 further comprising training the neural network by iteratively utilizing output of the neural network comprising geometric differences between extracted nodes of a previous object model and extracted changed positions of the extracted nodes of a modified previous object model generated from the neural network.

27. The method of claim 26 wherein training the neural network further comprises updating weights of inter-nodal connections in the neural network based on the differences between the extracted nodes of the previous object model and the extracted changed positions of the extracted nodes of the modified previous object model generated from the neural network.

28. The method of claim 26, wherein training the neural network further comprises:
generating a first design space through a first bounding box for a first surface point cloud corresponding to the extracted nodes of the previous object model;
dividing the first design space into a first group of three-dimensional cells;
identifying cells in the first design space corresponding to the first surface point cloud;
generating a second design space through a second bounding box for a second surface point cloud corresponding to the extracted changed positions of the extracted nodes of the modified previous object model;
dividing the second design space into a second group of three-dimensional cells;
identifying cells in the second design space corresponding to the second surface point cloud; and
comparing differences between the identified cells in the first design space with the identified cells in the second design space.

29. The method of claim 25 further comprising calculating compensated surface data according to weights assigned to neurons in the neural network.

30. The method of claim 25 wherein the neural network comprises neurons arranged in sequential layers comprising an input layer of neurons, a hidden layer of neurons, and an output layer of neurons.

31. The method of claim 30 wherein the neural network further receives an input specifying a quantity of hidden layers of neurons.

32. The method of claim 25 wherein:
the nodes are extracted from a three-dimensional thermomechanical finite element analysis model;
the model of the object is a computer aided design model; and
the output of the modified model of the object is a stereolithography model.

33. A system for compensating for thermal deformation during fabrication of an object, comprising:
memory; and
a processor coupled to the memory, the processor being configured to:
receive a model of the object;
extract nodes representing a surface of the object, each node having a position;
simulate fabrication of the object, said fabrication occurring across a time frame;
determine changes in the positions of the extracted nodes across the time frame;
compensate for thermal deformation by applying a trained neural network to modify the object in accordance with the changes in positions, said trained neural network trained with previous object fabrication simulations; and
output a modified model of the object.

34. The system of claim 33 wherein the processor is further configured to train the neural network by iteratively utilizing output of the neural network comprising geometric differences between extracted nodes of a previous object model and extracted changed positions of the extracted nodes of a modified previous object model generated from the neural network.

35. The system of claim 34 wherein the processor is further configured to train the neural network by updating weights of inter-nodal connections in the neural network based on the differences between the extracted nodes of the previous object model and the extracted changed positions of the extracted nodes of the modified previous object model generated from the neural network.

36. The system of claim 34 being further configured to train the neural network by:
generating a first design space through a first bounding box for a first surface point cloud corresponding to the extracted nodes of the previous object model;
dividing the first design space into a first group of three-dimensional cells;
identifying cells in the first design space corresponding to the first surface point cloud;
generating a second design space through a second bounding box for a second surface point cloud corresponding to the extracted changed positions of the extracted nodes of the modified previous object model;
dividing the second design space into a second group of three-dimensional cells;
identifying cells in the second design space corresponding to the second surface point cloud; and
comparing differences between the identified cells in the first design space with the identified cells in the second design space.

37. The system of claim 33 wherein the processor is further configured to calculate compensated surface data according to weights assigned to neurons in the neural network.

38. The system of claim 33 wherein the neural network comprises neurons arranged in sequential layers comprising an input layer of neurons, a hidden layer of neurons, and an output layer of neurons.

39. The system of claim 38 wherein the neural network is configured to receive an input specifying a quantity of hidden layers of neurons.

40. The system of claim 33 wherein:
the nodes are extracted from a three-dimensional thermomechanical finite element analysis model;
the model of the object is a computer aided design model; and
the output of the modified model of the object is a stereolithography model.

41. A non-transitory computer readable medium embodying computer-executable instructions, that when executed by a processor, cause the processor to execute operations for compensating for thermal deformation during fabrication of an object comprising:
receiving a model of the object;
extracting nodes representing a surface of the object, each node having a position;
simulating fabrication of the object, said fabrication occurring across a time frame;
determining changes in the positions of the extracted nodes across the time frame;
compensating for thermal deformation by applying a trained neural network to modify the object in accordance with the changes in positions, said trained neural network trained with previous object fabrication simulations; and
outputting a modified model of the object.

42. The non-transitory computer readable medium of claim 41 further comprising instructions for training the neural network by iteratively utilizing output of the neural network comprising geometric differences between extracted nodes of a previous object model and extracted changed positions of the extracted nodes of a modified previous object model generated from the neural network.

43. The non-transitory computer readable medium of claim 42 wherein training the neural network further comprises instructions for updating weights of inter-nodal connections in the neural network based on the differences between the extracted nodes of the previous object model and the extracted changed positions of the extracted nodes of the modified previous object model generated from the neural network.

44. The non-transitory computer readable medium of claim 42, wherein training the neural network further comprises instructions for:
   generating a first design space through a first bounding box for a first surface point cloud corresponding to the extracted nodes of the previous object model;
   dividing the first design space into a first group of three-dimensional cells;
   identifying cells in the first design space corresponding to the first surface point cloud;
   generating a second design space through a second bounding box for a second surface point cloud corresponding to the extracted changed positions of the extracted nodes of the modified previous object model;
   dividing the second design space into a second group of three-dimensional cells;
   identifying cells in the second design space corresponding to the second surface point cloud; and
   comparing differences between the identified cells in the first design space with the identified cells in the second design space.

45. The non-transitory computer readable medium of claim 41 further comprising instructions for calculating compensated surface data according to weights assigned to neurons in the neural network.

46. The non-transitory computer readable medium of claim 41 further comprising instructions wherein the neural network comprises neurons arranged in sequential layers comprising an input layer of neurons, a hidden layer of neurons, and an output layer of neurons.

47. The non-transitory computer readable medium of claim 46 further comprising instructions wherein the neural network further receives an input specifying a quantity of hidden layers of neurons.

48. The non-transitory computer readable medium of claim 41 wherein:
   the nodes are extracted from a three-dimensional thermo-mechanical finite element analysis model;
   the model of the object is a computer aided design model; and
   the output of the modified model of the object is a stereolithography model.

* * * * *